United States Patent [19]

Neumann

[11] Patent Number: 5,303,151
[45] Date of Patent: Apr. 12, 1994

[54] METHOD AND SYSTEM FOR TRANSLATING DOCUMENTS USING TRANSLATION HANDLES

[75] Inventor: Angelika G. C. Neumann, Bothell, Wash.

[73] Assignee: Microsoft Corporation, Redmond, Wash.

[21] Appl. No.: 23,976

[22] Filed: Feb. 26, 1993

[51] Int. Cl.$^5$ ............................................... G06F 15/38
[52] U.S. Cl. ............................................... 364/419.02
[58] Field of Search ........... 364/419.1, 419.11, 419.02, 364/419.05, 419.04, 419.03

[56] References Cited

U.S. PATENT DOCUMENTS

| | | | |
|---|---|---|---|
| 4,730,270 | 3/1988 | Okajima et al. | 364/900 |
| 4,800,522 | 1/1989 | Miyao et al. | 364/900 |
| 5,243,519 | 9/1993 | Andrews et al. | 364/419.05 |

OTHER PUBLICATIONS

Globlink Advertisement; Sep. 15, 1993; pp. 1-6.
Muriel Vasconcellos, "Machine Translation" BYTE, pp. 153, 154, 156, 161, 162 & 164, 1993.
Eduard Hovy, "MT at Your Service", BYTE, pp. 160–161, 1993.
Eduard Hovy, "How MT Works", BYTE, pp. 167, 168, 171, 172, 1993.
Bernard E. Scott, "The Five Layers of Ambiguity", BYTE, pp. 174-176, 1993.
L. Chris Miller, "Babelware for the Desktop", BYTE, pp. 177-178, 180, 182, 183, 1993.
Resource Guide, Machine-Translation Software, BYTE, pp. 185-186, 1993.
IBM, "Introducing Translation Manager/2" & Overview of Functions, Chapters 2&5, pp. 22-25, 38-41, 1992.

Primary Examiner—Roy N. Envall, Jr.
Assistant Examiner—Ari M. Bai
Attorney, Agent, or Firm—Seed and Berry

[57] ABSTRACT

A translation assistance program of a word processing program used to translate a source language document written in a source language to a target language document written in a target language. The translation assistance program displays the source language document on a translation screen portion of a display device. The translation assistance program then compares each source term in a product glossary with the source terms in the source language document. The product glossary associates each source term it stores with a target term which translates the source term into the target language. For each source term from the source language document which is stored in the product glossary, the translation assistance program: 1) underlines the source term in the source language document, 2) inserts a translation handle on the translation screen portion immediately after the source term, and 3) associates the translation handle with the target term which translates the source term into the target language. When the user decides to insert the target term at a current insertion point on the translation screen, the user invokes an insert target term command which contains the translation handle associated with the appropriate source term. In response, the translation assistance program retrieves the target term associated with the translation handle and inserts the target term at the current insertion point on the translation screen portion.

12 Claims, 24 Drawing Sheets

| CATEGORY | DESCRIPTION | EXAMPLE |
|---|---|---|
| MNU | Menu name | File |
| COM | Command name | Print |
| TDB | Title of dialog box | Print |
| BUT | Name on a button | OK (also: Cancel, Page Setup, Help) |
| TXB | Text box name | From (also: To, Copies) |
| OPT | Option button name (round buttons in dialog boxes) | All (also: Pages, Sheet, Notes, Both) |
| CHX | Check box name | Preview (also: Fast, but no Graphics) |
| TXT | Text string in a dialog box | Printer (also: Print Range, Print) |
| DIA | All other dialog box items | Print Quality (this is a "combo box") |
| MSG | Message (i.e., status, error) | For Help on dialog settings, press F1 (appears in status bar when the Print dialog box is displayed) |
| MAC | Macro name | Built-in macro in Excel, Project, Word, etc. |
| KEY | Key name | ENTER, F1, CAPS LOCK |
| FLD | Field name | E.g., Date or Author fields in WinWord |

*Figure 3*

DEMO.DOC

Text in einem Document finden

Wählen Sie aus dem Menü Bearbeiten den Befehl Suchen. In dem Feld "Zu findender Text" geben Sie den Text, den Sie finden möchten, ein. Um die Suche zu beginnen, wählen Sie dann die Schaltfläche "Weitersuchen"
In the Find What box, type the text you want to find. Then choose the Find Next button to begin the search.

Replacing Text in a Document

Wählen Sie aus dem Menü Bearbeiten den Befehl Ersetzen. Type the text you want to find in the Find What box, and the replacement text in the Replace

*Figure 19A*

METHOD AND SYSTEM FOR TRANSLATING DOCUMENTS USING TRANSLATION HANDLES

TECHNICAL FIELD

This invention relates generally to a computer method and system for automated translation of documents, and more specifically, to a computer method and system for lo automated translation of documents using translation handles.

BACKGROUND OF THE INVENTION

Due to the globalization of trade and the advent of common markets, the process of converting information from one language to another with a computer, called machine-assisted translation (MAT), is becoming increasingly important.

In MAT systems a human translator prepares a target language document, in a target language, from a source language document, in a source language, using a word processing program, automatic terminology managers, on-line multilingual term banks, and other computer-based tools which boost translator productivity.

An example using FIG. 1 will help illustrate how existing MAT systems operate. FIG. 1 is a block diagram of a system 100 which assists a human translator in translating a source language document 112 to a target language document 116. The system 100 consists of a computer 102, a keyboard 104, a mouse 106, and a display screen 108.

A user of the system 100 invokes a word processing program 110 using either the keyboard 104 or the mouse 106, and creates the source language document 112 containing the text "This is an example". The user then invokes a translation assistant 114 to assist the translator in translating the source language document 112 from the source language (e.g., English) to the target language document 116 containing the corresponding sentence in the target language (e.g., German).

To assist the user in translating the source language document 112 to the target language document 116 the translation assistant 114 displays a translation screen 118 and a dictionary screen 120 on the display screen 108. The translation screen 118 displays the text of the source language document 112. The dictionary screen 120 displays source terms 124 and corresponding translation options 126 which translate a given source term 124 into the target language. The translation assistant 114 retrieves each translation option 126 from a translation dictionary 122 which stores source terms 124 and their corresponding translation options 126. Each translation option 126 on the dictionary screen 120 is preceded by an identifier such as "a)", "b)", "c)" etc.

With the translation screen 118 and the dictionary screen 120 displayed on the display screen 108, the user reads the source language document 112 displayed on the translation screen 118. Next, the user looks away from the translation screen 118 and at the dictionary screen 120. By looking at the dictionary screen 120, the user finds the source terms 124 from the source language document 112 which are displayed on the dictionary screen 120 due to a match with the <source terms 124, translation option 126> pairs stored in the translation dictionary 122 of the translation assistant 114. The user then chooses which displayed source term 124 to translate. Then the user determines which corresponding translation option 126 to select to translate the chosen source term 124. Finally, the user invokes a copy translation command which copies the selected translation option 126 from the dictionary screen 120 to the translation screen 118. The user then looks away from the dictionary screen 120 to the translation screen 118 to see the selected translation option 126 displayed on the translation screen 118.

It is desirable to avoid looking from the translation screen 118 to the dictionary screen 120 in order to insert translation options 126.

It is also desirable to avoid looking from the translation screen 118 to the dictionary screen 120 to determine which source terms 124 from the source language document 112 have been matched with <source term 124, translation option 126> pairs from the translation dictionary 122 of the translation assistant 114.

SUMMARY OF THE INVENTION

It is an object of the present invention to provide a function and system to ensure that consistent terminology is used throughout the target language document.

It is another object of the present invention to provide a function and system which offers typing aids to increase the translator's efficiency when translating a source language document into a target language document.

It is another object of the present invention to provide a function and system which allows translations of source terms to be inserted when and where they are needed in a sentence being translated.

It is another object of the present invention to facilitate the process of on-line translation by offering fast access to translated terminology without the need to look at the dictionary screen.

These and other objects, which will be apparent as the invention is more fully described, are provided by a function and system for translating a- source language document to a target language document using translation handles. In the preferred embodiment of the present invention, a user invokes a translation assistance program under a word processing program to translate a source language document written in a source language to a target language document written in a target language. The translation assistance program displays the source language document on a translation screen of a display device. The translation assistance program then compares each source term in a product glossary with the source terms in the source language document. The product glossary associates each source term it stores with a target term which translates the source term into the target language. For each source term from the source language document which is found in the product glossary, the translation assistance program: 1)underlines the source term in the source language document, 2) inserts a translation handle on the translation screen immediately after the underlined source term, and 3) associates the translation handle with the target term which translates the source term into the target language. When the user decides to insert the target term at a current insertion point on the translation screen, the user invokes an insert target term command which contains the translation handle associated with the appropriate source term. In response, the translation assistance program retrieves the target term associated with the translation handle and inserts the target term at the current insertion point on the translation screen.

BRIEF DESCRIPTION OF THE DRAWINGS

FIG. 3 is a block diagram of typical Microsoft Lingua categories.

FIG. 19A is a block diagram of the source language document after the user has issued a toggle capitalization request.

Figure 1:
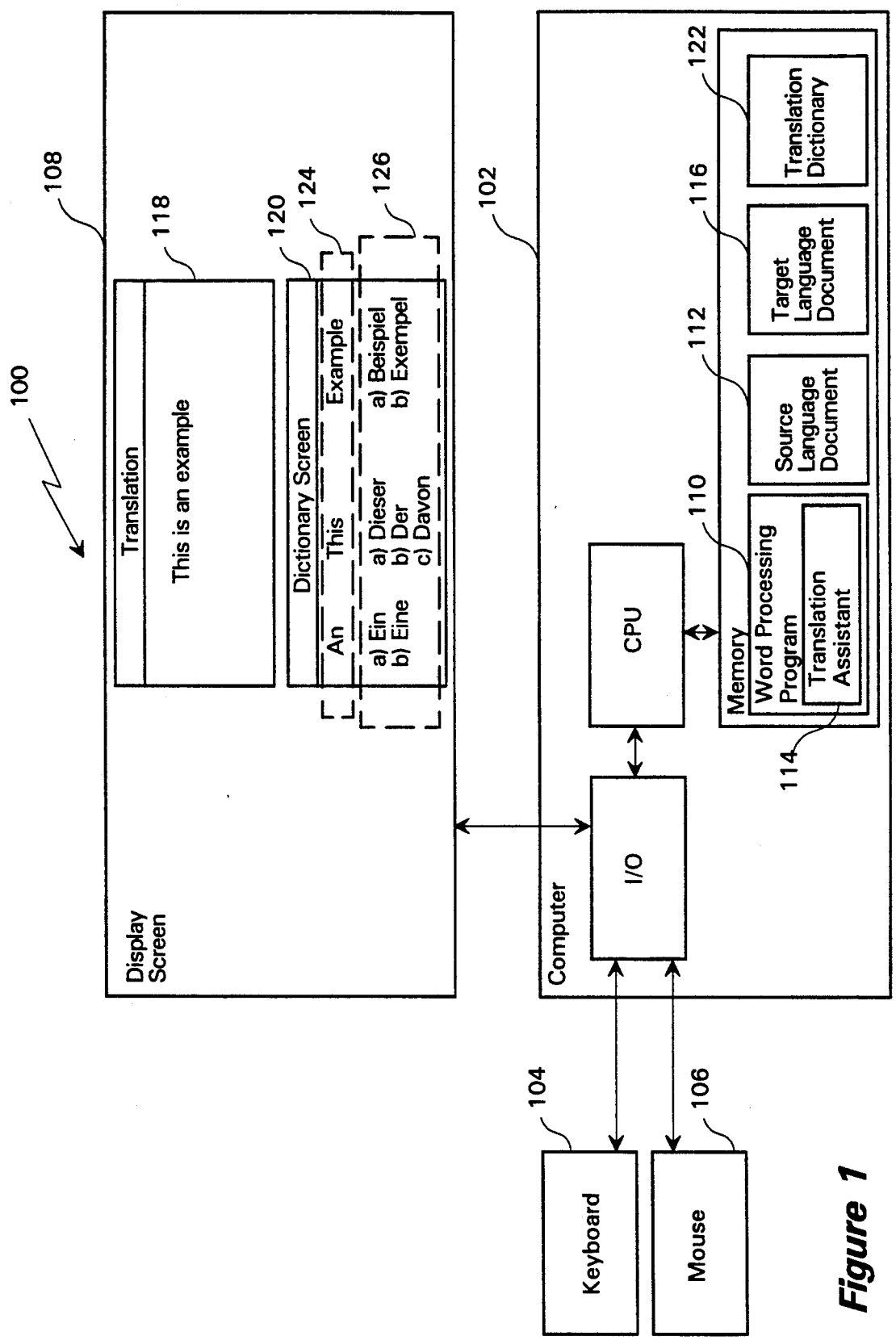
FIG. 1 is a block diagram showing a prior art system for translating a source language document to a target language document.
Figure 2:
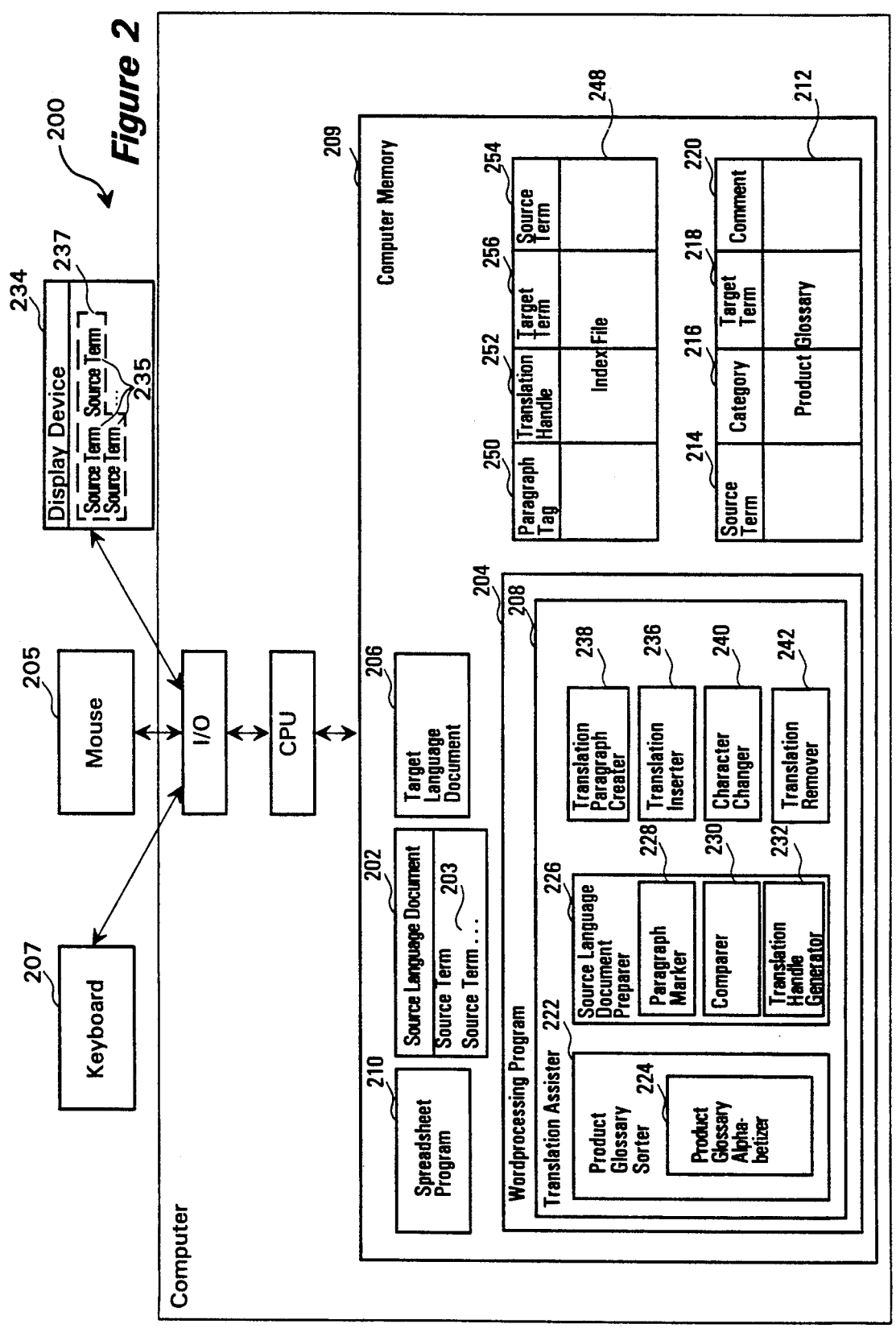
FIG. 2 is a block diagram of a system embodying the present invention for translating a source language document language document.

Appendix A is a user's guide for the system of FIG. 2.

DETAILED DESCRIPTION OF THE INVENTION

Overview

The present invention provides a function and system which overcomes the problems of existing machineassisted translation (MAT) systems. The preferred system 200 (FIG. 2) of the present invention provides a translation assister 208 which translates a source language document 202, written in a source language, to a target language document 206 written in a target language. First, the translation assister 208 displays the source language document 202 on a display device 234. The translation assister 208 then compares each source term 214 in a product glossary 212 with each source term 203 in the source language document 202. The product glossary 212 associates each source term 214 with a target term 218 which translates the source term 214 into the target language. For each source term 214 from the source language document 202 which matches at least one source term 214 in the product glossary 212, the translation assister 208: 1) underlines the source term 203 in the source language document 202, 2) inserts a translation handle (described in more detail below) such as a superscript character, immediately after the source term 203, and 3) associates the translation handle with the target term 218 in the product glossary 212 which translates the source term 203 into the target language.

When the user decides to translate the source term 203 by inserting the target term 218 on the display device 234, the user the system 200 invokes an insert target term command which contains the translation handle associated with the source term 203 to be translated. In response, the translation assister 208 retrieves the target term 218 associated with the translation handle contained in the insert target term command, and inserts the target term 218 on the display device 234.

The System

An example using FIG. 2 will illustrate a typical translation process using a MAT system 200 operating according to the present invention. First, a user of the system 200 invokes word processing program 204 using a mouse 205. Then the user enters text on a keyboard 207 to create the source language document 202. Both the word processing program 204 and the source language document 202 are stored in the computer memory 209. The source language document 202 comprises a series of source terms 203 from a source language (e.g., English). Once the source language document 202 has been created, the user often desires to translate the source language document 202 into the target language document 206 (e.g., German).

To perform this translation, the present invention provides, in addition to the word processing program 204, a translation assister 208 and a spreadsheet program 210. The user invokes the spreadsheet program 210 and creates a product glossary 212 which associates a source term 214 with a target term 218 which is a translation of the source term 214 into the target language. The preferred product glossary 212 contains four columns of data: the source term 214, a category 216, the target term 218, and a Comment 220. In the preferred embodiment, the order of the columns of the product glossary 212 must be the same order shown in the product glossary 212 of FIG. 2, and the four columns must be named "Source Term", "Category", "Target Term", and "Comment".

The category 216 classifies each <source term 214, target term 218> pair. The product glossary 212 preferably contains categories 216 which conform to standard Microsoft Lingua abbreviations. FIG. 3 sets forth some typical Lingua abbreviations such as "MNU" for menu names, "COM" for command names, and "MAC" for macro names.

In the preferred embodiment the source term 214 and the target term 218 comprise a word, a phrase, a sentence, or a template string. The template string is a commonly occurring sentence or phrase with embedded template variables. Template variables are place holders for terms which change or vary. In the preferred embodiment template variables are identified by a leading % sign followed by the appropriate Lingua abbreviation (such as one of those shown in FIG. 3). Thus, the template variable for a menu name is %MNU.

A brief discussion of the invention as it applies to the template strings will help illustrate the usefulness of template strings. Assume a first phrase "Choose Open from the File menu" as well as a second phrase "Choose Convert Table to Text from the Table menu" are commonly occurring phrases in the source language documents to be processed by the system 200. Through the use of template strings with embedded template variables, the system 200 can provide machine assistance in translating these phrases to the target language.

For example, the user creates the template string for these commonly occurring phrases by first determining that the words "Choose from the" are common to both of the phrases. Next, the user determines that the word "Open" from the first phrase and the words "Convert Table to Text" from the second phrase are classified as commands (%COM) in the Lingua classification system. Then, the user determines that the word "File" in the first phrase and the word "Table" in the second phrase are classified as menu names (%MNU) in the Lingua classification system. After making these determinations, the user invokes the spreadsheet program 210 and stores the following data in the product glossary 212:

TABLE I

| SOURCE TERM | CATEGORY | TARGET TERM |
| --- | --- | --- |
| Choose % COM from the % MNU | TEM | Wählen Sie den Befehl % COM aus dem Menü % MNU |
| Convert Table to Text | COM | Tabelle in Text Umwandeln |
| Table | MNU | Tabelle |
| Open | COM | Öffnen |
| File | MNU | Datei |

When the system 200 processes the source language document 202 for translation, the system 200 will recognize the phrase "Choose Open from the File menu" as well as the phrase "Choose Convert Table to Text from the Table menu" because both phrases match the template string set forth in Table 1. Upon recognition of either phrase, the system 200 provides easy access to a translation for the phrase, using the target term associated with the template string stored in Table 1. The process used by the system 200 to provide such easy access to the translation for each phrase is described in more detail below.

Returning to the discussion of how to create the preferred product glossary 212 using the spreadsheet program 210, the user invokes the spreadsheet program 210 and stores appropriate data in the product glossary 212. The user of the system 200 then invokes a product glossary sorter 222 of the translation assister 208 to sort the data in the product glossary 212. In the preferred embodiment, the product glossary sorter 222 performs the steps of the method SortProductGlossary (set forth in more detail below in FIG. 5). The product glossary sorter 222 retrieves all source terms 214 which are template strings and sorts the template strings according to length, with the longest source term 214 being stored in the product glossary 212 before the shortest source term.

For template strings which are of equal length, the product glossary sorter 222 invokes a product glossary alphabetizer 224 which alphabetizes the template strings which are of equal length. Any well-known alphabetizing program can be used to implement the product glossary alphabetizer 224.

Next, the product glossary sorter 222 sorts by length all source terms 214 which are not template strings. Then the product glossary alphabetizer 224 case-sensitively alphabetizes the non-template strings which are of equal length. In this way upper case versions of a letter are sorted above lowercase versions of the letter.

After the product glossary alphabetizer sorter 224 properly sorts the <source term 214, target term 218, category 216> tuples of the product glossary 212, the user invokes a source language document preparer 226 of the translation assister 208 which prepares the source language document 202 for translation by the user of the system 200. In the preferred embodiment, the source language document preparer 226 performs the steps of the function PrepareDocumentForTranslation set forth in more detail below and shown in FIG. 6.

To prepare the source language document 202 in a manner to assist the user in translating the source language document 202 into the target language document 206, the source language document preparer 226 invokes a tag paragraph program 228, a comparer 230, and a translation handle generator 232.

The tag paragraph program 228 creates a paragraph tag, which uniquely identifies a paragraph within the source language document 202, for each paragraph in the source language document. In the preferred embodiment, the tag paragraph program 228 performs the steps of the function TagEachParagraph set forth in more detail below and shown in FIG. 7.

The source language document preparer 226 then invokes the comparer 230. In the preferred embodiment, the comparer 230 performs the steps of the function SearchForMatch set forth in more detail below and shown in FIGS. 8A–8C. The comparer 230 compares each source term 214 in the product glossary 212 with the source terms 203 in the source language document 202. For each "match" between one of the given source terms 214 in the product glossary 212 and one of the source terms 203 in the source language document 202, the source language document preparer 226 invokes the translation handle generator 232.

The translation handle generator 232 associates the matched source term 203 with the target term 218 which translates the source term 203 into the target language. In the preferred embodiment, the translation handle generator 232 performs the steps of the function GenerateTranslationHandle set forth in more detail below and shown in FIG. 9.

The translation handle generator 232 first underlines the matched source term 203 so as to make the matched source term 203 easier to locate when displayed on a display device 234 than unaltered source terms. The translation handle generator 232 then inserts a translation handle in the form of a superscript character (not shown) immediately after the underlined source term 203 (e.g., the letter J).

For example, if the source language document 202 contains the phrase "Finding Text in a Document" and the product glossary 212 contains the source term "Document", then the comparer 230 will find a "match" between the source term "Document" in the source language document 202 and the source term "Document" in the product glossary 212. The translation handle generator 232 will then alter the appearance of the phrase "Finding Text in a Document" so that it appears as "Finding Text in a Document$^J$". Returning to the discussion of the translation handle generator 232, the translation handle generator 232 stores in an index file 248 a paragraph tag 250, a translation handle 252, a source term 254, and a target term 256. The paragraph tag 250 identifies the paragraph which contains the underlined source term 203. The translation handle 252 corresponds to the superscript character inserted after the underlined source term 203. The source term 254 corresponds to the underlined source term 203. The target term 256 corresponds to the target term 218 from the product glossary 212 which translates the underlined source term 203 into the target language.

In this way, the translation generator 232 associates the translation handle 252 with the target term 256 which translates the source term 254 into the target language. This association allows a user of the system 200 to retrieve and insert the target term 256 merely by invoking an insert target term command containing the appropriate translation handle 252.

Thus the translation handle generator 232 does not typically insert a target term 256 directly in place of a matched source term 203 because such an insertion only saves time if it happens to occur at the beginning or the end of a source language sentence in the source language document 202, and if the syntax of an equivalent target language sentence is the same as that of the source language sentence 258. By associating the translation handle 252 with the target term 256 in the index file 248 the present invention provides access to translations which the user inserts when and where they are needed in the source language sentence through the use of insert target term commands.

Once the source language document 202 has been prepared by the source language document preparer 226, the user translates the source language document 202 into the target language document 206 using a translation inserter 236, a translation paragraph creater 238, a character changer 240, and a translation remover 242, all of which will be discussed in more detail below in connection with the translation assister 208.

Figure 10:
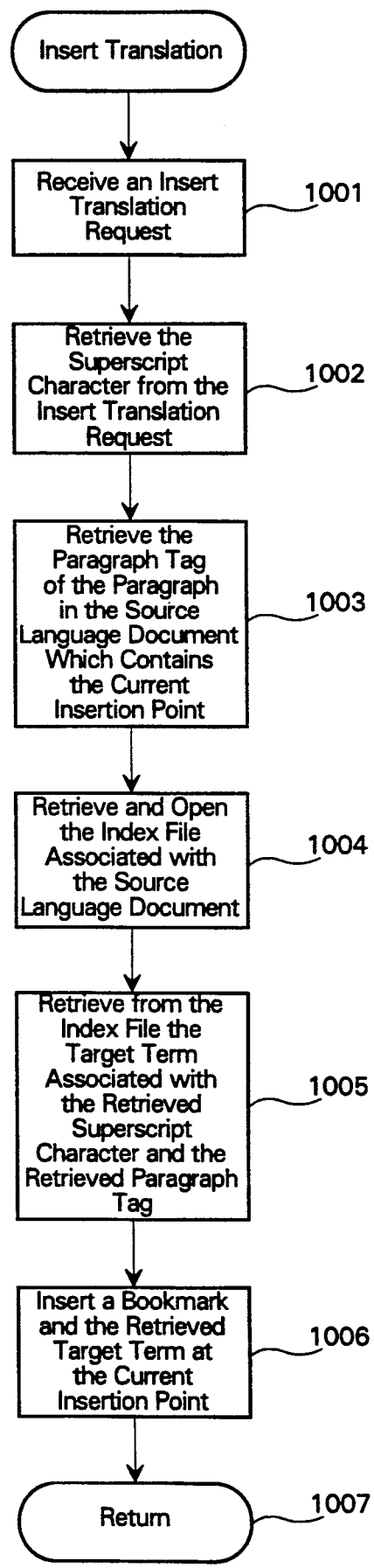
FIG. 10 is a flow diagram of the function InsertTranslation the system of FIG. 2.

First, the user invokes the word processing program 204 to display source terms 235 in the prepared source language document 202 on the display device 234. The source terms 235 on the display device 234 correspond to the source terms 203 of the source language document 202 stored in the computer memory 209. When the user determines that the target term 256 associated with the translation handle 252 should be inserted at a current insertion point displayed on the display device 234, then the user invokes the insert target term command using the keyboard 207 or the mouse 205. The insert target term command automatically invokes the translation inserter 236. In the preferred embodiment, the insert target term command consists of the simultaneous depression using the keyboard 207 of a CTRL key (not shown), a SHIFT key (not shown) and a keyboard 207 letter key (not shown) associated with the translation handle 252. The process by which the system 200 carries out the insert target term command is set forth in more detail below and is shown in FIG. 10.

In response to the insert target term command, the translation inserter 236 retrieves the target term 256 from the index file 248 which is associated with the superscript character contained in the insert target term command and the paragraph which currently contains the insertion point, and inserts the target term 256 at the current insertion point on the display device 234. In the preferred embodiment, the translation inserter 236 performs the steps of the function InsertTranslation set forth in more detail below and shown in FIG. 10.

The present invention also allows the user to insert target terms 256 in a separate translation paragraph (not shown) or in the source language sentence 237, on the display screen 234, to be translated. To insert target terms 256 in the source language sentence 237, the user merely invokes the insert mode of the word processing program 204. Typically this involves depressing an insert key on the keyboard 255. As target terms 256 are inserted in the source language sentence 237, the source terms 235 in the source language sentence 237 change position on the display device 234 to provide space in which to insert the target terms 256.

To insert target terms 256 in a translation paragraph, the user enters a create translation paragraph command, which invokes the translation paragraph creater 238 of the translation assister 208. In the preferred embodiment, the translation paragraph creater 238 performs the steps of the function TranslationParagraph set forth in more detail below and shown in FIG. 13. The advantage to the user of inserting target terms 256 in the separate translation paragraph is that the source terms 235 on the display device 234 remain stationary during translation because they are in a separate paragraph.

The present invention also provides the character changer 240 which toggles the first character of the last target term 256 inserted with the insert target term command on the display device 234. In other words, if the first letter of the last inserted target term 256 is a lower case letter, then the character changer 240 replaces the lowercase letter with an uppercase version of the letter. Likewise, if the first letter of the target term 256 is an uppercase character, then the character changer 240 replaces the uppercase letter with a lowercase version of the uppercase letter. In the preferred embodiment, the character changer 240 performs the steps of the function ToggleFirstCharacter set forth in more detail below and shown in FIG. 11.

The translation remover 242 of the translation assister 208 deletes the last target term 256 inserted on the display device 234 along with any text entered on the display device 234 between the last target term 256 and the current position of the insertion point. In the preferred embodiment, the translation remover 242 performs the steps of the function UndoTranslation set forth in more detail below and shown in FIG. 12.

Flow Diagrams

Figure 4:
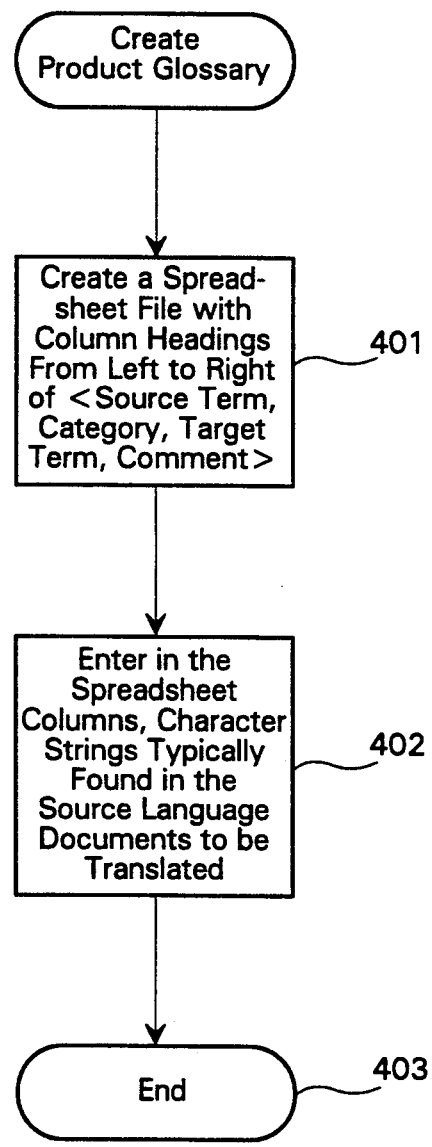
FIG. 4 is a flow diagram of the function CreateProductGlossary for the system of FIG. 2.

FIG. 4 is a flow diagram of the function CreateProductGlossary which sets forth the manual steps performed by the user to create the product glossary 212 of FIG. 2. In the preferred embodiment, the function CreateProductGlossary is performed using the spreadsheet program 210 (FIG. 2). In step 401 of FIG. 4, the function CreateProductGlossary creates a spreadsheet file with column headings, from left to right, of <source term, category, target term, comment>. In step 402, the function enters in the spreadsheet columns, the character strings typically found in the source language documents to be translated. In step 403, the function CreateProductGlossary ends processing.

Figure 5:
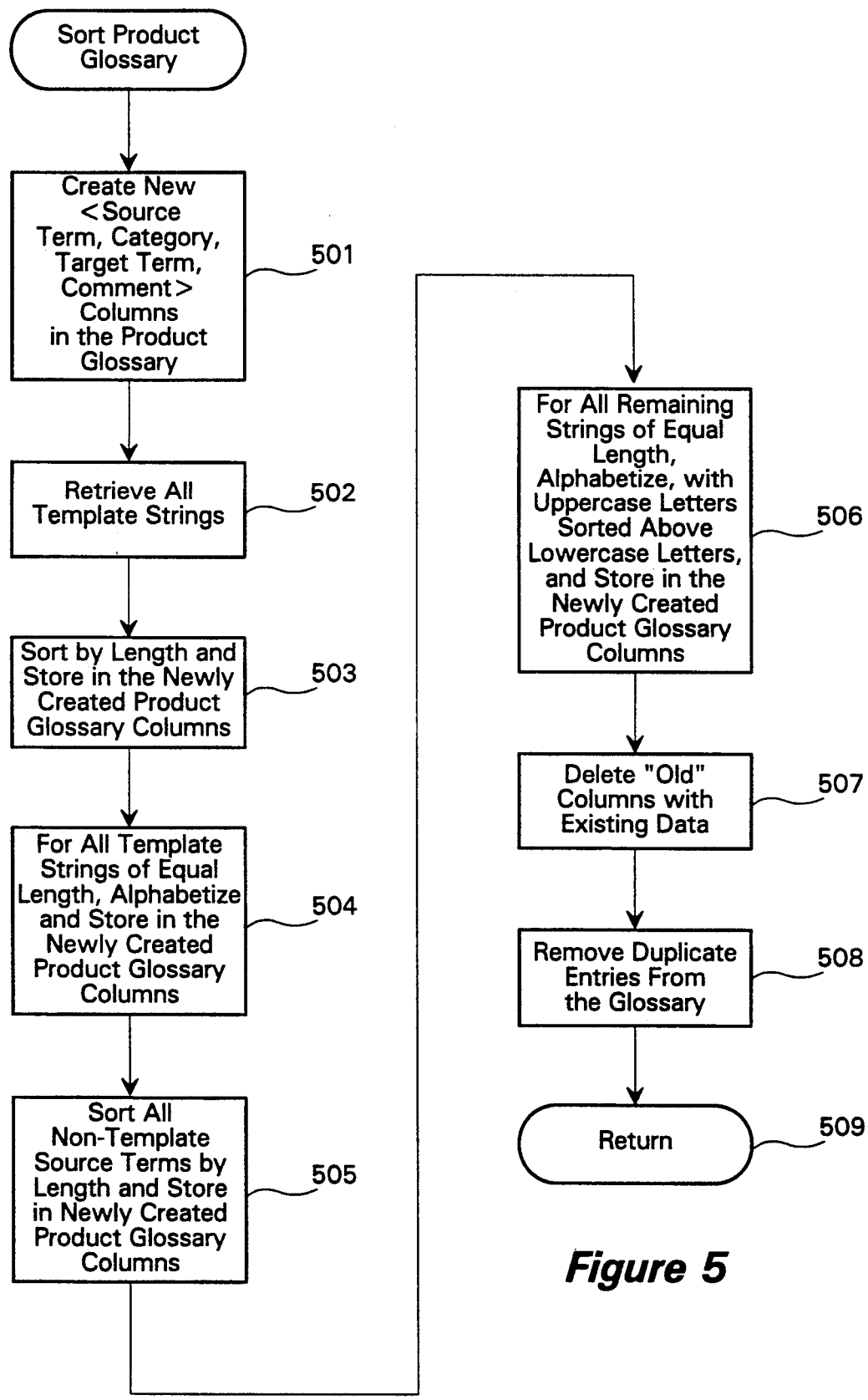
FIG. 5 is a flow diagram of the function SortProductGlossary for the system of FIG. 2.

FIG. 5 is a flow diagram of the function SortProductGlossary which sorts the product glossary 212 according to the length of the source terms 214. In the preferred embodiment, the function SortProductGlossary is performed by the product glossary sorter 222 and the product glossary alphabetizer 224 (FIG. 2). For all source terms 214 of equal length, the function case-sensitively alphabetizes the source terms 214.

In step 501 of FIG. 5 the function creates four new column headings in the product glossary 212. The new column headings are <source term, category, target term, comment>. In step 502, the function retrieves all source terms 214 from the previously existing columns of data in the product glossary 212 which are template strings. In step 503, the function sorts all retrieved template strings by length, with the longest template strings sorted to the top of the file and above the shortest template strings. The function stores the sorted templawe strings in the new spreadsheet columns. In step 504, the function alphabetizes, in the new columns of the product glossary 212, all template strings of equal length.

In step 505, the function sorts by length, all source terms 214 which are not template strings. In step 506, for all non-template source terms 214 of equal length, the function case-sensitively alphabetizes the non-template source terms 214, such that uppercase letters are sorted above lowercase letters in the product glossary 212. In step 507, the function deletes the "old" spreadsheet columns where the original data was stored. In step 508, the function SortProductGlossary removes all duplicate entries from the product glossary 212. In step 509, the function SortProductGlossary returns processing control to the word processing program 204 (FIG. 2).

Figure 6:
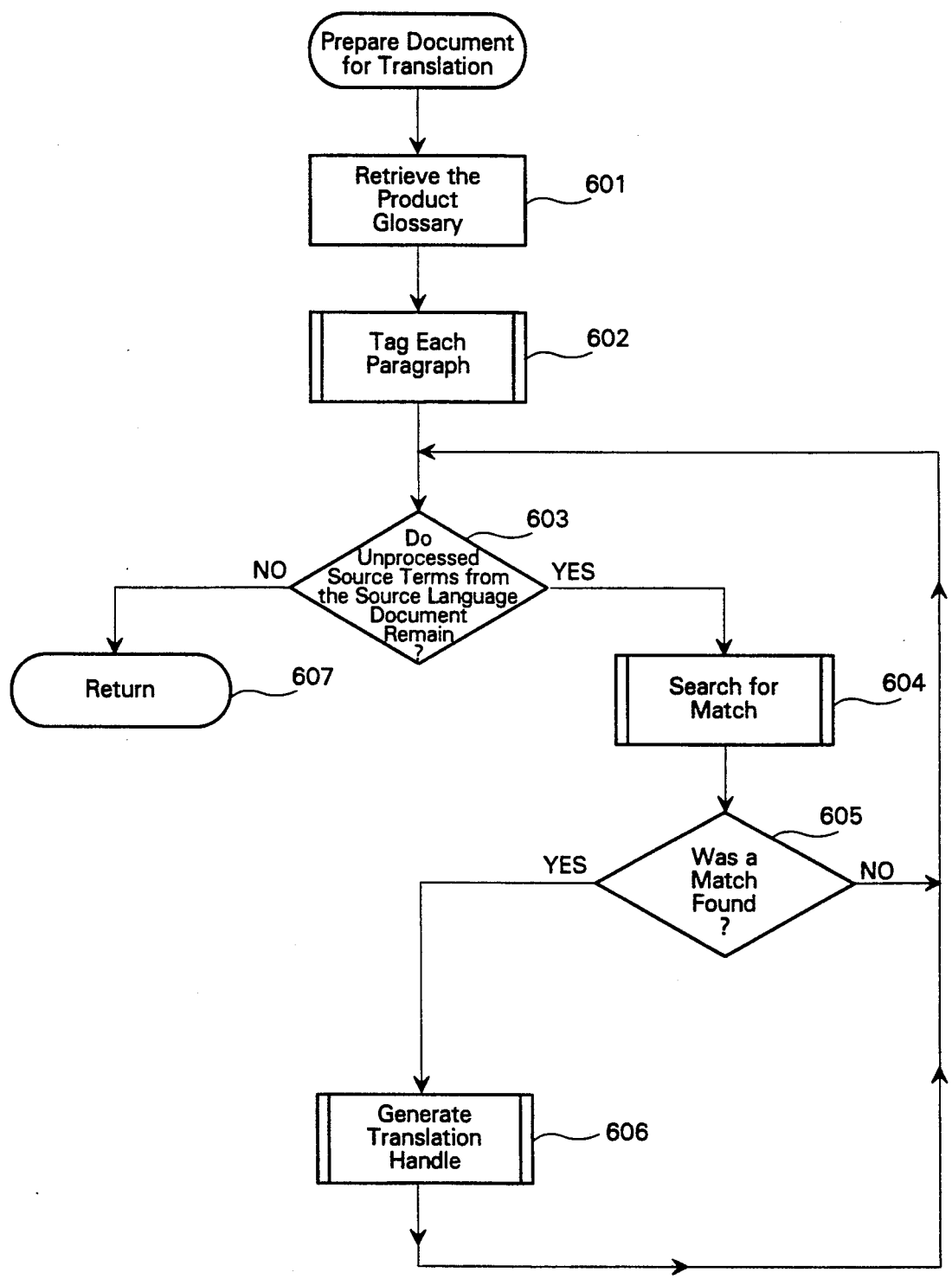
FIG. 6 is a flow diagram of the function PrepareDocumentForTranslation for the system of FIG. 2.

FIG. 6 is a flow diagram of the function PrepareDocumentForTranslation which underlines and assigns a translation handle to each source term 203 of the source language document 202 which has a corresponding source term 214 in the product glossary 212. In the preferred embodiment, the function PrepareDocumentForTranslation is performed by the source language document preparer 226 (FIG. 2).

In step 601 of FIG. 6, the function retrieves the product glossary 212. In step 602, the function PrepareDocumentForTranslation calls the function TagEachParagraph, which creates a paragraph tag for each paragraph in the source language document 202, that uniquely identifies that paragraph. The function TagEachParagraph is set forth in more detail below and shown in FIG. 7.

In step 603, the function determines whether unprocessed source terms 203 from the source language document 202 still remain. If unprocessed source terms 203 do still remain then the function performs steps 604 through 606. In step 604, the function PrepareDocumentForTranslation calls the program SearchForMatch which compares the source term 203 from the source language document 202 with each source term 214 in the product glossary 212, while looking for a match between the source terms. The function SearchForMatch is set forth in more detail below and shown in FIGS. 8A, 8B, and 8C.

In step 605 the function PrepareDocumentForTranslation determines if a match was found by the function SearchForMatch, between the source term 203 and one of the source terms 214 of the product glossary 212. If no match was found then the function PrepareDocumentForTranslation continues processing with step 603.

If a match was found between the source term 203 and one of the source terms 214 of the product glossary 212, then the function PrepareDocumentForTranslation calls the function GenerateTranslationHandle, in step 606. The function GenerateTranslationHandle underlines the matched source term 205, assigns a translation handle to the matched source term 203, and associates the translation handle with the target term from the target language which translates the source term 203 into the target language. The function GenerateTranslationHandle is set forth in more detail below and shown in FIG. 9. Upon completion of step 606, the function PrepareDocumentForTranslation continues processing by returning to step 603.

Returning to the discussion of step 603, if all source terms 203 from the source language document 202 have been processed, then in step 607 the function PrepareDocumentForTranslation returns processing control to the word processing program 204 (FIG. 2).

Figure 7:
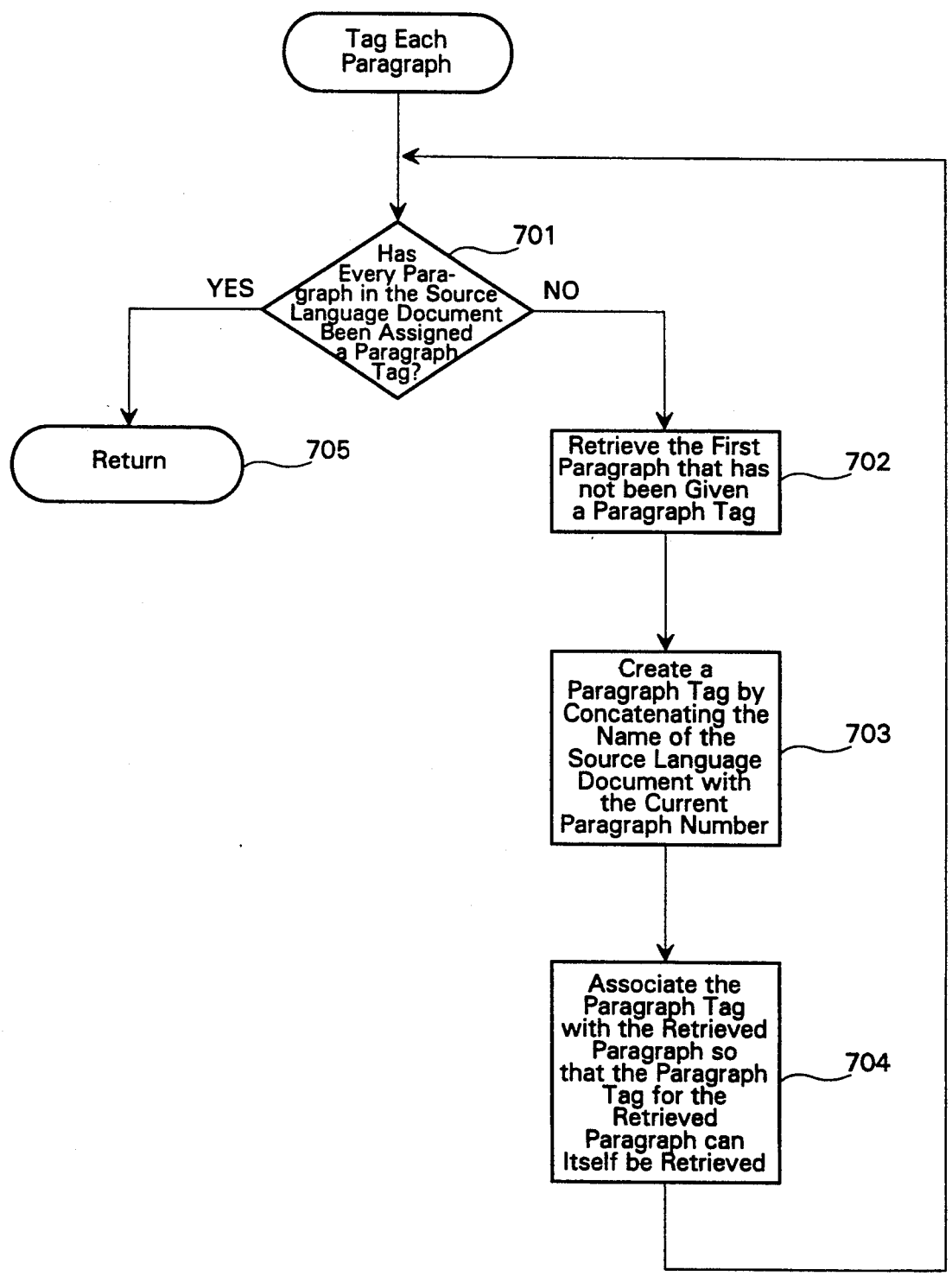
FIG. 7 is a flow diagram of the function TagEachParagraph for the system of FIG. 2.

FIG. 7 is a flow diagram of the function TagEachParagraph which associates a paragraph tag, uniquely identifying each paragraph in the source language document 202, with a given paragraph. In the preferred embodiment, the function TagEachParagraph is performed by the paragraph marker 228 (FIG. 2).

In step 701 of FIG. 7 the function TagEachParagraph determines whether every paragraph in the source language document 202 has been assigned a paragraph tag. If paragraphs remain in the source language document 202 which have not been assigned a paragraph tag, then the function TagEachParagraph continues processing with steps 702-704. In step 702 the function TagEachParagraph retrieves the first paragraph in the source language document 202 that has not been assigned a paragraph tag. In step 703 the function creates a paragraph tag by concatenating the name of the source language document 202 with a current paragraph number. The function assigns paragraph numbers sequentially from a first paragraph in the source language document 202 to a last paragraph in the source language document. In step 704 the function TagEachParagraph associates the paragraph tag with the retrieved paragraph. In a preferred embodiment the paragraph tag is implemented as a paragraph mark in Microsoft Word Version 2.0. Paragraph tags are described in more detail in the "Word for Windows 2.0 User's Guide", Chapter 40, and "Using Work Basic", both of which are incorporated herein by reference. Upon completion of step 704, the function continues processing with step 701.

Returning to the discussion of step 701, if the function TagEachParagraph determines that every paragraph in the source language document 202 has been assigned a paragraph tag, then the function TagEachParagraph returns processing control to the function PrepareDocumentForTranslation.

Figure 8A:
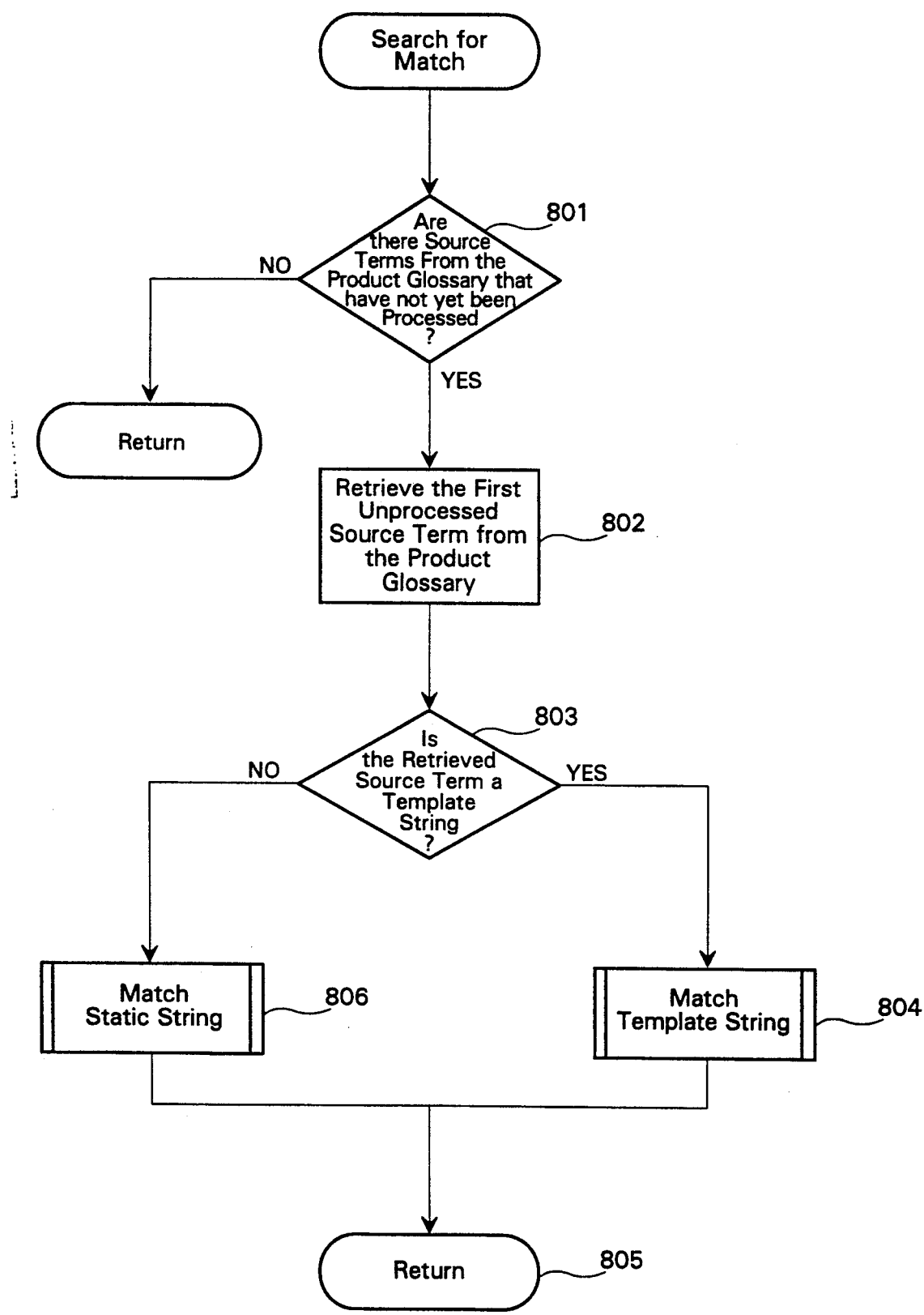
FIG. 8A is a flow diagram of the function SearchForMatch for the system of FIG. 2.

FIG. 8A is a block diagram of the function SearchForMatch which determines whether a match exists between the source terms 214 from the product glossary 212 and any of the source terms 203 from the source language document 202. In the preferred embodiment the function SearchForMatch is performed by the comparer 230 (FIG. 2).

In step 801 of FIG. 8A the function determines if there are source terms 214 from the product glossary 212 that have not yet been processed. If at least one unprocessed source term 214 remains in the product glossary 212 then in step 802 the function retrieves the first unprocessed source term 214 from the product glossary 212. In step 803 the function determines whether the retrieved source term 214 is a template string. If the retrieved source term 214 is a template string then in step 804 the function SearchForMatch calls the function MatchTemplateString. Upon completion of step 804 the function SearchForMatch returns processing control to the function PrepareDocumentForTranslation (FIG. 6). The function MatchTemplateString is set forth in more detail below and is shown in FIG. 8C.

Returning to the discussion of step 803, if the retrieved source term 214 is not a template string then the function SearchForMatch, in step 806, calls the function MatchStaticString set forth in more detail below and shown in FIG. 8B. Upon completion of step 806 the function SearchForMatch returns processing control to the function PrepareDocumentForTranslation (FIG. 6).

Figure 8B:
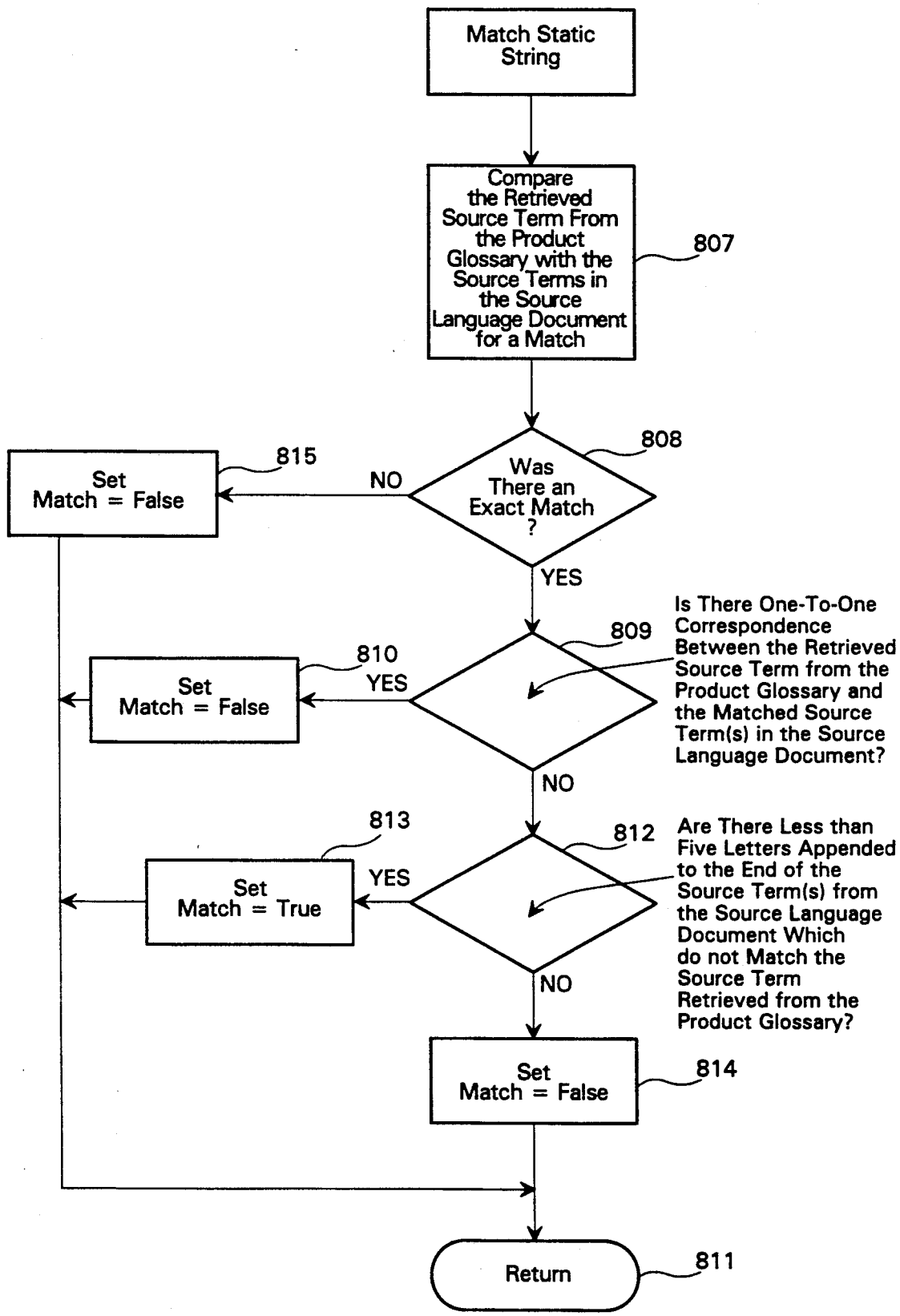
FIG. 8B is a flow diagram of the function MatchStaticString for the system of FIG. 2.
Figure 8C:
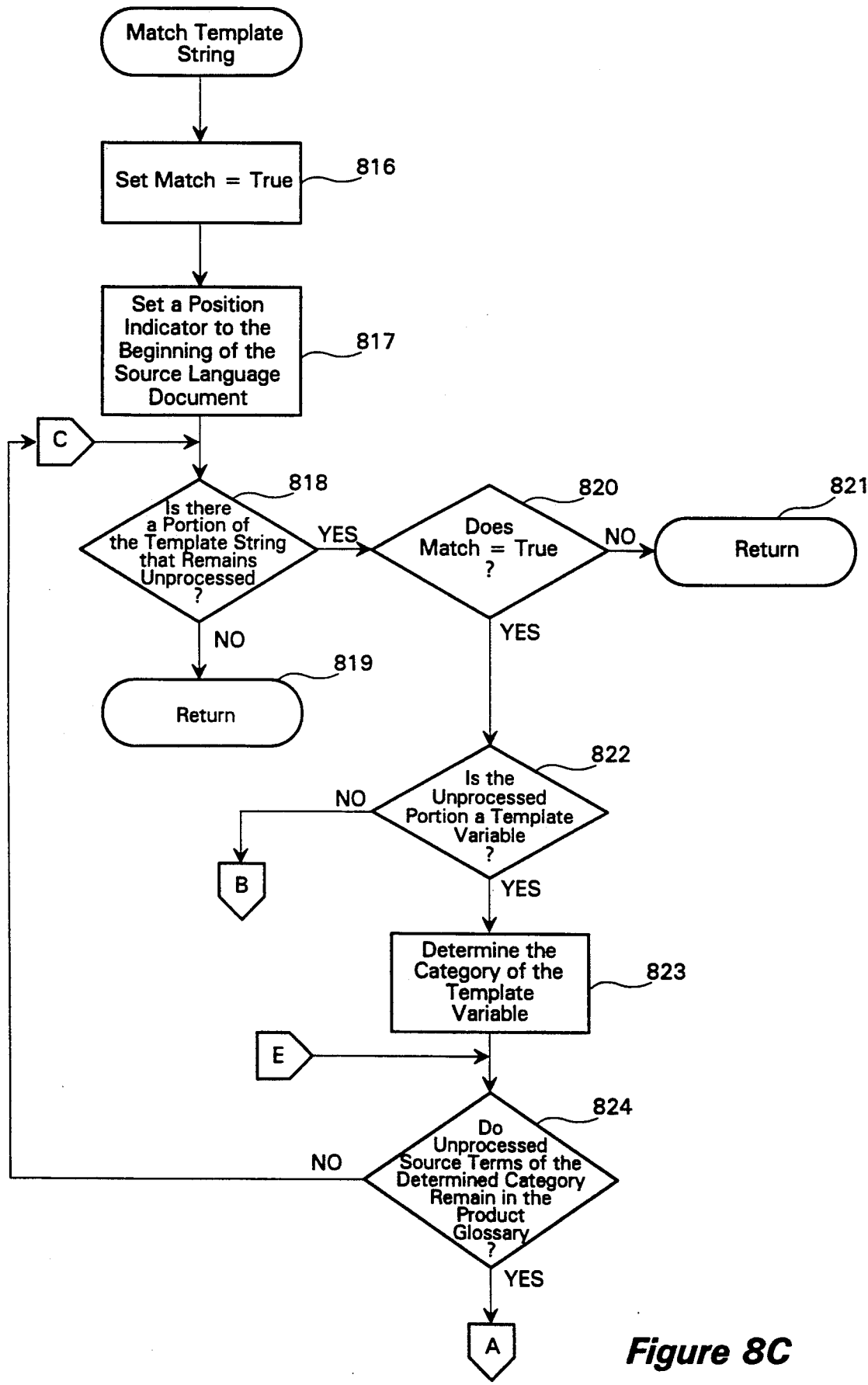
FIG. 8C is a flow diagram of the function MatchTemplateString for the system of FIG. 2.
Figure 8C:
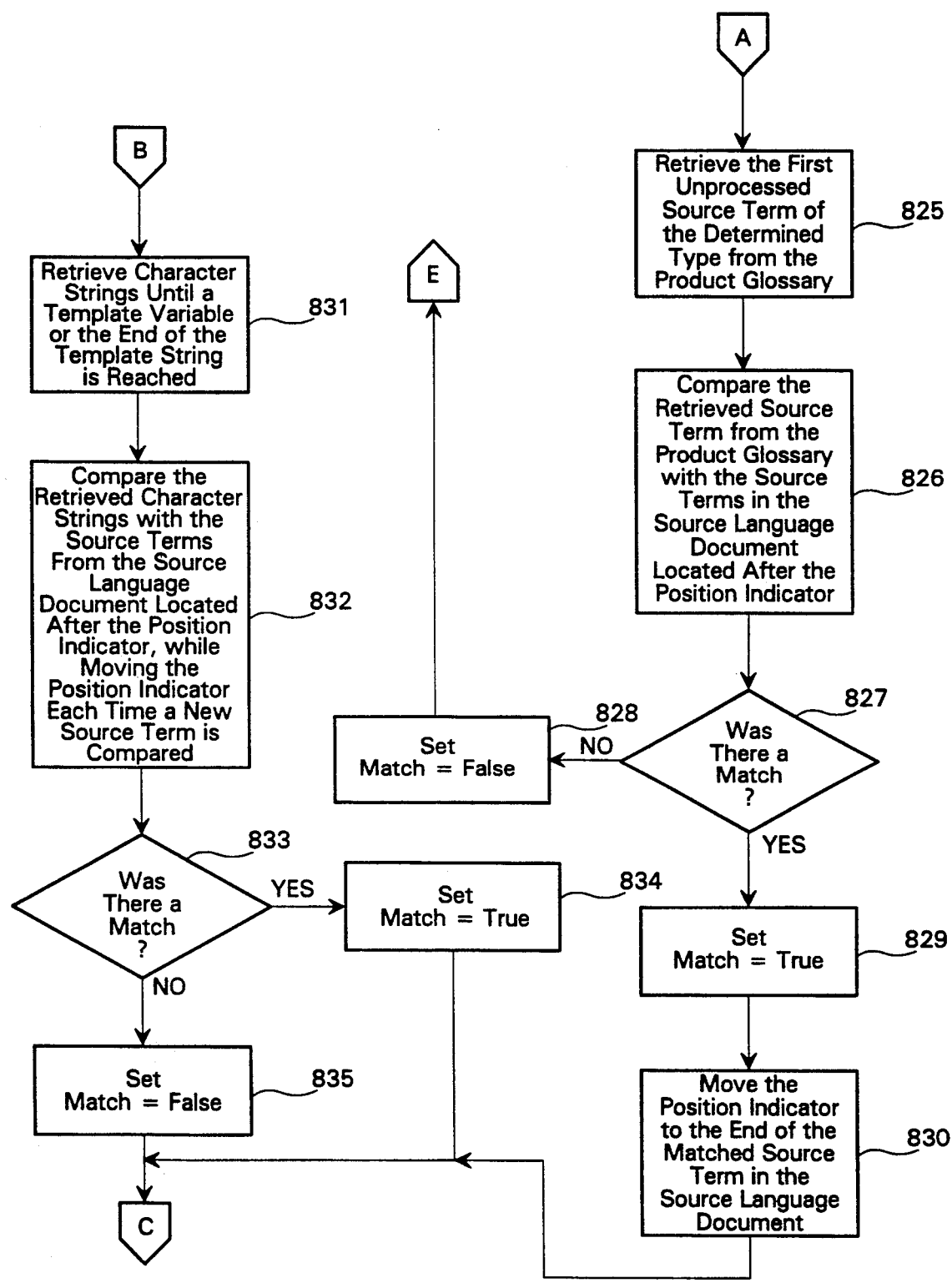

FIG. 8B is a flow diagram of the function MatchStaticString which compares non-template source terms 214 retrieved from the product glossary 212 with the source terms 203 and the source language document 202. In the preferred embodiment the comparer 230 (FIG. 2) performs the steps of the function MatchStaticString.

In step 807 of FIG. 8B the function MatchStaticString compares the retrieved source term 214 from the product glossary 212 with the source terms 203 in the source language document 202. In step 808 the function determines whether there is a match between the retrieved source term 214 from the product glossary 212 and at least one of the source terms 203 from the source language document 202. If there was a match then processing continues with steps 809-814. In step 809 the function determines if there is a one-to-one correspondence between the retrieved source term 214 from the product glossary 212 and the matched source terms 203 in the source language document 202. If a one-to-one correspondence exists then in step 810 the function assigns the value true to the boolean variable match. In step 811 the function MatchStaticString returns processing control to the function SearchForMatch (FIG. 8A).

Returning to the discussion of step 809, if the function determines that there is not a one-to-one correspondence then in step 812 the function determines if there are less than five letters appended to the end of the source terms 203 from the source language document 202 which do not match the source term 214 retrieved from the product glossary 212. If the "extra" letters are less than five, then in step 813, the function assigns the value true to the boolean variable match. Upon completion of step 813, the function MatchStaticString, in step 811, returns processing control to the function SearchForMatch (FIG. 8A).

Returning to the discussion of step 812, if the function determines that there are five or more letters appended to the end of the source term(s) 203 from the source language document 202, then in step 814, the function assigns the value false to the boolean variable match. Upon completion of step 814 the function MatchStaticString returns processing control, in step 811, to the function SearchForMatch (FIG. 8A).

Returning to the discussion of step 808, if there was not a match between the retrieved source term 214 from the product glossary 212 and any of the source terms 203 in the source language document 202 then the function, in step 815, assigns the value false to the boolean variable match. Upon completion of step 815 the function MatchStaticString, in step 811, returns processing control to the function SearchForMatch (FIG. 8A).

FIG. 8C is a flow diagram of the function MatchTemplateString which compares the template string retrieved from the product glossary 212 with the source terms 203 from the source language document 202. In the preferred embodiment the comparer 230 (FIG. 2) performs the steps of the function MatchTemplateString.

In step 816 of FIG. 8C the function assigns the value true to the boolean variable match. In step 817 the function assigns a position indicator to the beginning of the source language document 202. In step 818 the function determines if there is a portion of the template string that remains unprocessed. If the entire template string has been processed then in step 819 the function MatchTemplateString returns processing control to the function SearchForMatch (FIG. 8A).

If an unprocessed portion of the template string remains, then in step 820 the function MatchTemplateString determines if the variable match is currently set to true. If the variable match is currently set to false then in step 821 the function MatchTemplateString returns processing control to the function SearchForMatch (FIG. 8A).

Returning to the discussion of step 820, if the variable match is set to true then in step 822 the function MatchTemplateString determines if the unprocessed portion of the template string is a template variable. If the function determines that the unprocessed portion of the template string was a template variable then processing continues with steps 823 through 830.

In step 823 the function determines the category of the template variable. In step 824 the function determines whether unprocessed source terms 214 of the determined category type remain in the product glossary 212. If all source terms 214 of the determined category type have been processed then the function continues processing with step 818.

If unprocessed source terms 214 of the determined category type remain in the product glossary 212 then in step 825 the function retrieves the first unprocessed source term 214 of the determined category type from the product glossary 212. In step 826 the function compares the retrieved source term 214 from the product glossary 212 with the source term(s) 203 in the source language document 202 located after the position indicator. In step 827 the function determines whether there was a match. If there was not a match then in step 828 the function assigns the value false to the boolean variable match. Upon completion of step 828 processing continues with step 824.

Returning to the discussion of step 827, if the function determines that there was a match then in step 829 the function assigns the value true to the boolean variable match. In step 830 the function moves the position indicator to the end of the matched source term 203 in the source language document 202. Upon completion of step 830 processing continues with step 818.

Returning to the discussion of step 822, if the function determines that the unprocessed portion of the template string is not a template variable, then processing continues with steps 831-835. In step 831 the function retrieves character strings from the template string until a template variable is reached or until the end of the template string is reached. In step 832 the function compares the retrieved character strings with the source terms 203 from the source language document 202 located after the position indicator. During the process of comparing, the function, in step 832, moves the position indicator each time a new source term is compared.

In step 833 the function determines whether there was a match during the comparison performed in step 832. If there was a match then in step 834 the function assigns the value true to the boolean variable match. Upon completion of step 834 processing continues with step 818.

Returning to the discussion of step 833, if the function determines that there was not a match during the comparison performed in step 832, then in step 835 the function assigns the value false to the boolean variable match. Upon completion of step 835 processing continues with step 818.

Figure 9:
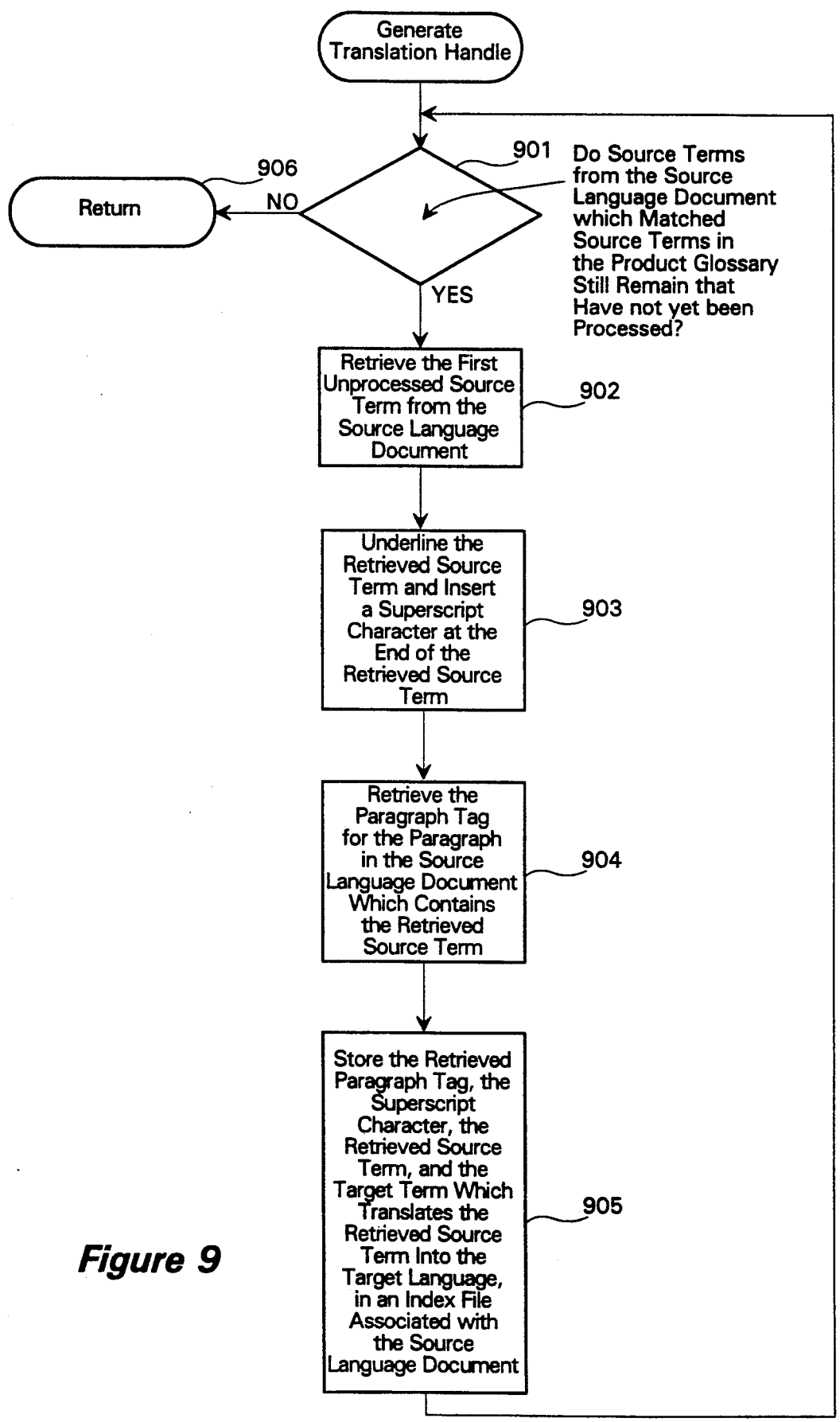
FIG. 9 is a flow diagram of the function GenerateTranslationHandle for the system of FIG. 2.

FIG. 9 is a flow diagram of the function GenerateTranslationHandle which associates a translation handle with the matched source term 203 from the source language document 202 and then associates the target term 218 from the product glossary 212, which translates the match source term 203 into the target language, with the translation handle. In the preferred embodiment the translation handle generator 232 (FIG. 2) performs the function GenerateTranslationHandle.

In step 901 of FIG. 9 the function determines if source terms 203 from the source language document 202, which matched the source terms 214 from the product glossary 212, still remain unprocessed. If unprocessed source terms 203 still remain then the function processes steps 902-905.

In step 902 the function GenerateTranslationHandle retrieves the first unprocessed source term 203 from the source language document 202. In step 903 the function underlines the retrieved source term 203 and inserts a translation handle in the form of a superscript character at the end of the retrieved source term 203. In the preferred embodiment, the superscript characters are cycled on a per paragraph basis. For example, assume the superscript characters J, K, L, ... are used as the translation handles for source terms 203. If three source terms 203 are to be assigned translation handles in a first paragraph, then the three source terms are assigned the superscript characters J, K, and L, respectively. If two source terms 203 in a second paragraph are to be assigned translation handles, then the superscript characters J and K are "cycled" and assigned to the two source terms 203 in the second paragraph.

In step 904 the function retrieves the paragraph tag for the paragraph in the source language document 202 which contains the retrieved source term 203. In step 905 the function stores the retrieved paragraph tag, the superscript character, the retrieved source term 203, and the target term 218, which translates the retrieved source term 203 into the target language, in an index file 248 associated with the source language document 202. Upon completion of step 905 processing continues with step 901.

Returning to the discussion of step 901, if the function determines that all source terms 203 from the source language document 202 have been processed, then in step 906 the function GenerationTranslationHandle returns processing control to the source language document preparer 226.

FIG. 10 is a flow diagram of the function InsertTranslation which inserts the target term 256 from the index file 248 associated with the source term 235 displayed on the display device 234. In the preferred embodiment, the translation inserter 236(FIG. 2) performs the function InsertTranslation.

In step 1001 of FIG. 10 the function receives an insert translation request. In a preferred equipment the insert translation request is performed by pressing a key combination on the keyboard 207 (FIG. 2) containing the translation handle in the form of the superscript character. In step 1002 the function retrieves the translation handle in the form of the superscript character from the received insert translation request. In step 1003 the function retrieves the paragraph tag from the paragraph in the source language document 202 which contains the current insertion point displayed on the display device 234. In step 1004 the function retrieves and opens the index file 248 associated with the source language document 202. In step 1005 the function retrieves from the index file 248 the target term 256 associated with the retrieved superscript character and the retrieved paragraph tag. In step 1006 the function InsertTranslation inserts both a bookmark and the retrieved target term 256 at the current insertion point on the display device 234. The bookmark marks a location in the source document 202. In step 1007 the function InsertTranslation returns processing control to the word processing program 204.

Figure 11:
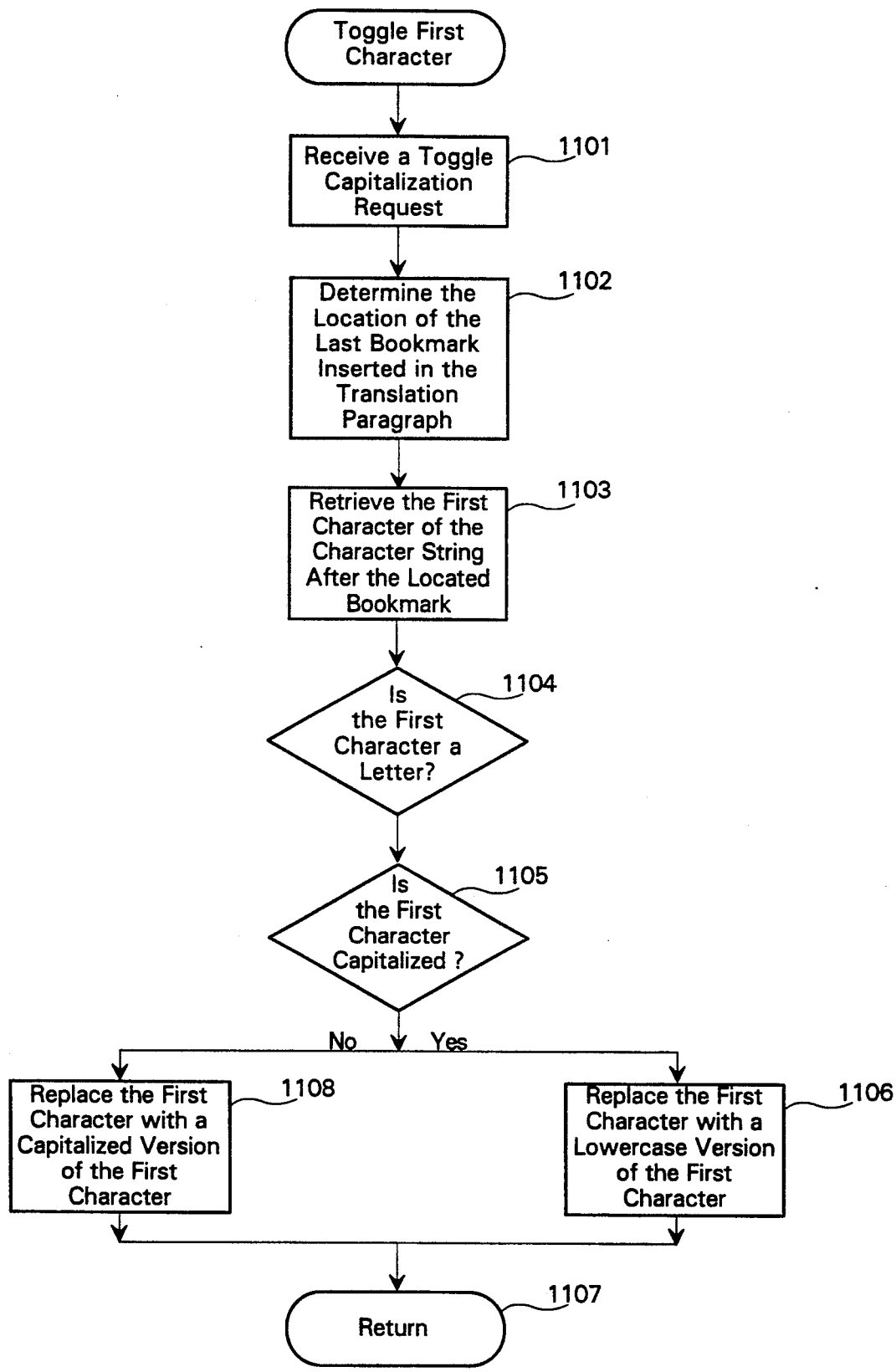
FIG. 11 is a flow diagram of the function ToggleFirstCharacter for the system of FIG. 2.

FIG. 11 is a flow diagram of the function ToggleFirstCharacter. In the preferred embodiment the character changer 240 (FIG. 2) implements the function ToggleFirstCharacter.

In step 1101 of FIG. 11 the function receives a toggle capitalization request. In step 1102 the function determines the location of the last bookmark inserted with an insert translation request in the source language document 202 on the display device 234. In step 1103 the function retrieves the first character of a character string after the bookmark. In step 1104 the function determines if the retrieved character is a letter. If the retrieved character is a letter then in step 1105 the function determines if the retrieved first character is capitalized. If the retrieved first character is capitalized then the function ToggleFirstCharacter replaces the first character with a lowercase version of the same character in step 1106. In step 1107 the function ToggleFirstCharacter returns processing control to the word processing program 204.

Returning to the discussion of step 1105, if the retrieved first character is not capitalized then in step 1108 the function replaces the first character with a capitalized version of the same character. In step 1107 the function ToggleFirstCharacter returns processing control to the word processing program 204.

Returning to the discussion of step 104, if the function determines that the retrieved character is not a letter then in step 1107 the function ToggleFirstCharacter returns processing control to the word processing program 204.

Figure 12:
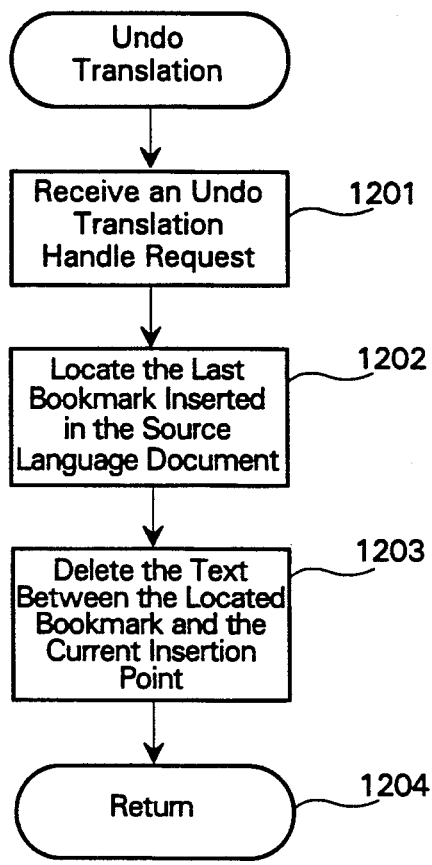
FIG. 12 is a flow diagram of the function UndoTranslation for the system of FIG. 2.

FIG. 12 is a flow diagram of the function UndoTranslation which deletes the last target term 256 inserted in the source language document 202 on the display device 234. In the preferred embodiment, the translation remover 242 performs the function UndoTranslation.

In step 1201 of FIG. 12 the function receives an undo translation handle request. In step 1202 the function locates the last bookmark inserted in the source language document 202 with an insert translation request. In step 1203 the function deletes all source terms 235 from the display device 234 stored between the located bookmark and the current insertion point on the display device 234. In step 1204 the function UndoTranslation returns to the word processing program 204.

Figure 13:
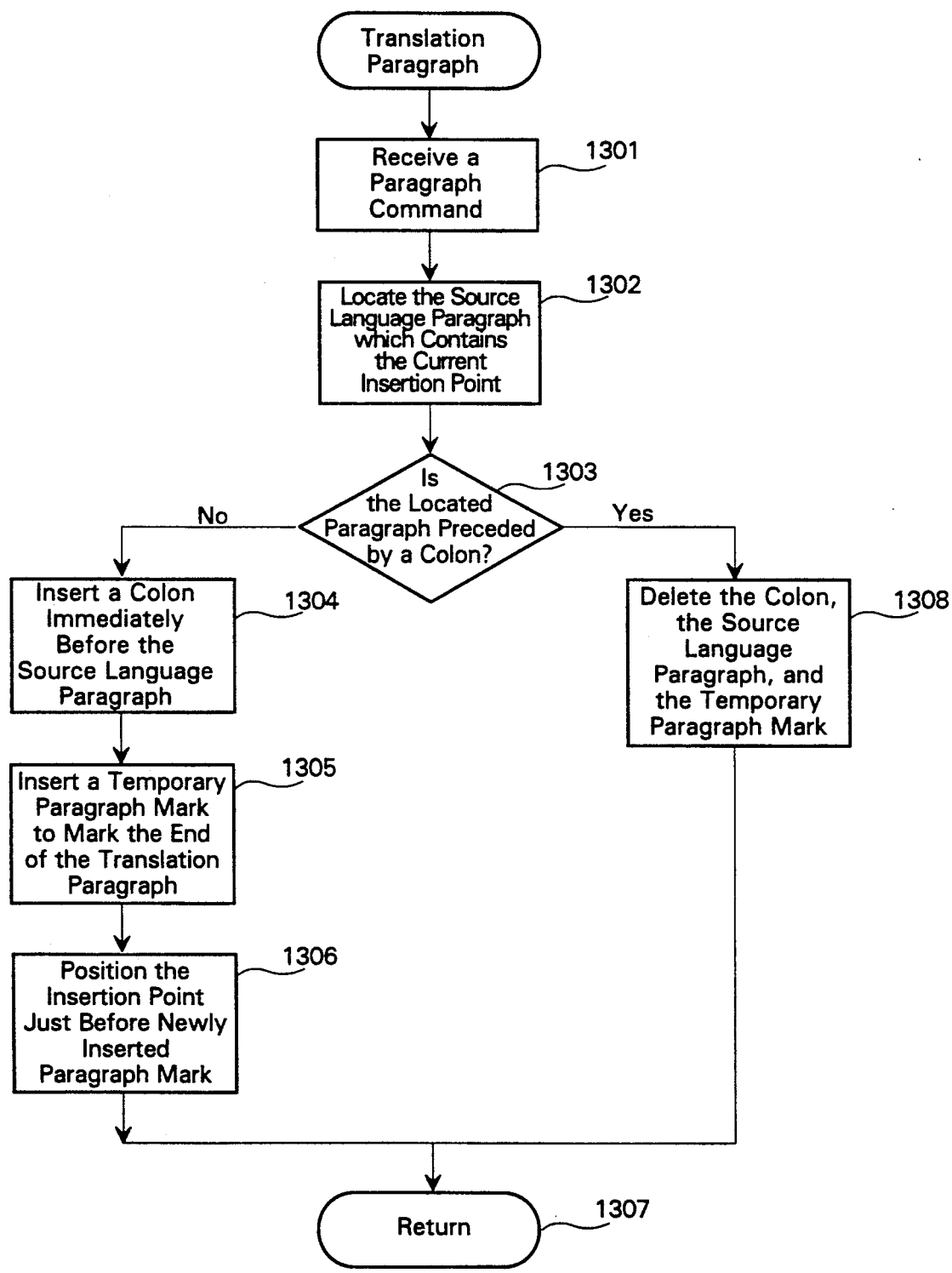
FIG. 13 is a flow diagram of the function CreateTranslationParagraph for the system of FIG. 2.

FIG. 13 is a flow diagram of the function TranslationParagraph which either creates a new translation paragraph on the display device 234 in which to translate a source language sentence 237 or which deletes a paragraph which contains source terms 235 that have been translated. In the preferred embodiment the translation paragraph creator 238 (FIG. 2) performs the steps of the function TranslationParagraph.

In step 1301 of FIG. 13 the function receives a paragraph command. In step 1302 the function locates the source language paragraph in the source language document 202 displayed on the display device 234 which contains the current insertion point. In step 1303 the function determines if the located paragraph is preceded by a colon. If the function determines that the paragraph is not preceded by the colon then in step 1304 the function inserts a colon immediately before the source language paragraph 237 displayed on the display device 234. In step 1305 the function inserts a temporary paragraph mark to mark the end of the translation paragraph. In step 1306 the function positions the insertion point just before the temporary paragraph mark. In step 1307 the function TranslationParagraph returns processing control to the translation assister 208 (FIG. 2).

Returning to the discussion of step 1303, if the function determines that the located paragraph is preceded by a colon, then in step 1308 the function deletes the colon, the source language paragraph immediately following the colon, and the temporary paragraph mark. Upon completion of step 1308, the function TranslationParagraph returns processing control to the translation assister 208 (FIG. 2).

Specific Example

Figure 20A:
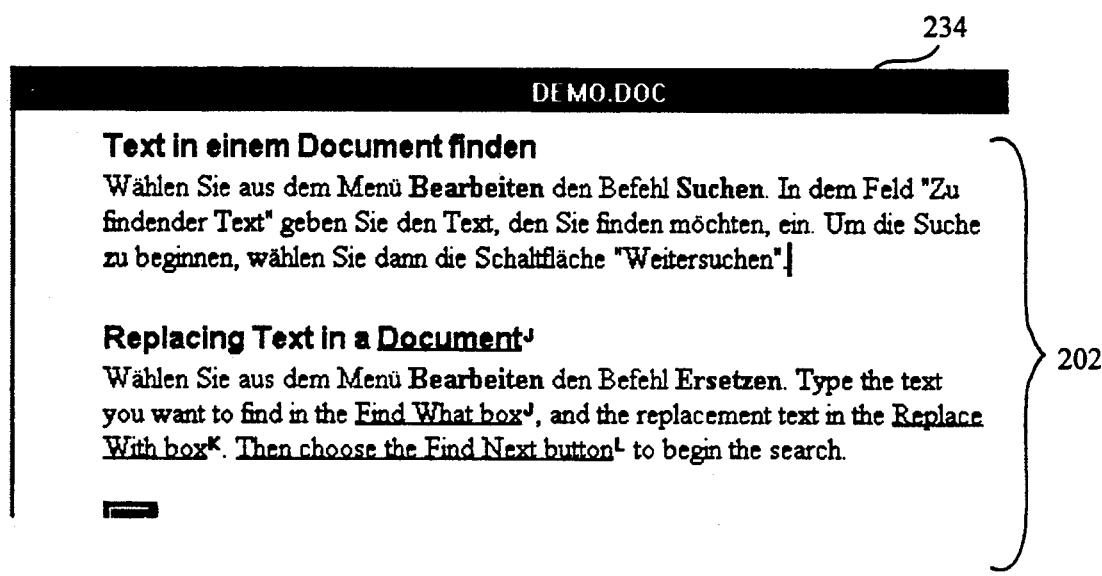
FIG. 20A is a block diagram of the source language document after a source language paragraph has been deleted by the command.
Figure 20B:
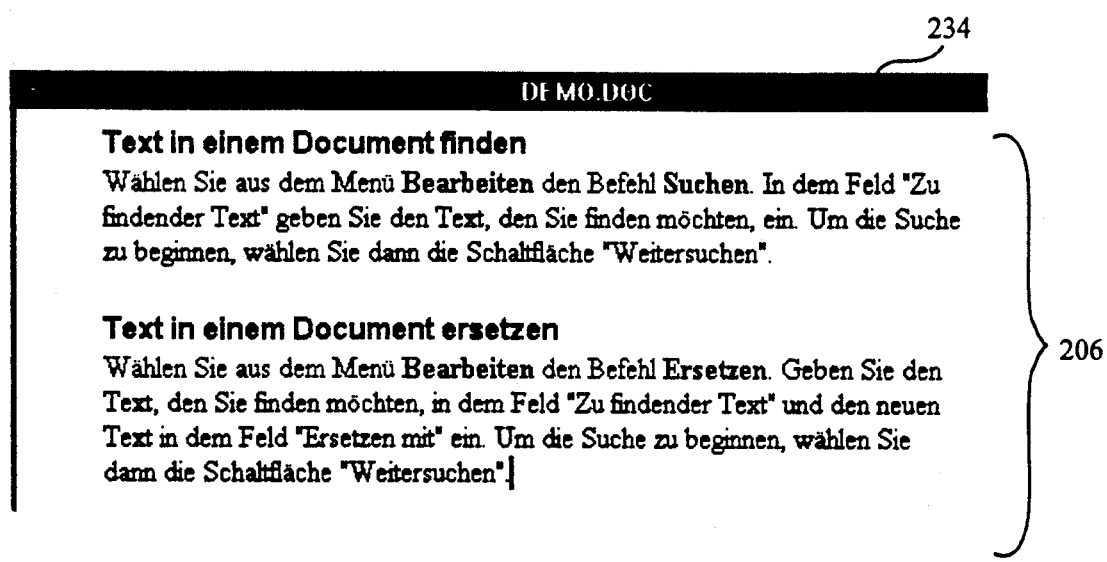
FIG. 20B is a block diagram of the target language document created after the source language document has been fully translated using the system of FIG. 2.
Figure 21:
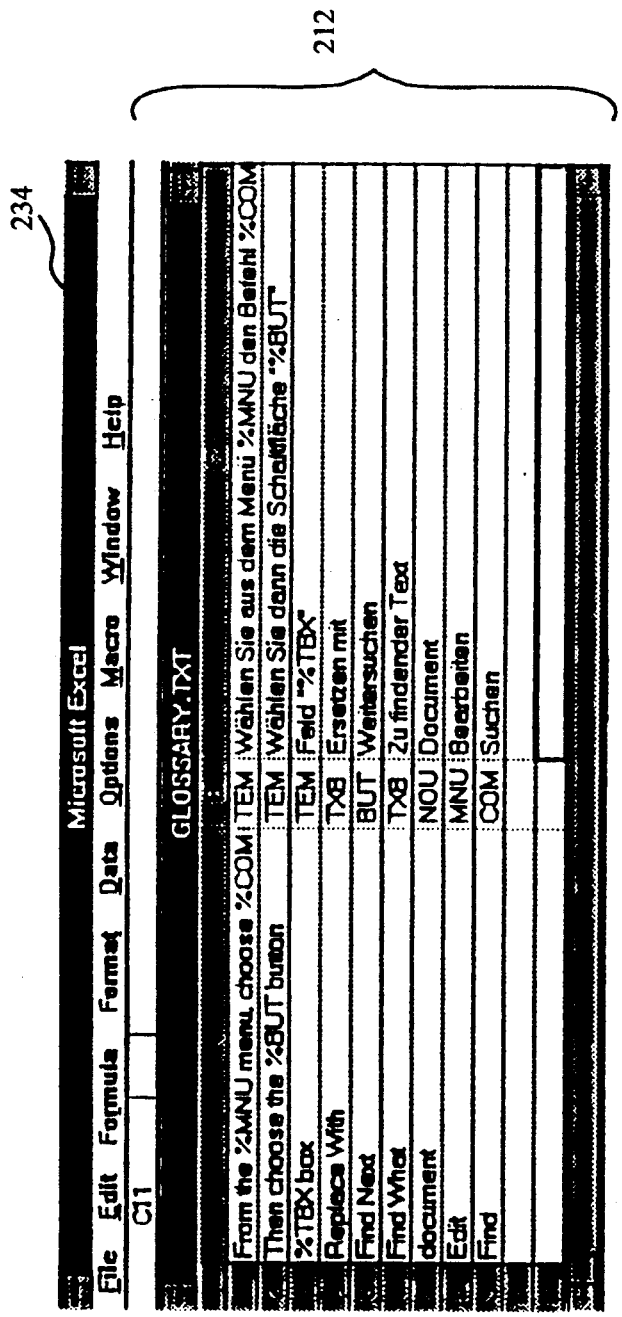
FIG. 21 is a block diagram of a product glossary for the of FIG. 2 used to implement the translations depicted in FIGS. 14A-20B.

A specific example using FIGS. 14-21 will help illustrate the preferred function of translating the source language document 202 (FIG. 2) to the target language document 206. FIGS. 14-20 are diagrams depicting a state of the display device 234 (FIG. 2) at various stages of the translation process. FIG. 21 is a block diagram of the product glossary 212 used to implement the translations depicted in FIGS. 14-20.

Figure 14A:
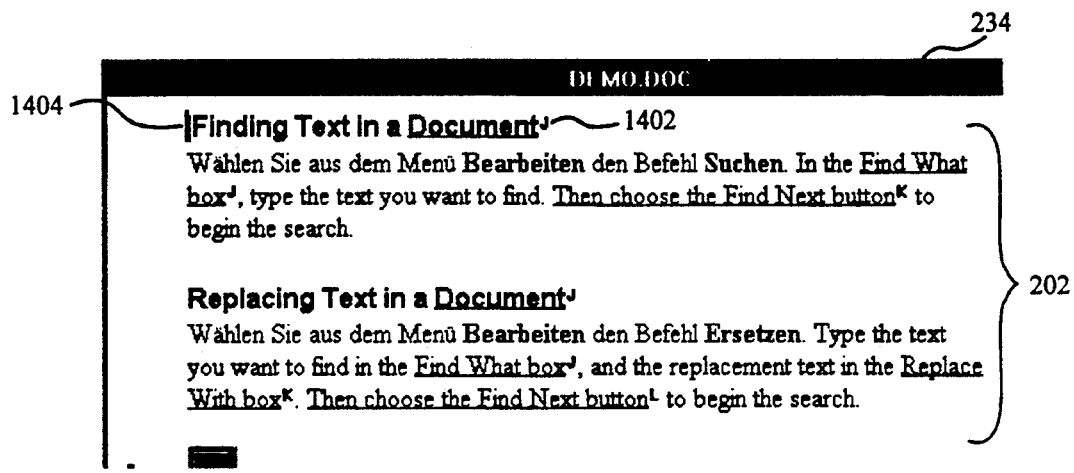
FIG. 14A is a block diagram of the source language document after it has been prepared for translation by the s of FIG. 2.

FIG. 14A is a block diagram of the source language document 202 after the source language document preparer 226 has prepared it for translation by the user of the system 200. The source language document 202 includes the handle 1402 and the insertion point 1404.

Figure 14B:
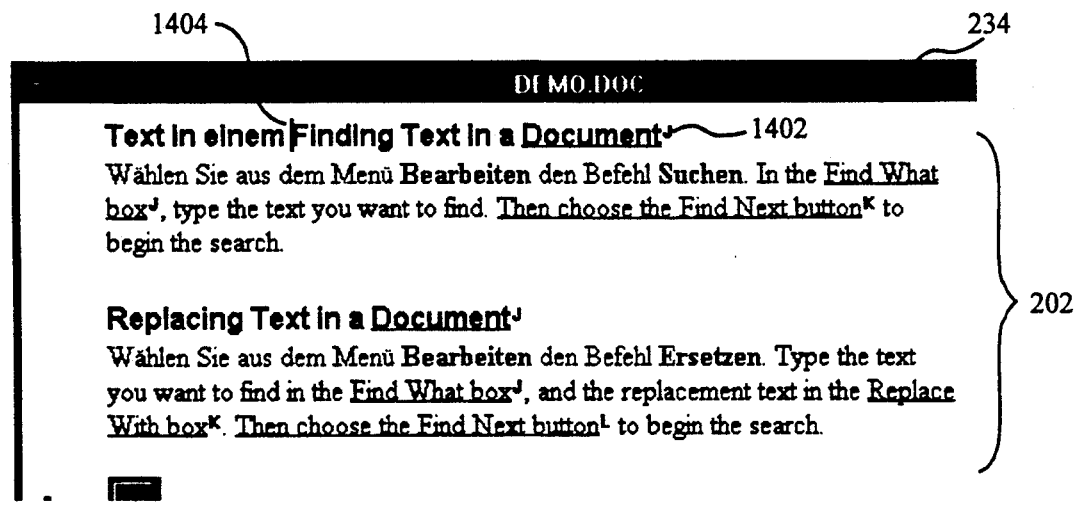
FIG. 14B is a block diagram of the source language document just before a target term will be inserted in the source language document using the insert target term command.
Figure 15A:
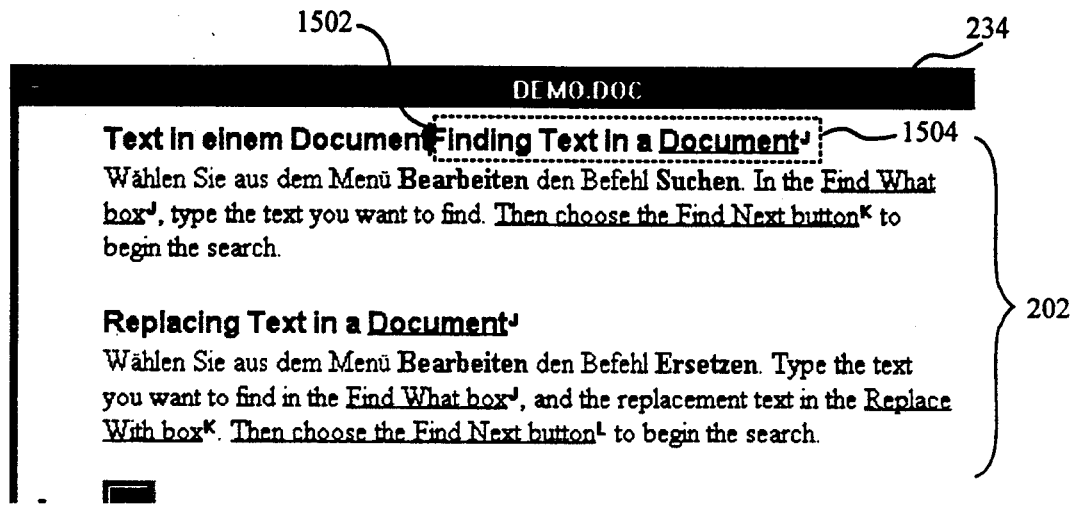
FIG. 15A is a block diagram of the source language document after the user manually types in the translation for the rest of the heading.

FIG. 14B depicts a state of the display device 234 after the German translation, "Text in einem," is inserted at the location of the current insertion point 1404. The user manually types in the translation because the phrase "Finding Text in a" does not have a translation handle associated with it. When the user of a system 200 is ready to translate the English language word "document" to the German language, the user enters the insert translation request, CTRL+SHIFT+J, which inserts the German translation (i.e., the target term 256 from the index file 248) for the English word Document (i.e., the source term 203) at the location of the current insertion point 1404. FIG. 15A depicts a state of the display device 234 after the user entered the insertion request for "document", received the translation (i.e. "Document"), and manually typed in the translation for "find" (i.e. "finden").

Figure 15B:
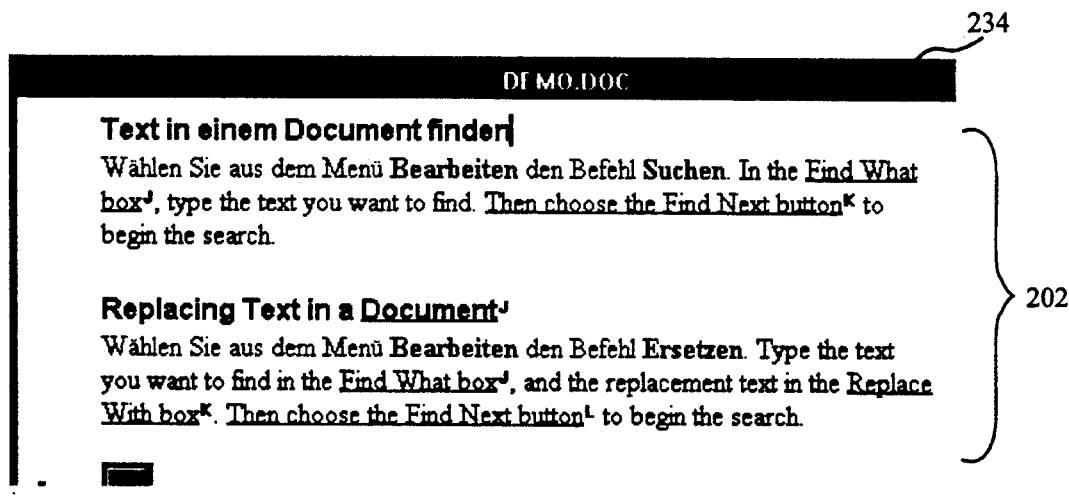
FIG. 15B is a block diagram of the source language document after the user deletes a source language heading.

Now that the heading 1504, "Finding Text in a document", has been completely translated, the user deletes the heading 1504. FIG. 15B depicts a state of the display device 234 after the user deletes the heading 1504.

Figure 16A:
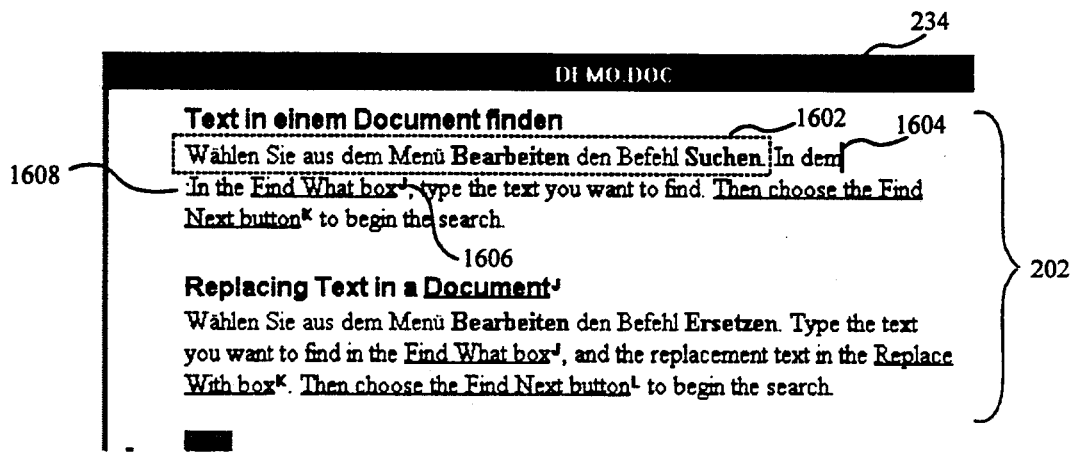
FIG. 16A is a block diagram of the source language document after the system of FIG. 2 has automatically inserted a translation for a source language sentence.

In FIG. 16A the sentence 1602 has been automatically inserted in the source language document 202 by the source language document preparer 226. In the preferred embodiment of the present invention, when a template string which comprises a complete sentence is found in the source language document 202, the source language document preparer 226 of the translation assister 208 inserts the target term 256 from the index file 248 associated with the template string into the source language document 202. As FIG. 21 depicts, the German phrase "Wahlen Sie aus dem Menu %MNU den Befehl %COM" is the target term 256 for the template string "From the %MNU menu choose %COM".

Figure 16B:
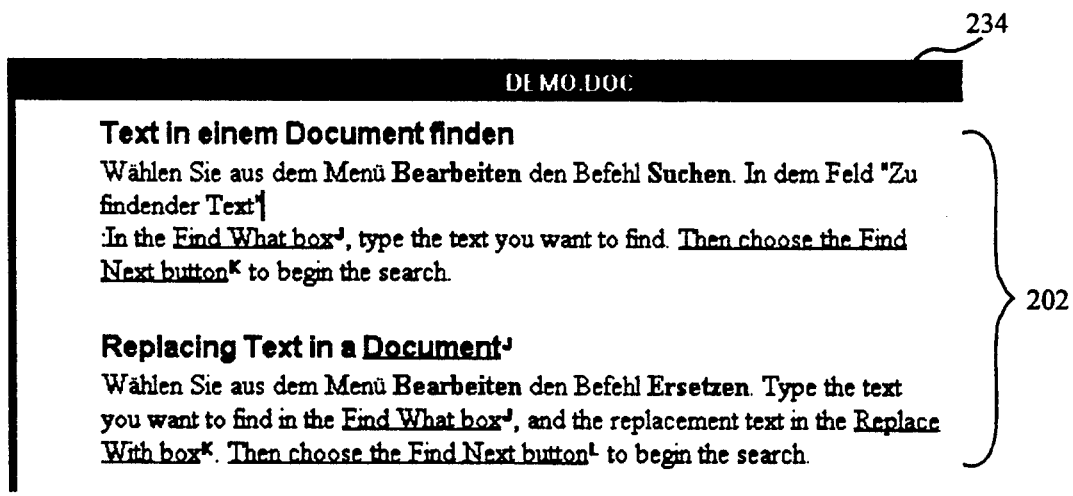
FIG. 16B is a block diagram of the source language document after the system of FIG. 2 has inserted a target term in the source language document in response to the insert target term command.

The next line in the source language document 202 contains the template string "Find What box" (see FIG. 21) associated with the translation handle 1606. The user proceeds to translate the sentence "In the Find What box, type the text you want to find". More specifically, the user proceeds to translate that sentence in a translation paragraph. Therefore, the user enters the create translation paragraph command which inserts a temporary paragraph marker to mark the end of the translation paragraph and a colon 1608 immediately in front of the English language text to be translated. The user first manually types in the translation for "In the" (i.e. "In dem"). The user then enters using the keyboard 207 the insert translation request for the translation handle "J" and, as FIG. 16B depicts, the German translation "Zu findender Text" (i.e., the associated target term 256) is inserted in the translation paragraph by the translation inserter 236. It should be noted that the translation handle "J" has been "cycled" in the sense that the translation handle "J" was used earlier to insert the target term 256 associated with the source term "Document" found in an earlier paragraph.

Figure 17A:
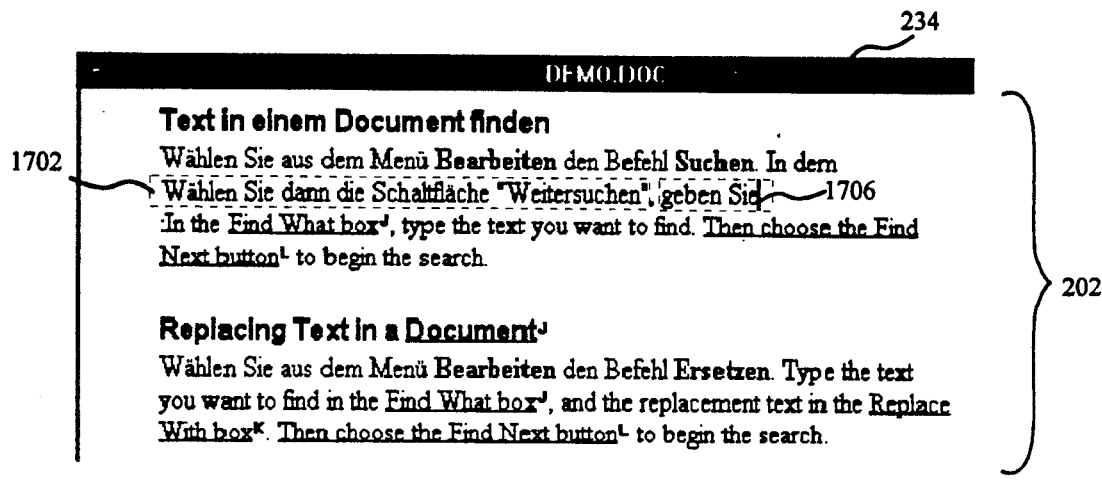
FIG. 17A is a block diagram of the source language document after the user has mistakenly inserted the wrong target term using the insert target term command.
Figure 17B:
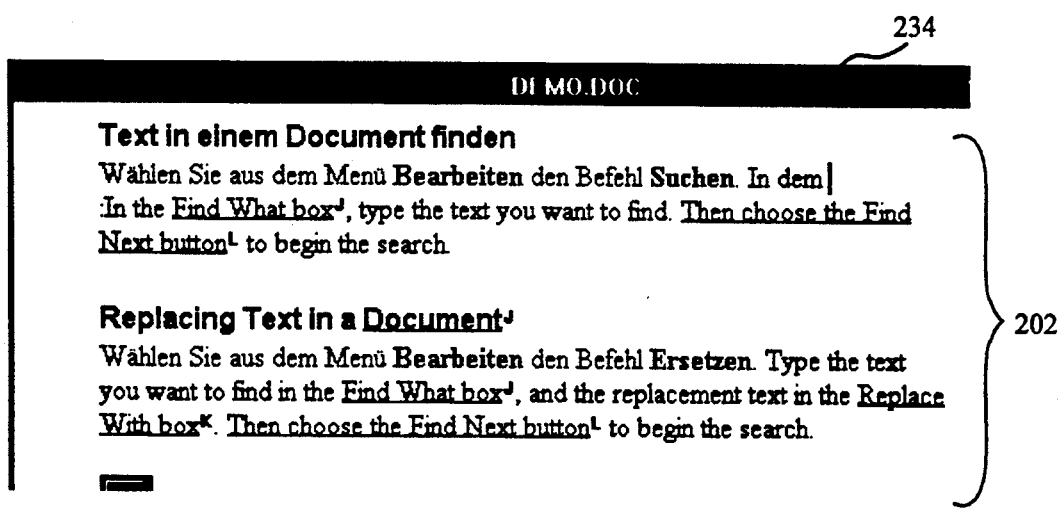
FIG. 17B is a block diagram of the source language document after the user has invoked an undo translation handle

FIG. 17A depicts what a state of the display device 234 would have looked like had the user of the system 200 mistakenly entered the insert translation request for the translation handle "K" instead of the insert translation request for the translation handle "J". The display screen 234 would have appeared in the state of FIG. 17A with the phrase "Wahlen Sie dann die Schaltflache Weitersuchen" inserted in the source language document 202, instead of in the state of FIG. 16B, with the phrase "Zu findender Text" inserted in the source language document 202. Oftentimes, the user of the system 200 will continue typing on the keyboard 207 before recognizing that an inappropriate target term 256 has been inserted into the source language document 202. FIG. 17A depicts such a case, with the phrase "geben Sie" entered after the mistaken insertion of the target term 256. In such a case, the user of the system 200 merely invokes the undo translation handle request, which in the preferred embodiment comprises CTRL+SHIFT+X. FIG. 16B depicts a state of the display device 234 after the undo translation handle request has been entered.

Figure 18A:
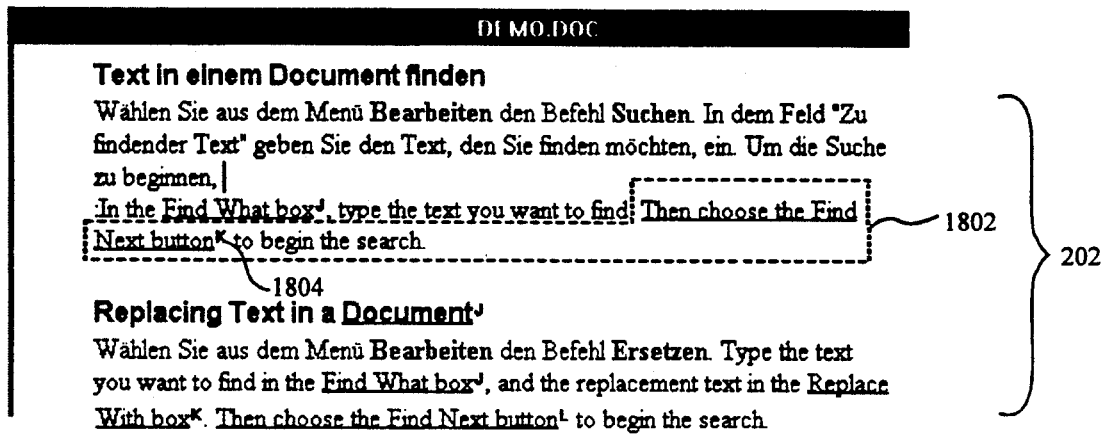
FIG. 18A is a block diagram of the source language document.
Figure 18B:
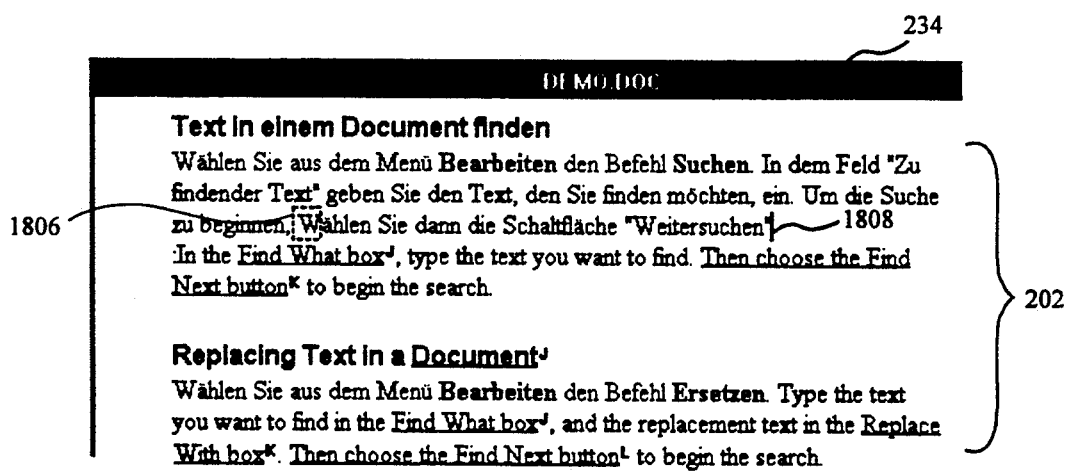
FIG. 18B is a block diagram of the source language document after the user has .entered the insert target term command for a template string.

Turning to FIGS. 18A and 18B, the user proceeds to translate the sentence "Then choose the Find Next button", using the translation handle 1804. As FIG. 21 depicts, the phrase "Then choose the Find Next button" is a template string.

FIG. 18B depicts a state of the display screen 234 after the user has entered the insert translation request for the translation handle "K". However, the first character of the target term 256 associated with the phrase "Then choose the Find Next button" contains inappropriate capitalization given its position within the translated sentence, namely a capital "W" for the term "Wahlen". The user then enters the toggle first character command which comprises the entry of CTRL+SHIFT+0 on the keyboard 244. Note that the user enters the toggle first character command to change the first character 1806 While the current insertion point 1808 is not located at the first character 1806. FIG. 19A depicts a state of the display device 234 after the user enters the toggle first character command and the character changer 240 has inserted the character 1902, in the form of a lowercase "w", in place of the character 1806 (FIG. 18B) which contained the capital "W".

FIG. 19A also depicts the English paragraph In the Find What box, type the text you want to find. Then choose the Find Next button to begin the search. which has been completely translated. By entering the paragraph command a second time, the user of the system 200 deletes the English paragraph. FIG. 20A depicts a state of the display screen 234 after the translation paragraph creator 238 has deleted the translated English paragraph.

FIG. 20B depicts a state of the display screen 234 after the remaining portion of the document 202 has been translated using the techniques set forth in more detail above, thus creating the target language document 206.

It will be appreciated that, although a specific embodiment of the invention has been described herein for purposes of illustration, various modifications may be made without departing from the spirit and scope of the invention. Accordingly, the invention is not limited except as by the appended claims.

APPENDIX

User's Guide

MATE

Version 1.0a

Table of Contents

1 Introduction ............................................................................................................ 3
2 Installing MATE ..................................................................................................... 4
        To prepare for the installation of MATE ............................................. 4
        To install MATE ....................................................................................... 5
3 Preparing for the Batch Process ........................................................................ 8
        Glossary Format and Content ............................................................... 8
        Filter .......................................................................................................... 8
        Project Directory .................................................................................... 8
        Back-up Copy ......................................................................................... 8
        Document Limitations .......................................................................... 9
            Document Length ....................................................................... 9
            Bookmarks Contained in the Document .............................. 9
        Treatment of Special Text Elements .................................................. 9
            International Character Formatting ....................................... 9
            GlossMan Links ........................................................................... 9
            Special Information and Fields in a Document .................. 9
4 Starting the Batch Process ............................................................................... 10
        To start the batch process ................................................................... 10
5 Opening the Prepared Document .................................................................... 11
        To open the prepared document ...................................................... 11
        What You See and What You Get ..................................................... 12
            The Prepared Document ......................................................... 12
            What You Don't See in the Prepared Document .............. 13
            Other Files Opened by the Open All Command ............... 14
6 Translating with the Translation Editor Macros .......................................... 15
        Tips: Read These Before You Start ................................................... 15
        Index To Key Functions ...................................................................... 16
        Moving Through the Document and Deleting English Text ...... 17
        Using the Translation Handles .......................................................... 18
        Displaying and Inserting Chapter Glossary Entries ..................... 20
        Changing or Deleting Inserted Translations .................................. 22
        Translating Repeated Sentences ...................................................... 23
        Entering and Reviewing New Translations in GLOSSADD.DOC ...................... 24
        Changing the Filter File During Translation .................................. 25
        Removing MATE Codes from Your Document .............................. 26
7 Customizing Colors and Key Assignments ................................................... 28
        To change colors and Handle key assignments ............................ 28
        To customize Translation Editor macro key combinations ........ 28
        To reset the NORMAL.DOT keys to the WinWord default settings ....... 29
        To re-install your MATE key assignments ..................................... 29
8 Miscellaneous Functions and Troubleshooting ........................................... 30

| | |
|---|---|
| Troubleshooting | 30 |
| Miscellaneous WinWord Macros | 30 |
| Appendix | 33 |
| A Preparing Translation Glossaries for MATE | 35 |
|    General Information | 35 |
|    Information Required in MATE Glossaries | 36 |
|       Software Interface Terms | 36 |
|       General Terms | 37 |
|       Required Excel Spreadsheet Structure | 38 |
|       Important: What Not to Enter Into the MATE Glossary | 39 |
|    Customizing the General Glossary to Your Product | 40 |
|       True Pre-Translations vs. Pre-Translations With a Handle | 40 |
|       Terms That are Never Pre-Translated | 41 |
|       How Different Categories are Treated by MATE | 41 |
|          Examples | 42 |
|       Template Strings | 43 |
|          Examples | 43 |
|       Rules and Tips for Template Strings | 45 |
|       Tips for Nouns | 45 |
|       Filter File Content and Format | 46 |
|    Creating Excel Spreadsheets for the BuildGlossary macro | 47 |
|       Terminology Stored in MSTerms | 47 |
|       Terminology Stored in GlossMan Databases | 48 |
|       Terminology Stored in Excel Spreadsheets | 49 |
|       Other Localization Tools | 50 |
|    Using the BuildGlossary Macro | 50 |
|    Descriptions of Glossary Macros in MATE.XLM | 52 |
| B Auto Demo | 53 |
|       To start the Auto Demo | 53 |
|       Auto Demo Script | 53 |
| C Operating Limits and Requirements | 64 |
|       Paragraph Identification Tags | 64 |
|       Translation Handles | 64 |
|       Repeated Sentences | 64 |
|       Template Strings | 65 |
|       Hardware and Software Requirements | 65 |
|          Hardware | 65 |
|          Software | 65 |
| D Glossary | 66 |
| Translation Editor Key Quick Reference | Back Page |

1 Introduction

MATE 1.0 is a computer-assisted translation tool for the translation of Microsoft documentation with Word for Windows. Its purpose is to facilitate the process of on-line translation and to provide fast access to translated terminology.

The user interface to MATE is Word for Windows augmented with the set of "Translation Editor" macros. The Translation Editor macros make the execution of common translation-specific tasks easy while at the same time protecting pre-applied paragraph formatting from accidentally being destroyed. The use of the mouse is required only for activities which interrupt the flow of the translation process due to macro execution time — such as editing the Filter file.

In addition to the Translation Editor macros, MATE, Version 1.0, includes the batch processing tool to prepare and English document for translation — and a Microsoft Excel macro sheet for glossary preparation. The batch process extracts the translated terminology needed for a document from the product glossary and prepares the document for use with the Translation Editor macros. This includes inserting paragraph tags, markers for terminology look-up, and selected pre-translated text. The batch process runs without user interaction once it has been started.

The batch process does not use semantic or grammatical rules beyond case matching. It simply compares the information given in the product glossaries with the text strings found in the document and applies a few "hard-coded" rules. The output is only as good as the input received in form of the product glossary. Careful glossary preparation is the only way to guarantee usable output.

Even with a good glossary, text strings can be taken too "literally" by the tool. Therefore MATE does not globally replace English terms with their translations. Instead, it stores the translations in a separate file and the translator inserts each with a key combination when s/he needs it. Only when an entry found in the glossary matches an entire English sentence (or sentence-equivalent element such as the content of a table cell) will the translation replace the English sentence in the text.

2    Installing MATE

The MATE Setup program creates a directory named "MATE" in the WinWord directory on your hard disk and copies the necessary files to this directory. It also copies the Translation Editor macros into NORMAL.DOT and the files MATE.DLL, MATE.INI, and BLAST.EXE into your Windows directory. Setup creates the program group "MATE" which contains icons to start WinWord, Excel, and the glossary tools.

> Important   Key assignments that exist for WinWord macros in NORMAL.DOT prior to Setup will be overwritten with MATE default key assignments. The following key combinations are assigned during Setup and cannot be changed at that time:
>
> > CTRL+ S, F, B, G, 0, and 7
> > CTRL+SHIFT+ S, F, B, G, X, 0, and 7
> > F10, F11, and F12
> > CTRL+F11
>
> In addition to the above keys, most of the letter and number keys will be assigned as *Translation Handles* for terminology retrieval. You can reserve some of these keys for other macros you may have by removing the keys from the key assignment list during Setup.
>
> Back up your NORMAL.DOT template under another name if you want to preserve your key assignments (*don't rename it*; WinWord will not create a new NORMAL.DOT). MATE does not delete macros in your NORMAL.DOT, it only overwrites your key assignments.

To prepare for the installation of MATE

1. Make sure that you have Word for Windows, version 2.0a or higher, installed on your hard disk. If you will change and create glossaries for the MATE batch process, you also need the U.S. version of Excel 4.0.

2. If WinWord is currently running, exit it by choosing Exit from the File menu.

The MATE macros cannot be saved to your NORMAL.DOT template if WinWord is running during Setup.

3. Back up your NORMAL.DOT file if you want to preserve key assignments in this template. Don't simply rename the file, but create a *copy* under another name.

If you receive an error message during the installation, you can try one of the following:

- Make sure you have all the files needed by the Setup program in one directory. This includes the Setup files, the MATE files, and the example files.

- Check if your WIN.INI file contains a line like: `programdir=C:\WINWORD`

This line specifying the drive and directory for WinWord on your machine should have been created during installation of WinWord. If it is not in your WIN.INI file, add it, using the exact name your WinWord directory has.

- If the above items were not the cause of your trouble, your WinWord version may not be 100% compatible with the U.S. WinWord versions 2.0a or 2.0b. If possible, use MATE with a U.S. version. Please inform Anna Neumann (phone 936-2253, Bldg. 16/2333) of these difficulties.

To install MATE

1. In the Windows File Manager, switch to the drive and directory containing the MATE Setup files.

2. Double-click on SETUP.EXE.

3. After initializing, Setup asks you to choose between the "Express" installation and the "Custom" installation. If you install MATE for the first time on your machine, choose "Express." This option copies the files to your directory and installs MATE with the default colors and key assignments. If you choose this option, you will need to click the OK button in the following dialog boxes. Then you are done.

If you want to customize the key assignments for the Translation Editor macros or the colors for text elements which MATE inserts into your documents, choose "Custom" and follow steps 5 through 10 below.

For information on customizing MATE after it has been installed, see Chapter 7, "Customizing Colors and Key Assignments."

5. In the Destination Path dialog box, type the name of the directory in which you want MATE to be installed. The recommended default is your WinWord directory.

6. In the Color Selection dialog box, choose the colors you want MATE to apply to markers and pre-translated sentences in your document. The four types of text MATE inserts into your document are: Translation Handles (default color blue), pre-translated sentences (default color green), Chapter Glossary Markers and Repeated-Sentence Markers (default color red for both). The color you choose for pre-translated text *must* be different than the normal text color.

If you choose the Default button after selecting custom colors, the choices you've made are reset to the default colors.

7. In the Video/Fonts Configuration dialog box, select the font size for the text in your Chapter Glossary. If you have a SuperVGA screen and use the 1024-by-768 resolution, it is recommended that you select the 12-point font. Choose OK.

8. In the Key Assignment dialog box, select the keys you wish to use to activate the Translation Handle macros. The default key assignments are as displayed in the dialog box shown on the next page. You can delete a few of the keys in the default list if you wish to reserve them for personal macros, but a minimum of 20 Handle keys is recommended.

The order in which you enter the keys in the Key Assignment dialog box corresponds to the order in which they will appear as Handles in each paragraph of the document. Therefore, the keys at the beginning of the list will occur in nearly every paragraph and should be those most easily accessible when pressed together with the macro access keys CTRL and CTRL+SHIFT. For example, on a US keyboard, the keys J, K, and L lie directly under the fingers of your right hand and are therefore most easily accessed while you press CTRL or CTRL+SHIFT with your left hand.

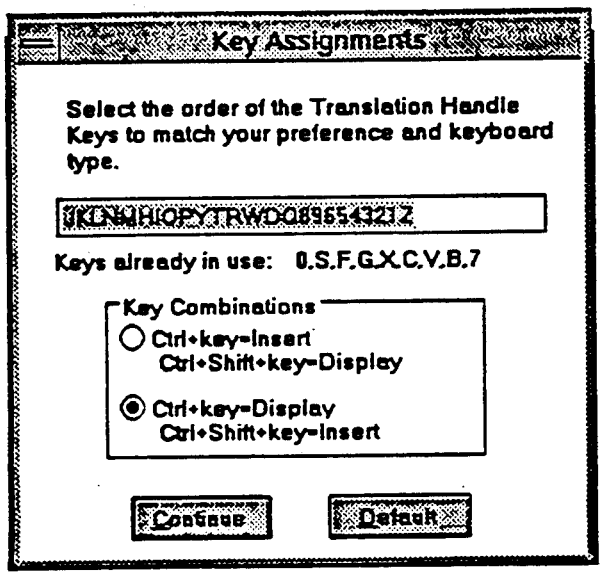

Below the text box listing the sequence of Handle keys, you see a listing of reserved keys which are pre-assigned to macros other than Translation Handle macros. You cannot change the assignment of these keys during Setup. They are S, F, B, G, X, 0 (ZERO), 7, F10, F11, and F12. Also listed are the commonly used standard WinWord keys for copying (CTRL+C) and pasting (CTRL+V) a selection. You can change the assignments for these keys from within WinWord once MATE has been installed. For details, see Chapter 7, "Customizing Colors and Key Assignments."

9. Under Key Combinations, select the set of combinations you prefer for activating Translation Handles. "Insert" refers to the macro key combination for inserting a translated term. "Display" refers to the key combination for displaying a translated term in the status bar. Choose OK.

The "Insert" key combination is the one you will use most often and should therefore be the most convenient one to press. If it is easier for you to press only the CTRL key than it is to press CTRL+SHIFT, select the first option button. After you have translated a few pages you will know which key combination works best for your typing style.

10. Choose Continue or OK in all of the following dialog boxes.

Setup looks for Microsoft Excel on your hard disk and installs an icon in the MATE program group which starts Excel with the macro spreadsheet needed for glossary preparation. For information on how to use the glossary tools, see Appendix A, "Preparing Translation Glossaries for MATE."

After the installation, the MATE program group will have been added to your Program Manager:

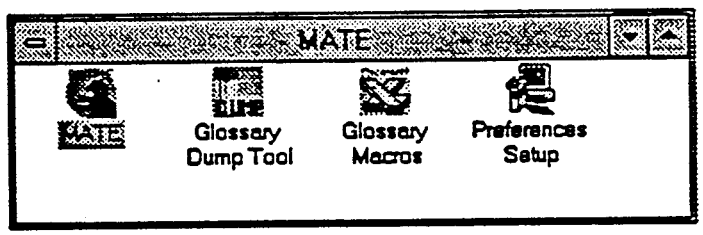

The PrimeMATE icon starts WinWord with a set of instructions on how to run the Auto Demo (see also Appendix B for information on running the Auto Demo for the Translation Editor macros) and open files for preparation or translation. The icons for the Dump Utility and the Glossary Macros start DUMP.EXE for GlossMan database dumps and Excel for the creation of MATE glossaries, respectively. The Preferences Setup or MATE Configuration icon starts the configuration routines of the Setup program, allowing you to change your key and color assignments at any time.

3   Preparing for the Batch Process

The batch process will take several hours to complete, depending on your hardware and the size of your glossary. To ensure that your output will be useful, follow the guidelines below to prepare for the processes.

Glossary Format and Content

The batch process uses the file GLOSSARY.TXT. This file must be prepared with the MATE.XLM macro spreadsheet provided with the Setup files. The data format and the content must meet the requirements listed in Appendix A, "Preparing Translation Glossaries for MATE."

The glossary is the "brain" of MATE. The batch process simply takes the content of the glossary and compares it to the English text, applying a set of rules. If these rules are kept in mind while creating the glossary, MATE will be far more effective than if a random terms are fed into it. Appendix A tells you how to create useful glossaries for MATE.

> Important Run the glossary macros each time you have updated your product glossary to ensure that the GLOSSARY.TXT file is in the correct format and that MATE is processing your document using the most current terminology.

Filter

You can use the Filter file to filter terms from the glossary. Terms will not be removed from your product glossary, but will be deleted from the GLOSSARY.TXT file and therefore not used by the batch process when searching the document for terms to translate. This filter must be named FILTER.TXT, must be a text files, and must have the same format as the glossary format described in Appendix A. Before starting the batch process, make sure that the filter contains all the terms you don't want to see pre-processed in your document. For instance, you may want to filter out short, common words, such as "To" and "From."

Project Directory

Before processing the first document, create a directory for the project you're working on. This directory is referred to as the *project directory*. If you perform all batch processing for a project from within this directory, you can be certain that the same glossary and filter will be used for all documents of that project. You can create subdirectories within your project directory for various manuals or for each chapter of a manual. If you are using MATE for more than one project, having distinct project directories will help you keep the files in order and the glossary and filter project-specific.

Back-up Copy

Always create a back-up copy of the English document. Never run MATE on a document that is currently checked out of an SLM project.

Document Limitations

If the following limitations are exceeded, the MATE batch process may fail to complete.

Document Length
The length of your printed-documentation file should not exceed 30 pages of text and tables. If your document is longer than this limit, and the additional length is *not* due to art, you have to split the document into two or more separate files. The size of Help files can be up to 50 pages of text and tables.

Bookmarks Contained in the Document
MATE tags paragraphs and tables in a document with an identifier in the form of a WinWord bookmark. If your document already contains more than 50 bookmarks and is longer than 20 pages of text and tables, MATE may exceed the recommended bookmark limit of 450 per file. You can check the number of bookmarks contained in your document by choosing the command Bookmarks from the Insert menu. Scroll in the resulting dialog box, counting 5 bookmarks for each screen down in the list box. For more information on MATE paragraph tags, see Appendix C, "Operating Limits and Requirements."

Treatment of Special Text Elements

The following defaults are "hard-coded" into MATE 1.0. If they don't meet the requirements for your project, or if your document contains other information that must be preserved, contact AnnaN.

International Character Formatting

MATE pre-formats some terms after translating them, according to the current Lingua standard listed below:

| Menu name | Bold |
|---|---|
| Command name | Bold |
| Dialog box title | Bold |
| Key name | Same as given in MSDesign Guide for English key names |

GlossMan Links

MATE 1.0 is compatible with GlossMan links. If text containing links is pre-translated, the links are preserved.

Special Information and Fields in a Document

MATE 1.0 preserves the following items in a document:

| Fields, including index fields and art links |
|---|
| Index page range bookmarks and other bookmarks |
| Hidden text |
| Help file jumps |
| {bmc ...} fields |
| Procedure-sharing markers and bookmarks as used by the T3 Help team |

4 Starting the Batch Process

You start the batch process from within WinWord. Once you have provided the information needed to process the document correctly, WinWord is minimized to an icon and no further user input should be required.

To start the batch process

1. Be sure the document you want to process as well as the correct GLOSSARY.TXT file and FILTER.TXT file are in the project directory.

If you want to process more than one document in a row, make sure that you have the templates for all those documents in your WinWord directory, or attach the NORMAL.DOT template to each file and save it with the new template. If WinWord cannot find the correct template when opening a file, it displays the message "Can't find document template" and halts the batch process until you've pressed the OK button.

2. Close all applications other than WinWord. If WinWord is not running, start it by double-clicking on the PrimeMATE icon in the MATE program group.

3. Choose Prepare Text from the File menu.

4. In the Prepare Text Options dialog box, select the options, if any, which apply to the document you want to process. For instance, if the headings in your document are linked to the GlossMan database, select the "Process Headings Separately" check box. If you are processing a Help file, select the second check box.

Note  You can process several files at once, but they have to be all Help files or all documentation files. You cannot process both types of files in one session.

5. In the English Documents dialog box, switch to the project directory and double-click on the name of the document you want to process.

If the GLOSSARY.TXT and FILTER.TXT files are not found in the current project directory, the Glossary and Filter dialog boxes will be displayed. Switch to the directory containing these files and select them. They will then be moved to your project directory.

After you've pressed OK, the document to be processed is opened. If the document is based on a WinWord template that doesn't exist in your WinWord directory, you will get the message "Can't find document template." Choose OK.

WinWord is then minimized and will remain minimized until the batch process is completed. Wait a few minutes to make sure that MATE has all the information it needs. If the WinWord icon starts to blink, double-click on it and provide the requested information.

| Important  Never rename a file after you have prepared it. Or, if you receive prepared files from Microsoft, never rename these files before translating them. |
| --- |

5  Opening the Prepared Document

| Important  You must use the Open All command on the File menu to open your prepared document. |
| --- |

To open the prepared document

1. Choose Open All from the File menu.

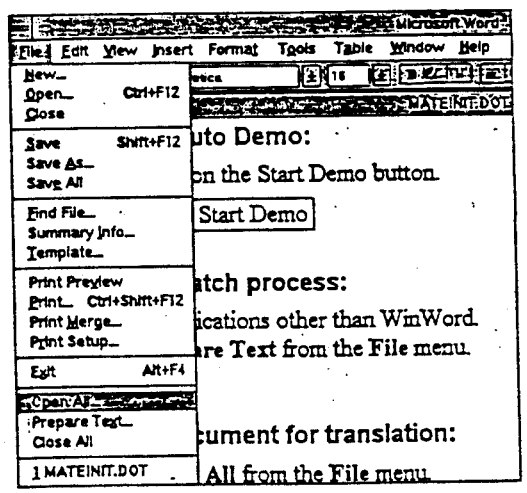

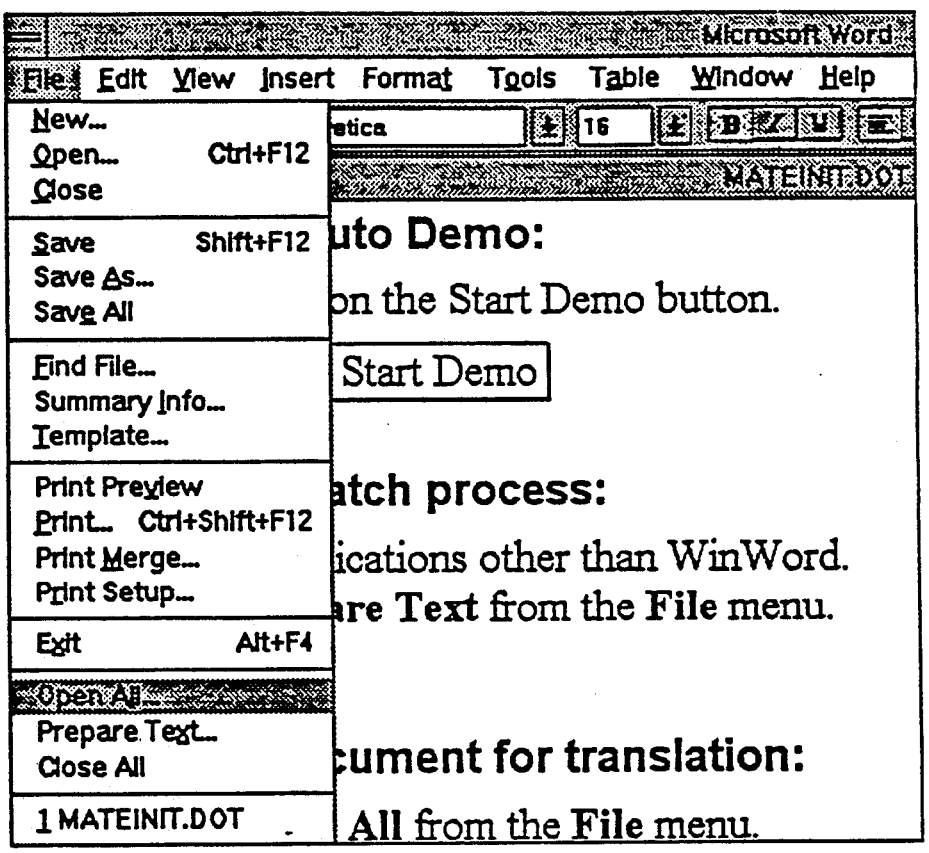

This command opens the document and associated files that need to be open during translation. If you don't use the Open All command to open these files, some of the Translation Editor macros will not function.

2. In the Open All dialog box double-click on the name of the document you want to translate.

When you want to close all documents opened with the Open All command, use Close All on the File menu.

What You See and What You Get

The Prepared Document

MATE provides translated terms and phrases in four different ways, depending on:

- The category of the term or phrase in the glossary
- Whether the term or phrase matched an entire sentence or only part of a sentence in the document. A table entry or any text delimited on both sides by tabs and/or paragraph marks is also considered a "sentence."

Nouns with more than one translation and syntax-dependent general terms (verbs and adjectives) are contained in the *Chapter Glossary*. These types of terms are collectively called *non-static* (i.e., the grammatical form of the translation varies depending on the sentence, or the entire translation varies depending on the context).

Full sentences for which translations have been found in the glossary are pre-translated in the document, replacing the English sentence. They are formatted green (default color).

Software interface terms, names, and uniquely translated nouns and phrases are underlined and marked with a *Translation Handle* – a superscript letter or number. The pre-translated string corresponding to the underlined term is stored in the *Index file* and can be accessed by pressing a macro key (CTRL or CTRL+SHIFT) and the Translation Handle letter. The types of terms that receive Handles are collectively called *static*, because the base form of the translation as it is entered into the product glossary (such as any interface element) is usually the exact form needed in the translated sentence. In the case of nouns, an ending may have to be provided to account for plural or grammatical case.

Terms which are not pre-translated by MATE but still need to be accessed during translation are marked with the special Handle "&." When this Handle is activated, the term is *copied* from its position in the English text to the current cursor position. Examples are GlossMan links and Help file jumps.

Sentences that are repeated elsewhere in the document, are marked with a *Repeated-Sentence Marker*. As soon as you have translated the first occurrence you can activate a macro to replace subsequent occurrences with the translation you entered for the first one.

The following screen shot on the next page shows the various MATE markers:

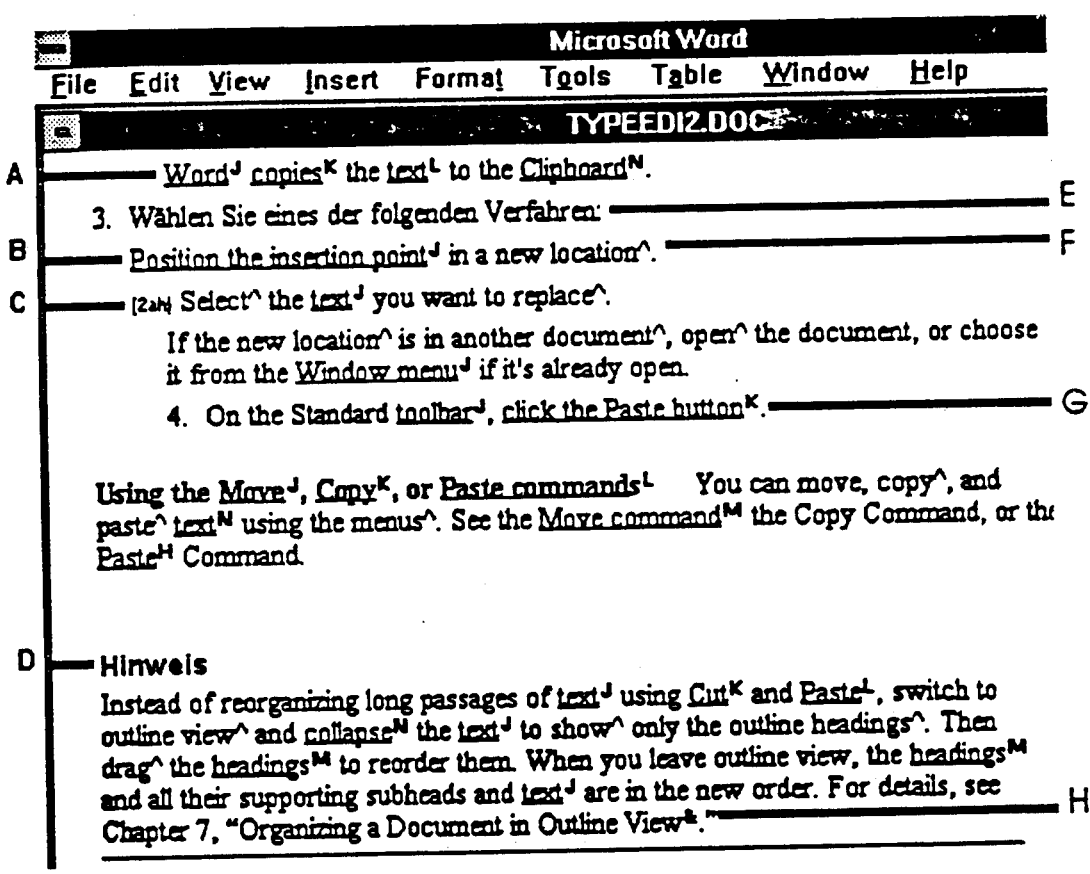

A  Uniquely translated terms with Translation Handles J, K, L, and N. The verb "copies" in this example received a Handle only because it was taken for the noun "copies" in the glossary.

B  Uniquely translated phrase (category "STR") with Translation Handle J.
C  Repeated-sentence marker [2ah], indicating that sentence "ah" occurs two more times in the remainder of the document.
D  Pre-translated "sentence-equivalent" text.
E  Pre-translated sentence
F  Glossary marker indicating that this term is available in the Chapter Glossary
G  Assembled template string (category "TEM") containing the fixed text "click the" and "button." The value for the variable (i.e., the button name) in this template string is "Paste."
H  &-Handle for a cross-reference.

What You Don't See in the Prepared Document

Every paragraph in a prepared English document has an invisible identifier. This paragraph identification tag is in form of a WinWord bookmark, and it must remain with the paragraph. The following actions will not affect the bookmarks and are therefore legal:

- Changing the text marked by the bookmark (i.e., editing, inserting, moving, pasting, and deleting words).

- Using any of the MATE interface macros (Forward and Back macros, Delete macros, inserting a temporary paragraph with the Paragraph macro).

The following actions delete or corrupt bookmarks and are therefore not allowed:

- Deleting a paragraph mark (also deletes the paragraph format and is therefore not recommended with or without MATE)
- *Copying* an entire paragraph to another location. This action copies the bookmark to the new occurrence of the paragraph and leaves the original paragraph without a bookmark.

Other Files Opened by the Open All Command

The Chapter Glossary  This file is a subset of the product glossary. It contains the non-static terms found in the prepared document (or "chapter") and can be displayed when a translation is needed. Static terms are also entered into this glossary in cases where the capitalization of the glossary entry differs from the way the term occurs in the text.

The Index file  This file remains off-screen and acts as a road map to the translations needed for each paragraph. It is also where the translations for static terms are stored.

The Chapter Glossary and the Index file are document-specific, i.e., one of each is generated for every document you process.

The Glossary Additions file, GLOSSADD.DOC  This file contains a table into which you can enter new terms not found in the glossary and the translations you suggest for them. During the batch process, sentences which are found repeatedly in a document are also entered into this file. When you activate the Repeated-Sentence macro, the translation for a repeated sentence is automatically inserted into GLOSSADD.DOC. This enables the person who maintains the product glossary to add those new terms and common sentences, so that they can be pre-translated in subsequent documents.

The Glossary Additions file is project-specific. It is created once in your project directory when you process the first document in that directory. Therefore, if you conduct all preparation in the same project glossary, the Repeated Sentences of all files you prepare will be stored in the same Glossary Addition file. If you create subdirectories in your project directory for each document you prepare or for sets of documents, then move the GLOSSADD.DOC file from one subdirectory to the next before you start the batch process.

The Open All command opens GLOSSADD.DOC, but this file does not have to remain open during the translation. You can close it if you need to free up working memory. There will only be one GLOSSADD.DOC file per directory.

> Important You cannot rename your prepared document. The Chapter Glossary and Index file as well as the paragraph identification tags are created based on the document name. If you rename the document after processing it, some of the Translation Editor macros will not work.

6   Translating with the Translation Editor Macros

The Translation Editor macros are installed in NORMAL.DOT. The macros enable you to work with the MATE markers and the glossary files while you translate.

The prepared document can have any Word for Windows template attached to it, because macros stored in NORMAL.DOT are accessible from any template. However, if the WinWord template for your document contains macro or style key assignments which conflict with some of the MATE key assignments, then the template keys override the MATE keys.

> Important If you want to override the template's key assignments so that all MATE keys are available to you, choose Macro from the Tools menu and scroll in the Macro Name list box until you see the macro "MT1KeyAssign." Double-click on the macro name and wait while the macro reassigns the keys. Then choose the Save All command from the File menu to save the changes.

If you want to preserve the template's key assignments, but not use them, assign the NORMAL.DOT template to your document for the duration of the translation. To do this, choose Template from the File menu and select "NORMAL" in the Attach Document To box. Then choose the Save command from the File menu. After your translation is done, you can reassign the other template in the same way.

Tips: Read These Before You Start

- If you cannot access the Open All command because no document is open (WinWord reduces the menu choices to a few commands in the File and Help menu when there is no open document) open a new document using the New command on the File menu. The full menus are now displayed again. Choose Open All to open the document you want to translate. Then close the empty new document.

- If you want to repeat an action several times, such as scrolling repeatedly in the Chapter Glossary window (using CTRL+F), keep the CTRL key pressed while pressing F repeatedly. This will work anytime you need to activate two macros in a row, and it is faster than pressing the full key combination each time.

- If you continuously get the message "The document you are translating must be active...", then save your work, and close all documents (not with the Close All command, it won't work either in this situation). In the Windows menu, make sure that you don't still have the glossary files or the Index file open. When all MATE-related documents are closed, use the Open All command to open the files again. Then press SHIFT+F5 until you get to the last place in your document where you edited text.

- If using a MATE key results in an unexpected change of paragraph formatting, or if the key doesn't work at all, then you are working with a WinWord template other than NORMAL.DOT. To fix this, follow the instructions in the "Important" box above.

- If you are running a Terminate-and-Stay-Resident program such as AfterDark, close it while translating with MATE. The keys to activate these programs can interfere with the Translation Editor keys.

- The default key combinations to activate Translation Editor macros are explained below. To look up a particular key combination quickly, refer to the "Translation Editor Quick Reference" on the back page of the User's Guide.

Index To Key Functions

| Function | Page |
|---|---|
| Moving Through the Document and Deleting English Text | 18 |
|    To move forward in the text | 18 |
|    To move back in the text | 18 |
|    To delete an English sentence | 18 |
|    To insert an empty paragraph or delete an English paragraph | 19 |
| Using the Translation Handles | 19 |
|    To display a Handle translation | 20 |
|    To insert a Handle translation | 20 |
|    Terms that should not be translated | 20 |
|    To copy a non-translatable term to your cursor | 20 |
| Displaying and Inserting Chapter Glossary Entries | 21 |
|    To display the Chapter Glossary for the current paragraph | 22 |
|    To display the extended list for a term | 22 |
|    To scroll down in the Chapter Glossary | 22 |
|    To scroll up in the Chapter Glossary | 22 |
|    To insert a Chapter Glossary translation | 23 |
|    To hide the Chapter Glossary | 23 |
| Changing or Deleting Inserted Translations | 23 |
|    To toggle the case of an inserted translation | 23 |
|    To edit words in an inserted translation | 24 |
|    To delete an inserted translation | 24 |
| Translating Repeated Sentences | 24 |
| Entering and Reviewing New Translations in GLOSSADD.DOC | 25 |
|    To enter a new term into GLOSSADD.DOC | 25 |
|    To review terms in GLOSSADD.DOC | 25 |
| Changing the Filter File | 26 |
|    To add a term to the Filter during translation | 26 |
|    To edit the file FILTER.TXT directly | 26 |
| Removing MATE Codes from Your Document | 27 |
|    To remove individual Handles or Glossary Markers | 27 |
|    To hide Handles and Glossary Markers in the current paragraph | 27 |
|    To delete all Glossary Markers from your document | 27 |
|    To delete all MATE codes from your document | 27 |
|    To delete all paragraph tags from your document | 28 |

Moving Through the Document and Deleting English Text

Use the navigation keys to move around paragraph formatting, MATE codes, fields and other text that should not be translated. Don't use the mouse to reposition your insertion point. The Forward and Back keys assure that you will not start out typing in the wrong font or color, and they will prevent you from accidentally deleting or editing text that must remain unchanged.

One way of "moving" is by deleting the next sentence or paragraph, i.e., the English sentence or paragraph after it has been translated. After the deletion your cursor is positioned at the beginning of the next English sentence, and you're ready to insert the translation for that sentence.

If you prefer to translate an entire paragraph before deleting it, and if you want the English text to remain "stationary" on the screen while inserting your translation above it, use the Paragraph key described on the next page.

To move forward in the text

`CTRL+SHIFT` +F

The Forward key moves the insertion point forward one sentence at a time to the next instance of *translatable text*. Translatable text consists of regular and extended-character letters and of numbers which are not list numbers.

To move back in the text

`CTRL+SHIFT` +B

The Back key moves the insertion point back one sentence at a time to the previous instance of translatable text.

To delete an English sentence

`CTRL+SHIFT` +S

The DeleteSentence key deletes the sentence immediately following your cursor. If that sentence starts with a Repeated-Sentence Marker, a paragraph mark, or other non-translatable text, the DeleteSentence key acts like the Forward key: it moves the insertion point past the non-translatable text.

To insert an empty paragraph or delete an English paragraph

`CTRL` +S

The Paragraph key has two functions. If your cursor is positioned immediately in front of translatable text when you press CTRL+S, the macro inserts a temporary (empty) paragraph and a colon (":"). Then it moves the insertion point into the empty paragraph. You can now begin typing the translation for the paragraph below (the one preceded by the ":" marker).

If your cursor is positioned at the end of the translated paragraph and just before the English paragraph that is preceded by the ":" marker, pressing CTRL+S deletes the temporary paragraph mark, the ":" marker, and the English paragraph. After the deletion, use the Forward key (CTRL+SHIFT+F) to move to the next paragraph and press CTRL+S again to insert a new empty paragraph and ":" marker.

If the paragraph that is preceded by a ":" marker contains a Repeated-Sentence Marker or a pre-translated sentence, the text will be deleted only up to the Repeated-Sentence Marker or pre-translated text. For details on repeated sentences, see "Translating Repeated Sentences", later in this chapter.

Using the Translation Handles

Nouns and software interface terms with unique translations are stored in the Index file and have a Translation Handle in the document. With the Display keys, you can preview the translation for a term in the status bar. With the Insert keys you can insert it at your cursor in the document.

The Display key combinations are the complement to the Insert keys. In you selected the default setting in the Setup program, CTRL+Handle displays the translation for a Handle term in the status bar, and CTRL+SHIFT+Handle inserts the translation for that term at the cursor. If you changed the Key Combinations option during Setup, your key combinations are reversed from the default Handle key combinations.

When using the Translation Handles, think of the set of macro keys as another keyboard layer below your real one. You access this additional layer with the CTRL and CTRL+SHIFT keys. Thus, instead of typing the individual letters for a translated term, you simply press CTRL+SHIFT and the Handle letter to "type" the entire translation with one key combination.

To display a Handle translation

(CTRL)+Handle

The Display key prints the translation for a term in the status bar. Terms with the &-handle don't have a translation and cannot be displayed.

To insert a Handle translation

(CTRL+SHIFT)+ Handle

When you use the Insert key you insert translations by "typing" the key combination and the Handle letter instead of typing the translation.

Initially you may find yourself starting to insert a translation manually. That is not a problem; you don't have to use the Handles just because they are there. If you don't trust the translation you may get with a Handle, display it in the status bar before you insert it. You can also quickly remove an inserted translation using the UndoInsert key, CTRL+SHIFT+X (see "Changing or Deleting Inserted Translations" later in this chapter).

After inserting the translation, check that it is exactly as you need it. If it needs an ending (to convert singular to plural, for instance), add the letters before you continue to type.

> Important You can only display or insert translations for Handles that exist in the *current* paragraph. The current paragraph is the one containing the insertion point. If you try to display the translation for a Handle which doesn't exist in your paragraph, the letter will be displayed without a translation.

Terms that should not be translated

Some text elements need to be preserved exactly as they occur in the source text. These include Help file jumps, GlossMan links, and in some cases, cross-references. Such text elements are marked with the &-Handle (CTRL+SHIFT+7, or CTRL+& on the US keyboard). You use this Handle like regular Handles, but instead of retrieving a translation from the Index file, MATE *copies* the text element the &-Handle refers to from its position in the text to your current cursor position.

To copy a non-translatable term to your cursor

`CTRL+SHIFT` +7

If more than one &-Handle exist in the current paragraph, you will be asked in the status bar if the first & corresponds to the term you wish to copy. If it is, press ENTER. If you need a different &-term, press 7+ENTER until the &-Handle referring to the term you need is highlighted. Then press ENTER to copy the term to your cursor.

Displaying and Inserting Chapter Glossary Entries

Verbs and adjectives as well as terms with non-unique translations are stored in the Chapter Glossary. Words contained in the Chapter Glossary are followed in the text by a Glossary Marker (^). When you call up the Chapter Glossary, a list of all terms for your current paragraph is displayed in the Chapter Glossary window as shown below. Therefore you don't have to specify which word you want to look up. Each time you press the DisplayGlossary key, the numbered list of entries is updated to display all terms for your current paragraph.

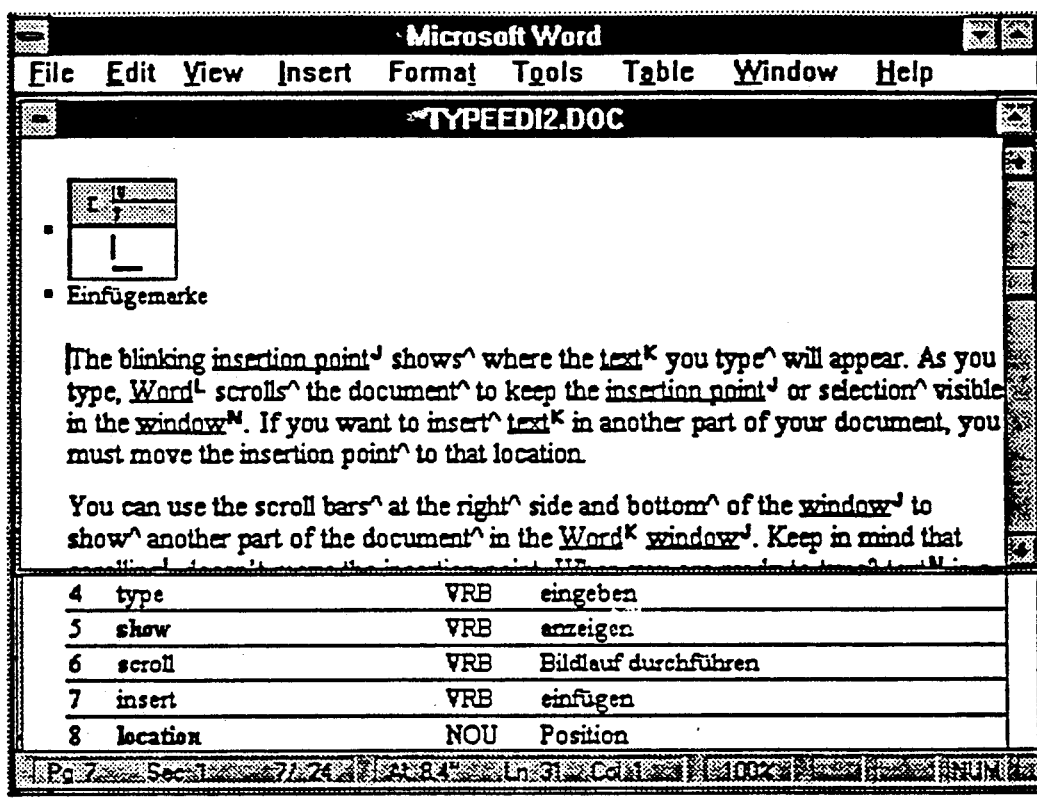

Chapter Glossary displayed for the first paragraph

Only the terms that actually occur in the text are displayed in the list. However, if an entry is formatted bold (such as the words "show" and "location" above), you can call up an extended list of all occurrences of that term found in the product glossary. For instance, calling up the extended list for "show" may display terms ranging from "show" itself to "Show/Hide button."

If a paragraph contains no glossary markers, you cannot display or update the glossary. If your document is crowded by too many Glossary Markers, see "Removing MATE Codes from Your Document", later in this chapter.

To display the Chapter Glossary for the current paragraph

CTRL+SHIFT +G

The DisplayGlossary key displays the terms available for the current paragraph in a numbered list in the glossary window. Note that the *document window* is active after you have pressed the key, so you can continue to enter text.

If you press the DisplayGlossary key while the glossary window is displayed, the list of terms in the window is updated to your current paragraph.

To display the extended list for a term

CTRL +G+ number + L + ENTER

"number" in the above key combination is the number of the entry in the Chapter Glossary list. Instead of pressing the letter "L" you could also press any other letter that is convenient, as long as it is not a number.

> Important You can only display the Chapter Glossary for terms that exist in the *current* paragraph. The current paragraph is the one containing the insertion point. If you press the DisplayGlossary key while your insertion point is in a paragraph for which no Chapter Glossary entries exist, the glossary window will not be displayed (if it is currently hidden) or will not be updated (if it is displayed with the entries of a previous paragraph).
>
> If you move to the next paragraph and leave the glossary window up on your screen, you need to press CTRL+SHIFT+G again to update the list to your current paragraph.

If a term is not displayed because the list is too long to fit into the glossary window, use the ScrollDown and ScrollUp keys. With these keys you can scroll in the Chapter Glossary window without having to activate the window yourself.

To scroll down in the Chapter Glossary

CTRL + F

The ScrollDown key moves the rows in the Chapter Glossary window down three lines at a time.

To scroll up in the Chapter Glossary

CTRL + B

The ScrollUp key moves the rows in the Chapter Glossary window up three lines at a time.

To insert a Chapter Glossary translation

Call up the glossary or update the list in the glossary window with the CTRL+SHIFT+G key before copying a translation from the glossary. Then press the following key combination:

CTRL + G + number + ENTER

The entry with the number you specified is copied to your cursor.

To copy an entry from the extended list, you have to copy and paste using the Clipboard. No key combination is available for this action.

To hide the Chapter Glossary

F10

The HideGlossary key hides the Chapter Glossary window as well as GLOSSADD.DOC if it is currently displayed. The document window is adjusted to fill the entire screen again.

Changing or Deleting Inserted Translations

You may have to change a translation provided by a Handle or by the Chapter Glossary. This includes changing the case of the first word from lowercase to uppercase, or moving the cursor in-between two words that were provided as one term (to change the ending of the first word). The ToggleCase key is provided to perform the capitalization change. To move in-between two words the best keys to use are WinWord's in-built cursor keys.

To toggle the case of an inserted translation

`CTRL+SHIFT` +0

The CapToggle key changes the case of the first letter of a term provided by a Handle or copied from the Chapter Glossary. If the term starts with a lowercase letter, the CapToggle key changes it to a capital letter and vice versa. Note that the key is "zero", and that the zero on the keypad will not work.

> Important You have to change the case of the term *before* using another macro such as a Handle macro or the Forward or Delete keys. These keys reset the marker that finds the beginning of an inserted term so you won't be able to toggle the correct letter after you used these keys. You can however type regular text before changing the case, as long as you haven't moved to the next paragraph yet.

The ToggleCase key has another function: if you select a term before pressing the ToggleCase key, the selected term is formatted as a key name. This may be handy if a key name is not part of a template string and therefore not pre-formatted.

To edit words in an inserted translation

`CTRL` + ←

←

`SHIFT` +F5

The WordBack key (CTRL+ ←) moves the insertion point to the beginning of the word preceding your cursor. The Left key moves the insertion point to the end of the previous word so that you can edit it. The GoBack key (SHIFT+F5) moves the insertion point back to the original cursor position.

To delete an inserted translation

`CTRL+SHIFT` +X

The UndoInsert key cuts the last translation inserted with a Handle or copied from the Chapter Glossary out of your text and onto the Clipboard. You have to use this key before you insert the next translation or use the Forward, Back or Delete keys.

Translating Repeated Sentences

Sentences that appear more than once in the document but are not yet pre-translated are preceded by a Repeated-Sentence Marker. If you reach such a sentence, do not delete the marker. The Forward macro will automatically place your cursor behind the Marker.

To translate repeated sentences

1. Translate the first occurrence of the sentence.
2. With the cursor located at the *end* of the translated sentence, press (F12).

You will be asked in the status bar whether you wish to confirm each replacement (ENTER) or replace all occurrences at once (A+ENTER). If you don't want to replace subsequent sentences with the translation you just entered, press U+ENTER to exit the macro.

If you choose one of the replacement options, the translation for the current repeated sentence will automatically be entered into GLOSSADD.DOC and categorized as "STR".

3. If you opted to confirm each replacement, each occurrence of the sentence is highlighted and you are asked in the status bar if you want to replace the sentence. If you do, press ENTER. If you don't want to replace the sentence, press K to skip this occurrence and move to the next one.

Entering and Reviewing New Translations in GLOSSADD.DOC

In GLOSSADD.DOC you can save translation suggestions for terms which don't exist in the product glossary. The content of GLOSSADD.DOC will not automatically be incorporated into the product glossary. Instead, the terms it contains need to be approved by your Terminologist or Language Lead before they are can be added to the product glossary.

To enter a new term into GLOSSADD.DOC

1. Select the English term you want to enter into GLOSSADD.DOC.
2. Press (F11).

The macro enters the English term and the paragraph tag of the current paragraph into GLOSSADD.DOC and displays the window on the bottom of your screen.

3. In the highlighted field under "CAT," enter the standard Lingua category for the term. See Appendix A, "Preparing Translation Glossaries for MATE" for a listing of the categories and their abbreviations.

4. Under "Translation" and "Comment", enter the translation you suggest and any comment you have.

5. Save GLOSSADD.DOC or "hide" it using the HideGlossary key, F10. The HideGlossary key will automatically save the file.

You can review the terms you've entered into GLOSSADD.DOC in the context of the paragraph in which you first encountered them. This is made possible by the paragraph tag recorded when you initially enter the new term.

To review terms in GLOSSADD.DOC

1. To call up GLOSSADD.DOC, press [F11].

GLOSSADD.DOC will be opened if it is not currently open.

2. Move the cursor into the cell of the term for which you want to see the context paragraph.

3. Press [CTRL] + [F11].

The macro reads the paragraph tag in the "ID" column to determine the name of the document and the number of the paragraph that was current when the entry was made. If the document is open, the paragraph is highlighted and displayed in the document window. If the document is not open but exists in the project directory, the macro opens it and displays the paragraph.

Changing the Filter File During Translation

To add a term to your Filter file and subsequently remove the attached Handles or Glossary Markers from your document, use the Filter command on the Tools menu. The Filter command also allows you to open the FILTER.TXT file directly and edit it. Changes you make to the Filter file directly will not become effective until the next time you process a document.

To add a term to the Filter during translation

1. Select the English word you want to add to the Filter file.

If the term has a handle attached to it, make sure you do not include the handle in the selection.

2. Choose Filter from the Tools menu.

3. If you did not select the English word in Step 1, enter it into the text box.

4. Choose the Add button or press ENTER.

5. Choose the Close button, or type the next term you want to add into the text field.

After choosing Close, you will be asked if you want to delete the Handles or Glossary markers for the terms you entered. If you choose Yes, the macro reduces the document window while removing the Glossary Markers or Handles for the new Filter entries.

Note that you cannot specify the category or translation for the term you insert into the Filter. In order to filter one particular instance of a term (say the verb form of the term "format") while retaining other instances (such as the noun "format") you have to edit the Filter directly.

By editing FILTER.TXT directly, you can also delete a term from the Filter so that it will again be available via a Handle or entered into the Chapter Glossary for the next document you process. Changes you make to the Filter file directly will not affect your current document.

To edit the file FILTER.TXT directly

1. Choose Filter from the Tools menu.
2. In the Filter dialog box, choose the Open FILTER.TXT button.
3. Edit the Filter file.

Be careful not to add blank lines or extra tabs. Entries must be tab-separated and correspond to the standard order of "Source Term", "CAT", "Target Term", and "Comment." The default entry in the "Comment" field is the current date.

4. Save and close FILTER.TXT.
5. To restore the size of your document window to the full workspace area, use the HideGlossary key, F10.

Removing MATE Codes from Your Document

The number of Handles and Glossary markers depends on the sizes of the glossary and Filter files used for the preparation of the English document.

To remove individual Handles or Glossary Markers

To remove Handles or Glossary Markers for particular terms, add the terms to the Filter file. See the section "To add a term to the Filter during translation," earlier in this chapter.

To hide Handles and Glossary Markers in the current paragraph

The HideCodes key temporarily formats the Handles and Markers in hidden text and turns the ViewHidden option off. When you press the key a second time, the formatting is reversed and your ViewHidden setting restored. If you work with the ViewAll option on, the codes will always remain visible, even after using this key combination.

To delete all Glossary Markers from your document

1. Choose Review from the Tools menu.
2. In the Review Functions dialog box, choose the Remove Glossary Markers button.

This function takes some time to perform and is irreversible.

3. Choose Close to close the Review Functions dialog box.

Removing all Glossary Markers from the document has no effect on the content of the Chapter Glossary. You can still call up the Chapter Glossary window for each paragraph.

To delete all MATE codes from your document

When you have finished translating a document, pre-translated text is still colored differently from the rest of the text and there may be some MATE markers left. You can remove the coloring and left-over markers by using the Remove MATE Codes button of the Review command, as follows:

1. Choose Review from the Tools menu.
2. In the Review Functions dialog box, choose the Remove MATE Codes button.

This function takes some time to perform and is irreversible. All remaining Handles, Glossary Markers, and Repeated-Sentence Markers will be deleted from your document and the color of pre-translated text changed to the original text color. MATE Paragraph tags are not affected by this function.

3. Choose Close to close the Review Functions dialog box.

To delete all paragraph tags from your document

Every prepared document contains paragraph identification tags in form of WinWord bookmarks. If at all possible, MATE paragraph tags should remain in the translated document; they can be used speed up the translation of text changes. If you need to remove the tags because they interfere with the Help compiler or the print production process, make sure you keep a back-up copy of the tagged translated document.

1. Choose Review from the Tools menu.
2. In the Review Functions dialog box, choose the Remove Paragraph Tags button.

This function takes some time to perform and is irreversible. Bookmarks with the MATE paragraph tag format will be deleted. All other bookmarks will be preserved.

3. Choose Close to close the Review Functions dialog box.

7   Customizing Colors and Key Assignments

You can use the Setup program in your MATE program group to customize the color for each text element MATE inserts into your document and to customize the key assignments for Handles. To customize key assignments for Translation Editor macros other than the Handle keys, use the functions provided by WinWord in the Keyboard Category under Options in the Tools menu.

> Important Before you change colors or *Handle* key assignments, make sure that all documents you have processed with the current settings are completely translated. If you change colors or Handle key assignments while you haven't completed translation of a previously prepared document, the Handle letters and text colors in the document will not agree with your new settings and the Translation Editor macros will give you wrong results. The assignment for the &-Handle (CTRL+SHIFT+7) cannot be changed.
>
> You can switch between the two options of key combinations for the displaying and inserting of Handles at any time. Switching from CTRL to CTRL+SHIFT or vice versa to display and insert a Handle translation does not interfere with the Handle key assignments.

To change colors and Handle key assignments

1. In your MATE program group, double-click on the MATE Setup icon.
2. Choose the settings you want in the Color Selection and Key Assignments dialog boxes.

To customize Translation Editor macro key combinations

To change key combinations for the navigation, deletion, editing, and glossary keys, use the WinWord keyboard assignment function as follows:

1. From the Tools menu, choose Options.
2. Scroll down the Category list to the Keyboard icon.
3. Under Shortcut Key, select the key combination you want to change.
4. If you have selected the right check boxes and entered the key letter, the name of the macro currently assigned to that key combination is displayed underneath the check boxes. For example, if you selected the CTRL and SHIFT check boxes and the letter G, the macro name MT1GetChaptGloss is displayed.
5. In the Macros list box, scroll to the macro name associated with the key combination you selected and click on the macro name.
6. The key combination is now displayed in the Current Keys For field on the bottom of the dialog box.
7. Under Shortcut Key, select the new key combination you want to assign to the macro and choose the Add button.

Make sure that you don't select a key combination that is already in use. If the key combination is available, the word "Unassigned" will be displayed.
8. Under Current Keys For, click on the old key combination and then choose the Delete button.
9. Choose the Close button.

To reset the NORMAL.DOT keys to the WinWord default settings

1. From the Tools menu, choose Options.

2. Scroll down the Category list to the Keyboard icon.
3. Make sure the Global option is selected in the Context field.
4. Choose the Reset All button.

To re-install your MATE key assignments

1. From the Tools menu, choose Macro.
2. Make sure the Global option is selected in the Show field.
3. In the Macro Name combo box, select the macro "MT1KeyAssign" from the list of macro names.
4. Choose the Run button.

8 Miscellaneous Functions and Troubleshooting

Troubleshooting

The following problems may occur, and here are some recommendations:

Handles or other macros don't work. The styles in the WinWord template attached to your document may have the same key combinations as MATE. In this case, run the macro "MT1KeyAssign" that is in the Global template (NORMAL.DOT). If problems persist, contact the MATE team.

MATE menus are not present. Run the macro "MT1AddMenus" that is in the Global template (NORMAL.DOT).

You are done translating, but MATE codes still exist in the document. Choose Review from the Tools menu and press the "Remove Mate Codes" button.

Flashing WinWord icon. This signifies that WinWord wants to display a dialog box, even though it is minimized and does not have the focus. Just click on the icon to read the dialog box message. If the message reads "Existing tags with prefix <some prefix> will be overwritten.", click the OK button.

The Prepare Text command failed to complete. This will happen when you try to prepare very large WinWord documents. To fix this, be sure to close all applications before preparing text, make sure you have no WinWord Cache, and break your file into smaller files (use MT1CheckFileSizes to determine which files are too large).

GLOSSARY.TXT file is incomplete. Occasionally, the Excel glossary macro will abort the BLAST.EXE program before it has finished executing. If this is the case, move to your project directory, and manually run "BLAST GLOSSARY.TMP GLOSSARY.TXT". BLAST.EXE is in your Windows directory and must be on the path.

Error Message: Can't find GLOSQL.DLL. This file should be supplied as part of GlossMan. If you do not have GlossMan installed, you will need to copy this file by hand from the directory from which you installed MATE. If errors persist, contact MikeL at x63845.

Miscellaneous WinWord Macros

The following are miscellaneous functions that may prove useful to you when you have mastered the basics of the MATE environment. These functions are supplied as-is, no warranty implied; but we are documenting them so that we won't get accused of unfair trade practices...

All of the macros described below are copied into the template NORMAL.DOT during Setup. To run any of these macros, do the following:

1. From the Tools menu, choose Macro.
2. Make sure the Global option is selected in the Show field.
3. In the Macro Name combo box, select the name of the macro you want to run.
4. Choose the Run button.

MT1AddMenus

Reinstalls the five MATE menu items (Prepare Text, Open All, and Close All on the File menu; and Filter and Review on the Tools menu). This is useful if you have reset all menus in your NORMAL.DOT template to the default menus.

MT1DbgDriver

Runs through the MATE batch process one step at a time. If your batch process was aborted before completing, you can sometimes use this macro to resume processing at the point where the interruption occurred. The individual steps in the batch process are:

| | |
|---|---|
| Mark Hidden | Adds a visible space after each hidden text |
| Paragraph Tag | Adds MT1FILENAMEpnnn tags to the paragraphs. |
| Protect Fields | Hides all fields that are not DDE or LINK (GlossMan stuff). Also hides cross-references that have been smart quoted, and {bmc } art markers. |
| Extract Sentence | Extracts sentences to a TXT file, coalescing duplicates. |
| Text Analyze | Takes the TXT file and GLOSSARY.TXT, and generates an IMG file containing patterns that matched. |
| Build Index | Builds the initial IDX file. |

Auto Translate   Marks up the document, builds the GLO (chapter glossary), builds the IDX file, and copies repeated sentences to GLOSSADD.DOC.

Unmark Hidden   Remove the extra visible spaces we added.

Example

If your run aborts in the middle of auto-translation, and an image file is generated, you can run the "Mark Hidden", "Paragraph Tag", and "Protect Fields" steps. Then, skip the "Extract Sentence" and "Text Analyze" steps (since the image file is already generated). Then run the "Build Index", "Auto Translate", and "Unmark Hidden" steps to complete the MATE process. To skip a step, press the Cancel button in the corresponding dialog box. To run a step, press OK.

MT1GetPrintout

Appends to the end of the GLOSSADD.DOC file a copy of the document paragraphs which were current when each term was entered into GLOSSADD.DOC. Each of these paragraphs is followed by the GLOSSADD.DOC entries found in it. You can select any section of this report and print it using the File Print Selection option in the Print dialog box. This macro is not very interesting if the document file from which a term originates cannot be found on your disk.

MT1InitProject

This macro can be used to move the GLOSSARY.TXT, FILTER.TXT, and document file for a project to a different directory. About the same as a file manager block copy.

MT1KeyAssign

Assigns the keys to the MATE macros. Useful if you have reset the key combinations in your NORMAL.DOT and want to re-install the MATE keys.

MT1Recover

This macro can be used if the batch process stops in the middle of the auto-translation phase. In this case there will be a lot of % markers (used to hide fields from the auto-translation process and thus prevent them from getting corrupted) in the document. This macro repairs the document, and the resulting document will contain usable MATE codes.

MT1RemapKeys

After using Mate Configuration to re-configure MATE, you can use this macro to update a previously prepared document to the new colors and key assignments. This macro currently only supports going from the default MATE settings (Pretranslated: Dark Green, Handles: Blue, Glossary Markers: Red, Repeat Sentence Markers: Red) to the new settings; and the key assignment: "JKLNMHIOPYTRWDQ89654321ZZZ".

MT1XlateJumps

This macro can be used to translate double underlined help jumps with the corresponding topic name help footnotes. This procedure is most effective if the footnotes have been pretranslated to the values of the headings (this can be done with FOOF).

Appendix

A  Preparing Translation Glossaries for MATE

The batch process that prepares the English document for translation requires the glossary file GLOSSARY.TXT. This text file is created with the Excel macro "BuildGlossary" installed on your machine during MATE Setup. To use the BuildGlossary macro, you need to arrange your product glossary in an Excel spreadsheet. Procedures for creating this spreadsheet with various glossary tools used at Microsoft are given under "Creating Excel Spreadsheets for the BuildGlossary macro" later in this Appendix.

The BuildGlossary macro ensures that GLOSSARY.TXT has the correct *structure* to be used with MATE. The glossary must also have specially prepared *content* to be useful. This is the job of the persons creating the glossary. Allow an additional one to two weeks in the glossary schedule to adapt a glossary you already have. If you are creating a new glossary from scratch and follow the guidelines below, allow three extra days to "test" your glossary on a few sample chapters and to fine-tune it.

The extra time you spend on the glossary will be saved several times over during translation and review of the documentation – i.e., during work that's on the critical path of your product's localization schedule.

General Information

The *product glossary* contains translations for all terms relevant to a certain product. It is usually created by the Localizer and, in some cases, by an in-house Translator and approved by the Language Lead, the Terminologist, and the subsidiary.

The product glossary is produced from two sources: the software interface of the new product and early documentation such as specs and chapter drafts. The product glossary therefore has two components:

1. The *Software Interface Glossary* contains all strings that appear on the screens of the product to be localized. These strings are: menu and command names, names of dialog boxes and their individual items, error and status bar messages, etc. The Software Interface Glossary is usually arranged hierarchically, i.e., a menu is followed by the commands it contains and by the dialog box items for each of those commands.

2. The *General Glossary* (or *Documentation Glossary*) is created from terms found in the documentation. These terms relate to the software and to computers in general and are not necessarily mentioned in the interface of the software. Examples are:
   Nouns and names:    scroll bar, directory structure, Microsoft Excel User's Guide Phrases: double-click on the icon; for more information, see
Verbs, adjectives, etc.: scroll, set up, align, enhanced, online

Information Required in MATE Glossaries

Software Interface Terms

Required: English term, category, translation.

Optional: Comment.

The categories should conform to the standard Lingua abbreviations listed below.

| CATEGORY | DESCRIPTION | EXAMPLE (*See screen dump below.*) |
|---|---|---|
| MNU | Menu name | File |
| COM | Command name | Print |
| TDB | Title of dialog box | Print |
| BUT | Name on a button | OK (also: Cancel, Page Setup, Help) |
| TXB | Text box name | From (also: To, Copies) |
| OPT | Option button name (round buttons in dialog boxes) | All (also: Pages, Sheet, Notes, Both) |
| CHX | Check box name | Preview (also: Fast, but no Graphics) |
| TXT | Text string in a dialog box | Printer (also: Print Range, Print) |
| DIA | All other dialog box items | Print Quality (this is a "combo box") |
| MSG | Message (i.e., status, error) | For Help on dialog settings, press F1 (appears in status bar when the Print dialog box is displayed) |
| MAC | Macro name | Built-in macro in Excel, Project, Word, etc. |
| KEY | Key name | ENTER, F1, CAPS LOCK |
| FLD | Field name | E.g., Date or Author fields in WinWord |

Software interface categories

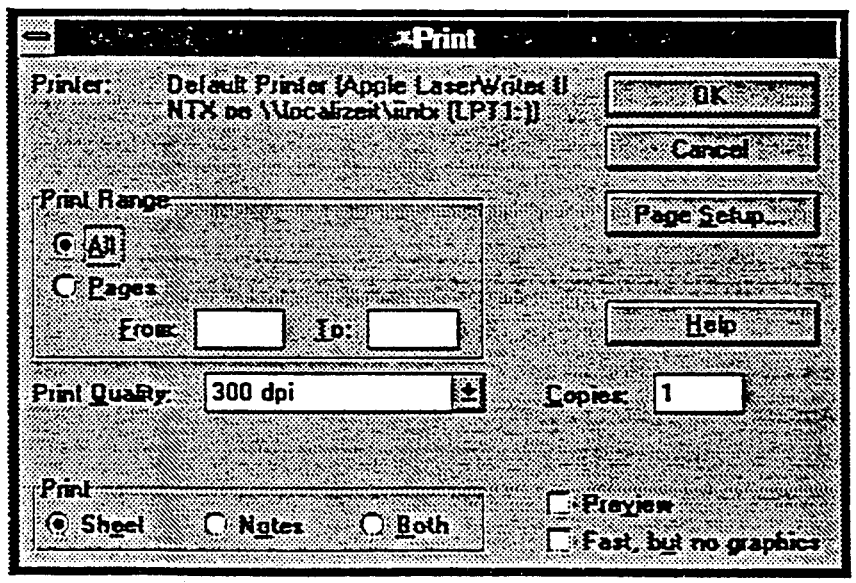

Example of a dialog box and the items it can contain

General Terms

Required: English term, word category or word class, translation.
Optional: Comment.

The word category or word class specifies whether the word is a noun, an adjective, a verb, etc. In addition to the grammatical categories, MATE requires two more categories: the fixed string category (STR) and the template string category (TEM). These are necessary to translate common sentences and phrases automatically - see "Customizing the General Glossary to Your Product" for details on fixed and template strings.

The *minimum* information necessary for general terminology is the specification of nouns, fixed strings, and template strings. These categories are treated as *static*, i.e., the base form given for their translation in the glossaries is usually the form needed in the text and they can be copied straight into a translated sentence.

Verbs, adjectives and similar classes are treated as *non-static*. This means the exact grammatical form of their translation depends on the syntax of the translated sentence. For example, the German translation for the verb "enter" appears in its base form (infinitive) in the glossary: "eingeben". In the syntax of a sentence, it could be needed in a conjugated form, such as "eingegeben" or "geben ... ein". Therefore MATE doesn't pre-translates non-static terms. Instead, it saves them in the online Chapter Glossary for reference. You could collectively enter non-static terms with the category GEN. However, if you have the time, it is worthwhile to add the word class information, especially if you are or will be using the MSTerms database or GlossMan.

| CATEGORY | DESCRIPTION | EXAMPLES |
|---|---|---|
| NOU | Noun (or name) | paragraph, mouse, file name, Microsoft Mail Remote |
| ADJ | Adjective | dimmed, off-line |
| VRB | Verb | double-click, select, install |
| ADV | Adverb | remotely |
| TEM | Template string (common phrases containing variables) | press the %KEY key; choose the %BUT button; From the %MNU menu, choose %COM. |
| STR | Fixed string (common phrases or sentences without variables) | see online Help; Do one of the following; earlier in this chapter; later in this chapter |

General terminology word classes and special MATE categories

In order to create a useful General Glossary for MATE, be sure to read the section "Customizing the General Glossary to Your Product", later in this Appendix.

Required Excel Spreadsheet Structure

The BuildGlossary macro accepts one or two glossary files. You can either combine software and documentation terms in one file or keep the two glossaries separated.

The order of the required columns of information must be as shown in the screen dump below. The four columns *must* be named "Source Term", "CAT", "Target Term", and "Comment."

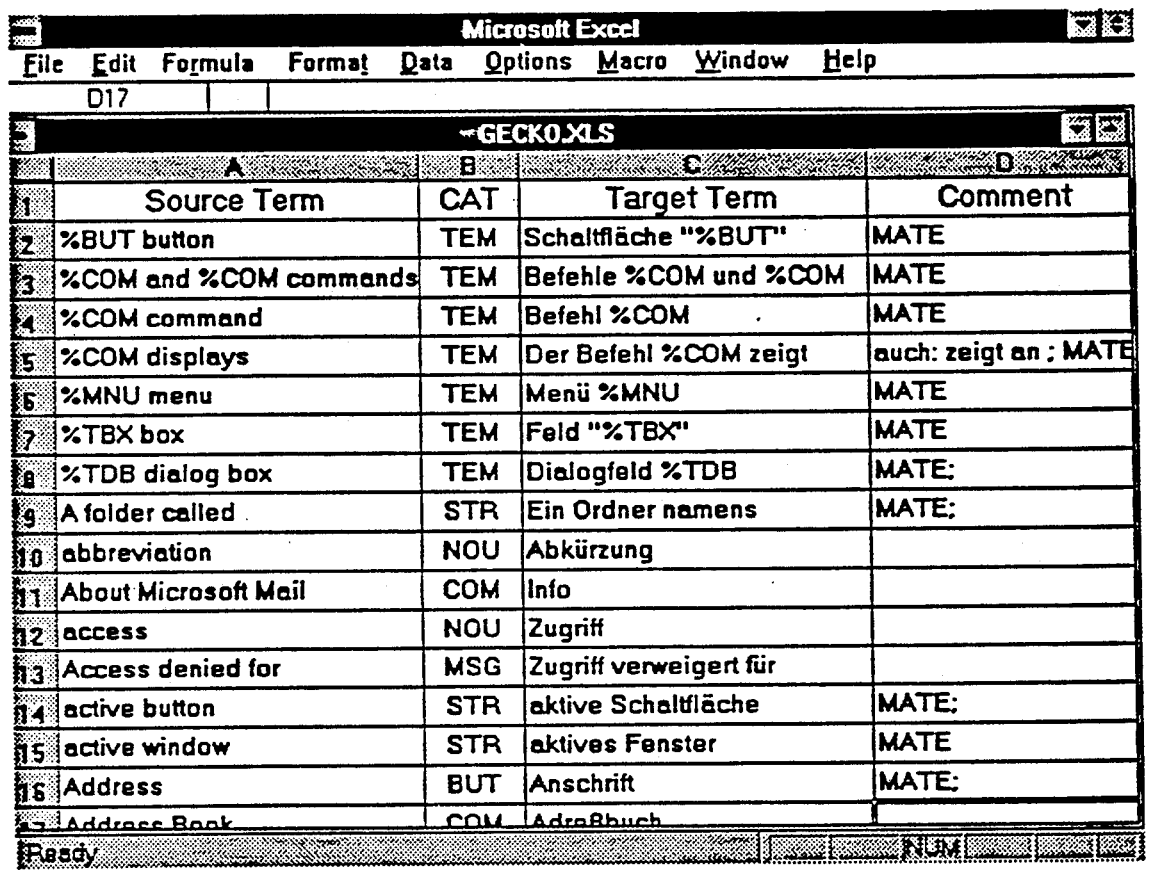

Example of a spreadsheet glossary for input to the BuildGlossary macro

You don't have to sort the entries in a particular way. The BuildGlossary macro performs its own sort, according to the length of the English entry. For instance, in the glossary shown above, the string "A folder called" is shorter (15 characters) than the command name "About Microsoft Mail" (20 characters) and will be sorted below the command name by BuildGlossary. This causes the batch process to find and translate longer terms before it finds shorter ones — "insertion point" before "insert", for instance.

Note that the Comment column above is used to indicate entries which are completely MATE-specific. That's a good idea, because entries such as TEM entries won't make much sense to people unfamiliar with MATE — your subsidiary contact, for example. Or you could enter the comment "MATE" for all entries you want in your MATE glossary, so that you can use it as a criterion when extracting the glossary from a database (such as MSTerms) which contains more than just MATE entries.

Important: What *Not* to Enter Into the MATE Glossary

MATE searches the English text for strings that match glossary entries *exactly* (except for template strings). Therefore the glossary cannot contain any of the following:

1. Comments attached to the English or translated terms. Comments must be given under the "Comment" column of the spreadsheet.
2. Accelerator keys or hot keys attached to the English or translated terms. If you want to list these in your Software Glossary, enter them in a separate column.
3. Several translations or categories for the same English term listed in one cell.
4. Numbers without any text, either in the English or the translation columns or in both.
5. Wrong category abbreviation. Always stick to the standard Lingua category abbreviations to avoid accidentally entering different abbreviations for one category.
6. Wrong capitalization:

*English* entries in the glossary should only have an uppercase first letter if that is the way they usually appear in the documentation. This includes names, most software interface terms, and key names (the entire key name should be uppercase). General terminology such as nouns, verbs, etc. should have a lowercase first letter.

When in doubt, ask yourself how the term will most often appear in the English text. For instance, nouns occasionally appear at the beginning of a sentence, but most of the time they occur within a sentence and should therefore be lowercased.

For *translations*, ask yourself how the term will most likely be needed in the translated sentence. For general terms this will usually be lowercase with some exceptions, such as German nouns.

*Translations for fixed and template strings* should start with a capital letter if they usually appear as a full sentence. The reason is that fully pre-translated sentences replace the English sentence in the prepared document. For instance, the template string "From the %MNU menu, choose %COM" usually matches a full English sentence (after MATE has filled in the variables %MNU and %COM), so the first word should be capitalized.

The table on the next page gives examples for some of these mistakes.

| Source Term | CAT | Target Term | What's Wrong? |
|---|---|---|---|
| File/Alt+F | MNU | Datei/Alt+D | Accelerator key added to source and target terms. Doesn't occur this way in the documentation. |
| More >> | BUT | Weiter >> | This is not how the term will appear in the documentation. Leave out ">>", ":", "...", etc. |
| File name | NOU | Dateiname | Wrong capitalization of English noun |
| merge (re: print merge) | VRB | verbinden | Comment attached to entry |
| Enter | KEY | Eingabetaste | Key names must be in all capital letters (ENTER and EINGABETASTE) |
| Print | COM/TDB | Drucken | 2 categories for one entry. Should be 2 separate entries: Print COM Drucken / Print TDB Drucken |
| default | NOU | Vorgabe; Standard | 2 translations for one English entry. Should be 2 separate entries. |
| 256 | LI | 256 | Number only |
| Choose %CMD | TEM | Wählen Sie %CMD | View this template string in context with the next row. The category for the variable in the template is called "CMD", while the category for the actual command name entry in the next row is "COM". These abbreviations must match exactly. In this wrong example, MATE will look for terms with the category "CMD". It won't find any and will leave |
| Exit | COM | Beenden | the sentence untranslated. |

Examples of wrong glossary entries

Customizing the General Glossary to Your Product

MATE ensures consistent product terminology, but it is also designed to be a typing aid to speed up the Translator's work. The more you customize your General Glossary to your product's documentation, the more MATE can pre-translate. If you apply the rules given here and follow the examples, you can do a thorough job without spending too much time.

True Pre-Translations vs. Pre-Translations With a Handle

There are two ways in which MATE pre-translates text:
1. If an entire sentence can be pre-translated from the information found in the glossary, then MATE inserts this translated sentence into the document, overwriting the original English sentence. This includes sentence-equivalent items such as the content of a table cell or a heading.
2. If only part of a sentence is found in the glossary, MATE pre-translates it but doesn't insert it into the document. Instead, it saves it in the Index file. In the document, it underlines the part of the sentence that was found and assigns it a Translation Handle. The reason is that partial translations inserted into an English sentence only save time if they happen to occur at the beginning or end of the sentence and the syntax of the translated sentence equals that of the English one. The translations for terms with a Handle are inserted at the cursor when the Translator activates the a macro. Handles effectively provide building blocks in form of partial pre-translations that can be inserted *when* and *where* they are needed in the translated sentence. Thus Handle translations are mobile – not stationary and buried in the English text as are search-and-replace type pre-translations.

Terms That are Never Pre-Translated

MATE does not pre-translate non-static terms, i.e. words for which the translation depends on the syntax or context of the translated sentence. The time gained by having the term pre-translated may be lost if the Translator has to edit the word to fit the sentence. Terms with more than one translation are also never pre-translated. Non-static terms can be looked up online in the Chapter Glossary.

How Different Categories are Treated by MATE

The categories given for software and general terms earlier are listed again in the table below, and the way they are treated by MATE is indicated. Note that all software interface terms are static, because they are simply names and must be translated as they will appear in the localized interface.

If a category is *case-sensitively matched*, then terms of that category are only pre-translated if the initial letter of the word in the text is the same as the initial letter of the English glossary entry.

| CATEGORY | DESCRIPTION | STATIC | Case-sensitively matched | Pre-Translation Method |
|---|---|---|---|---|
| MNU, COM, MSG, etc. | Software interface term | Yes | Yes | Handle, or pre-translated and inserted in text if it matches a "sentence-equivalent" text element |
| KEY | Key name | Yes | Yes | Same as above |
| NOU | Noun (or name) | Yes | Yes | Same as above |
| TEM | Template string | Yes | No | Handle, or pre-translated and inserted in text if it matches a sentence |
| STR | Fixed string | Yes | No | Same as above |
| VRB | Verb | No | No | No pre-translation, can only be looked up in the Chapter Glossary |
| ADJ | Adjective | No | No | Same as above |
| ADV | Adverb | No | No | Same as above |
| All | Any term with more than one translation for the same case (lower/uppercase) | No | Yes | Same as above. Example:<br>default NOU Vorgabe<br>default NOU Standard<br>default ADJ standardmäßig |

The different ways static and non-static terms are treated by the MATE batch process Examples 1. Your product glossary has these three entries:

| | |
   |---|---|
   | Format | MNU |
   | format | NOU |
   | format | VRB |

This term is pre-translated and receives a Handle in the text *only* where it occurs with a capital letter. Only the capitalized version of the term has a unique translation and is of a category that gets pre-translated. The other two versions of the term are entered into the Chapter Glossary.

2. Your product glossary contains the following fixed string:

| | |
   |---|---|
   | See Also | STR |

This string occurs repeatedly in Help files. Any version of this string will be pre-translated, including "See also" and "see also", because fixed strings are matched case-insensitively. Whenever this string corresponds to a sentence-equivalent element in the English text – this is the case in Help files where it is usually a heading – then the English text is replaced with the translation. Whenever it occurs as part of a sentence (e.g., "For details, see also Chapter 9"), it is marked with a Handle (e.g., "For details, see also$^J$ Chapter 9").

Terms will be found even if the glossary entry matches only the beginning of a word in the text, as long as the word exceeds the glossary entry by four or less letters. If such a term is of a static category then it will receive a Handle. Otherwise it will be marked with a Chapter Glossary Marker ($^\wedge$) in the text.

Examples

1. Your product glossary has these entries:

| | |
   |---|---|
   | file name | NOU |
   | generate | VRB |
   | exceed | VRB |
   | error | NOU |
   | File | MNU |
   | file | NOU |

Your text contains the following heading and sentence:

Files

For file names exceeding 8 characters an error will be generated.

The resulting MATE output will be:

Files$^J$

For file names$^J$ exceeding$^\wedge$ 8 characters, an error$^K$ will be generated$^\wedge$.

The first letters of the heading matched the MNU entry "File". Its translation can be inserted with the Handle J. In the next paragraph (i.e., the sentence below the heading) J retrieves the translation for "file name" and K the translation for "error."

The carets ($^\wedge$) indicate that the first parts of those non-static terms were found and entered into the Chapter Glossary file.

Template Strings

Template strings are partial or full sentences with embedded variables; they provide the most convenient way to pre-translate with MATE. Variables are place holders for terms of the same category. They are entered into the template string with a percent sign followed by the category for the place holder.

Examples

1. Your product glossary contains the following template string and template string translation:

Choose %COM from the %MNU menu    TEM    Wählen Sie den Befehl %COM aus dem Menü %MNU This string will be pre-translated, no matter what command name and menu name happens to occur in the sentence in the English text. MATE will pre-translate "Choose Open from the File menu" as well as "Choose Convert Table to Text from the Table menu", *as long as* you also have the command and menu names in your glossary and they have the matching category abbreviation. So to successfully pre-translate "Choose Convert Table to Text from the Table menu" you need the following entries in your glossary in addition to the template string:

| Convert Table to Text | COM | Tabelle in Text umwandeln |
   | Table                 | MNU | Tabelle                   |

The translation you enter for the template string should be taken from the Style Guide for your language. The order in which you use the variables in the translated template string doesn't have to equal the order in the English template. Your Style Guide could dictate that the translation for the English string in this example should mention the menu name first, then list the command to choose. Then your translated template for the same English template could look as follows:

Choose %COM from the %MNU menu    TEM    Wählen Sie aus dem Menü %MNU den Befehl %COM 2. Your product glossary looks as follows:

| SOURCE TERM | CAT | TARGET TERM |
   |---|---|---|
   | From the %MNU menu, choose %COM | TEM | Wählen Sie aus dem Menü %MNU den Befehl %COM |
   | Then choose the %BUT button | TEM | Wählen Sie anschließend die Schaltfläche "%BUT" |
   | Select the %CHX option | TEM | Wählen Sie die Option "%CHX" |
   | %MNU menu | TEM | Menü %MNU |
   | Arrange All | COM | Alle anordnen |
   | New Window | OPT | Neues Fenster |
   | Window | MNU | Fenster |
   | Close | BUT | Schließen |
   | Bold | CHX | Fett |
   | OK | BUT | OK |

Your English document contains the following sentences:

> From the Window menu, choose Arrange All.
>
> Then choose the Close button.
>
> Select the Bold option, and then choose the OK button.
>
> From the Window menu, choose New Window.

Your prepared document will then look like this:

> Wählen Sie aus dem Menü Fenster den Befehl Alle anordnen.
>
> Wählen Sie anschließend die Schaltfläche "Schließen".
>
> Select the Bold option[J], and then choose the OK button[K].
>
> From the Window menu[J], choose New Window[K].

The first two sentences could be assembled and were fully pre-translated. They were therefore inserted into the document, replacing the English sentences. The third sentence matched partially to two template strings. The template strings were assembled with the variable values "Bold" and "OK" and pre-translated. They are available with Handles. The last sentence, although it fully matches a template, could not be assembled, because the command name "New Window" was not found with the category COM in the glossary (only with the category OPT).

In the example above, note that command names and menu names in template strings are pre-formatted with the correct international character formatting (even if they're assigned a Handle). Key names are also formatted. This is possible because the category information is given as part of the variable in the template string, and MATE "knows" that these variables need particular formatting. If you need quotation marks around interface elements, such as the button and option names in the example, then provide them as part of the *translation* for the template string, as shown in the example glossary above. (Don't enter them in the English template string, because the English text doesn't have quotes around names.) To enter French chevrons, do the same, but remember to enter a non-breaking space between the chevrons and the name, so that your translated document will not contain lonely chevrons at the end or beginning of a line.

Rules and Tips for Template Strings

1. Template strings must have some static text. They cannot consist of the variable only. The more unique the static text is, the faster MATE can find and assemble the template. For example, you can have the template string:   %KEY + %KEY
Although there are only 3 static characters (the space, the plus sign, and the second space), there are not that many plus signs in the documentation, so the template can be found quickly. *Avoid* a template string like:   %KEY and %KEY
For this template string, MATE looks at every "and" in your document and then check if the terms before and after the "and" match any key names in your glossary. The word "and" is so common that this will take a long time. Instead, enter a template like:   %KEY and %KEY keys.

2. Don't use nouns as variables, unless you have a very unique template. Most of your glossary entries are nouns. The following template may make your batch process take over a day:   %NOU and %NOU   *Don't use it!*

3. If a template contains more than one variable of the *same* category, the order in which MATE inserts the variables of that category into the translated template will be the same as the order in the English template.
4. You can invent your own categories other than the standard Lingua categories, but they should be 2 or 3 letters long and uppercased. For example, there are several toolbars in WinWord, such as the Standard toolbar, the Formatting toolbar, and the Outlining toolbar. If you want to make up a template string containing toolbar names, you could invent the category TLB and create a template such as:

On the %TLB toolbar, click the %BUT button TEM

Of course you also need to enter the toolbar names with the category TLB, as follows:

| Standard | TLB |
| Formatting | TLB |
| Outlining | TLB |

Tips for Nouns

1. Enter compound nouns into your glossary, such as "data file" for example. You may already have the terms "data" and "file" in your General Glossary, and MATE would therefore find each of them separately. But, aside from the fact that the Translator would have to invoke two Handle macros, the two put together may not necessarily give you the correct translation for the entire term. If you add "data file" to your glossary, MATE will find it first and assign one Handle to it.
2. Sometimes it pays to enter both the singular and the plural form of a term. For example, if the *English* plural changes the spelling of the word, such as from boundary to boundar*ies*, MATE will not find it if you only have the singular form in the glossary.

If a term's plural in the *target* language deviates substantially from its singular form, you might also add both forms. For instance, the German translation for the two terms "paragraph" and "paragraphs" is "Absatz" and "Absätze", where the plural form is complicated by the umlaut. Make sure, though, when you add plurals that these are terms which occur frequently enough to warrant an extra glossary entry. Most *English* plurals simply have an extra "s" at the end, and can therefore be matched to the singular form. And many *translated* plurals can easily be supplied by typing the plural ending at the end of a singular inserted with a Handle.

Filter File Content and Format

There are items you don't want MATE to find in the text, even though they are software interface terms. These are short terms such as "At", "To", "From", "And", "Or", etc. If you leave those in the glossary, MATE will mark every occurrence with a Handle if it matches the capitalization and with a Glossary Marker if it doesn't. These words are too common, and the software interface items too context specific, to be useful. For instance, depending on the content of a dialog box, the term "To" could be translated into German as "zu", "zum", "in den", "um zu", etc. Since the glossary doesn't specify the context, the Translator still has to guess at the translation. Nothing is gained but the document is cluttered up with useless markers. Ideally, terms such as these should be provided to the Translator in a printout of a hierarchical software glossary.

To build the FILTER.TXT file, create another Excel spreadsheet which has the same format as the glossary, namely four columns called "Source Term", "CAT", "Target Term", and "Comment". Copy the terms you don't want MATE to find into that file. Then name it FILTER.TXT and save it as text-only. The BuildGlossary macro will take the entries in the filter and remove them from GLOSSARY.TXT, but they will still be contained in your original product glossary.

General Tips

- Do not add unnecessary terms to your General Glossary.
  The bigger your glossary, the more time MATE needs for the source text analysis. Also, the partial matching can lead to an overload of Handles and Chapter Glossary markers if you are not selective about your entries. Also see "The Filter File Content and Format" above.
- You must follow the grammar of standardized English phrases exactly...
  ... down to spaces, commas, and hyphens when creating template and fixed strings or MATE won't find the entry in the text. If you enter the fixed string "For on-line Help, see", but the English text contains "For online Help, see", the string will not match.
- Work with the US Editors and Writers on your project.
  Everyone working on a project which uses MATE should be aware of MATE's basic functionality and the importance of adhering to conventions. If the Writers in your business unit have their own Style Guide, ask for a copy to find out how they express common phrases. Do they write "From the File menu, choose Open" or "From the File menu, choose the Open command"? If you enter a template string for the first syntax into the glossary while they use the second one, these sentences will not be pre-translated. You should not accept documents for translation which haven't been edited yet. Writers can't always adhere to the chosen style, but Editors will clean up the style and make it consistent.
- Ask for feedback from your Translator on the usefulness of the MATE glossary.
  Since the Translator works with the result of your glossary, he or she may have comments regarding terms you should add or filter out. For example: the translation for the verb "indent" is not available with a Handle because it is a verb. The French translation for this word, however, is so long that the Translator may want to have a pre-translation available with a Handle. In this case, for the French MATE glossary, you could add the following entry, remembering that a term with the category "STR" is considered static and receives a Handle:

| SOURCE TERM | CAT | TARGET TERM | COMMENTS |
|---|---|---|---|
| indent | VRB | retrait de paragraphe | |
| to indent | STR | retrait de paragraphe | MATE |

The second entry above will be found by MATE before it finds the first one, because the second entry is longer. Every time the English document contains "to indent", the Translator can enter the entire translation with a Handle. Yet, when the document contains "indented" or "indents", there will be no Handle.

Creating Excel Spreadsheets for the BuildGlossary macro

The following procedures describe how to create files for the BuildGlossary macro from MSTerms, GlossMan, and "old" Excel spreadsheet glossaries. You can have two files as input to the BuildGlossary macro (one for software and one for general terms, for instance), as long as both are in the required format.

Terminology Stored in MSTerms

1. Be sure you're working with the most up-to-date terminology for your project.
2. Use the File Export command in MSTerms to dump the data into a file with the extension .LTM. If your file doesn't have this extension, the BuildGlossary macro cannot recognize it as an MSTerms dump and may not create GLOSSARY.TXT correctly.
3. To create GLOSSARY.TXT, see "Using the BuildGlossary Macro" below.

Note Currently the File Export command creates comma-separated files. (This will change soon.) The BuildGlossary macro therefore has to change the separator setting to "Comma" but cannot reset it back to the default "Tab" option. You need to change the separator option back to tab-separated yourself after processing an .LTM file with BuildGlossary and *before* processing other files, such as an Excel spreadsheet.

Terminology Stored in GlossMan Databases

Use the Dump utility to extract entries from GlossMan. This will result in a file that can be read directly by the BuildGlossary macro. To use GlossMan, GLOSQL.DLL must be on your path.

1. Make sure that all strings are localized and up-to-date for the topics documented in the chapters you are about to prepare with MATE.
2. In the MATE program group, double-click on the Glossary Dump icon.
3. From the File menu, choose Select Items.
4. In the dialog box, click on each item you wish to be included in the dump. The item called "Default String" includes items in the data base that are not mentioned in the "Select Items" list box. Choose OK.
5. From the File menu, choose Dump.
6. The following dialog box will be displayed:

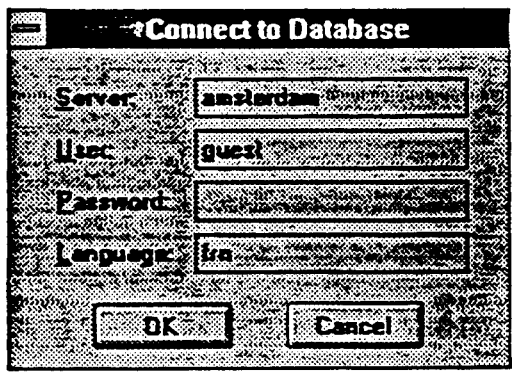

7. Provide the database information requested in the dialog box. Note that the abbreviations for "Language" vary, depending on which database you're using. Choose OK.

The following dialog box will be displayed:

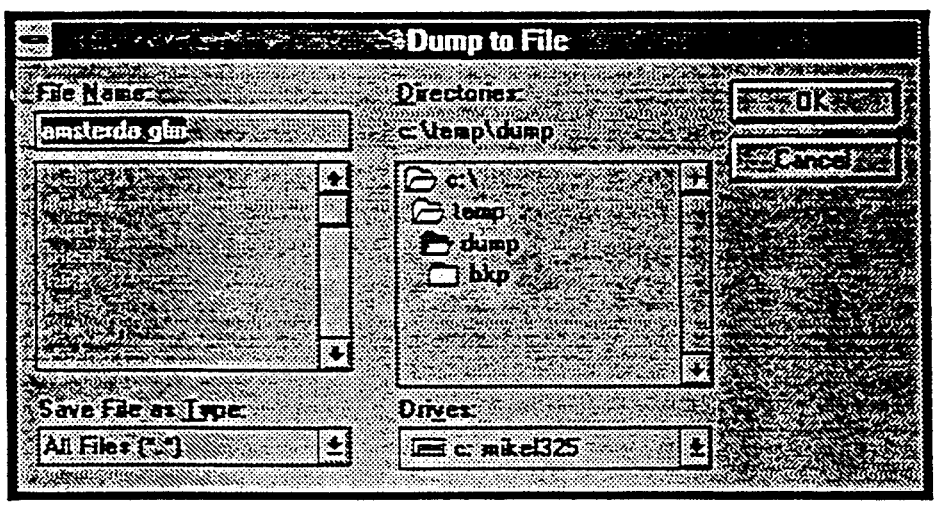

8. Enter the file name. The default file name consist of the first 8 characters of the database name, followed by ".GLM".

> Important This file must have the extension .GLM. The BuildGlossary macro uses the extension to determine that the file is a GlossMan dump file. If the file does not have this extension, the macro will not work.

9. Choose OK again. The Dump utility now retrieves terms from the database. If it is successful, you will get a message like:

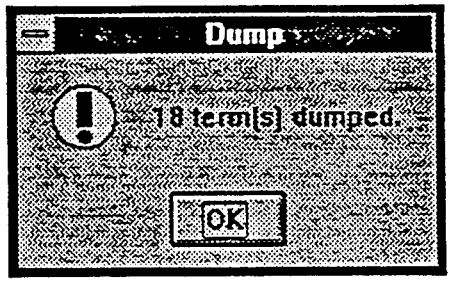

Otherwise, you will get a SQL Server error message.

5. Exit the Dump utility.

Terminology Stored in Excel Spreadsheets

You can either prepare your spreadsheets following the guidelines given under "Required Excel Spreadsheet Structure" earlier in this Appendix, or you can preserve your own format. If you want to keep your own spreadsheet format, create a temporary spreadsheet by moving any extra columns, such as hot key columns, to the right of your spreadsheet.

These columns will be ignored by the macro, as long as columns A - D are labeled "Source Term", "CAT", "Target Term", and "Comment" and contain the corresponding entries.

If you have more than two spreadsheets (say an additional spreadsheet for the translation of messages), append the third spreadsheet to one of the others. However, ask yourself how much terminology is necessary for the translation of documentation or Help files. Error messages and even most other messages are usually not mentioned in the documentation and therefore shouldn't be added to the MATE glossary. If your documentation contains a chapter on error messages, you can add the messages to your MATE glossary for the preparation of that particular chapter only.

Be sure to update your spreadsheets to the most current terminology available for the project. To create GLOSSARY.TXT from your .XLS files, see "Using the BuildGlossary Macro" below.

Other Localization Tools

If your group uses other tools, such as RLTools or custom token file tools, create an Excel spreadsheet glossary as described earlier in this Appendix. If your tool does not produce the necessary software category information, you need to fill it in before using the BuildGlossary macro to create the GLOSSARY.TXT file.

Using the BuildGlossary Macro

The BuildGlossary Macro is stored in the Excel macro sheet MATE.XLM. The macro calls the DOS-based utility BLAST.EXE. MATE.XLM and BLAST.EXE are installed during MATE Setup in the MATE directory and the Windows 3.1 directory, respectively. Make sure that the Windows directory is on your path so that BLAST.EXE can be run.

1.  In the MATE program group, double-click on the Excel icon labeled "Glossary Macros".
    This icon starts Excel and opens the macro sheet MATE.XLM.
2.  From the Macro menu, choose Run.
3.  Double-click on the macro MATE.XLM!BuildGlossary (the first macro in the list).
    The first Open dialog box is displayed with the default extension .GLM in the File Name box.
4.  If your file has a different extension, change the extension.
    If your file is not listed in the File Name box, then in the Directory box, switch to the directory containing your glossaries.
5.  Double-click on the glossary file in the File Name list box to open the file.
    The macro checks if your file is in the correct format and removes ending punctuation and extra spaces from the data. This may take a while, depending on the size of your glossary.
    Then the second Open dialog box is displayed with the default extension .LTM in the File Name box.

6. If you don't have a second file, choose Cancel. If you have a second file, but it is not a MSTerms file (extension .LTM), then repeat Step 4. Choose OK to open the second file.

The macro again removes ending punctuation and extra spaces from the data, taking its time with it. Then a message appears, asking whether you want to save the large Clipboard. Choose No.

A third Open dialog box is displayed with the default file name FILTER.TXT in the File Name box.

7. If you don't want to use a filter, choose Cancel. If you wish to apply a filter, make sure you're in the directory containing the FILTER.TXT you want to use. Choose OK.

BuildGlossary now creates temporary new columns in the glossary and replaces capital letters with a tilde (~) for sorting purposes. When it has sorted and restored the entries, it saves the file under the temporary name GLOSSARY.TMP.

8. If you had an old GLOSSARY.TMP in your directory, a message asks if you want to replace the file. Choose Yes.

The macro now runs the DOS utility BLAST.EXE to remove duplicate entries from the glossary. BLAST.EXE saves the glossary as text with the required name GLOSSARY.TXT. All open files will be closed except for the macro sheet MATE.XLM.

> Important If you receive an error message during Step 8, Excel could not call BLAST.EXE because Windows 3.1 is not on your path. If GLOSSARY.TMP has been created, this is no problem. Change to the DOS prompt and then to the Windows directory. Type blast, a space, the path to the directory in which you just created the GLOSSARY.TMP file, a space, the full path again and GLOSSARY.TXT. For example:
>
> ```
> c:\win3>blast c:\proj\glossary.tmp c:\proj\glossary.txt
> ```
>
> BLAST will take less than two seconds to remove duplicates and create the GLOSSARY.TXT file.

11. Always take a quick look at GLOSSARY.TXT to make sure it is correct. You can load the file into Excel, as long as you don't change or save it.

Look for the following:
    - All template strings (TEM) must be sorted to the top, and according to length. Then all remaining entries follow, also sorted according to length.
    - Scroll through the file to see how long it is. Sometimes Excel terminates the BLAST utility early, resulting in an incomplete GLOSSARY.TXT file. If you don't see short entries at the end of the file that you know should be there, then follow the instructions in the "Important" box under Step 8 to run BLAST from the DOS prompt rather than from within Excel. Be sure to specify GLOSSARY.TMP as input and GLOSSARY.TXT as output file.

12. If GLOSSARY.TXT looks good, close it without saving it.

13. Exit Excel.

A message appears, asking whether you want to save the changes in MATE.XLM. Choose No.

> Important Run the glossary macros each time you have updated your product glossary to ensure that the GLOSSARY.TXT file is in the correct format and that MATE is processing your document using the most current terminology.

Descriptions of Glossary Macros in MATE.XLM

| | |
|---|---|
| DRIVER | This macro retrieves the document name, determines if preprocessing must be done for customized macros (such as GLM2Gen), and calls the appropriate routines. |
| Gen2MATE | The macro that creates MATE glossaries. It eliminates all columns from the glossary except for Source Term, CAT, Target Term, and Comment; ordering them correctly. It then deletes this title row, gets the filter filename, applies the filter, builds the glossary, then calls BLAST.EXE to remove the duplicates. |
| NoBlanks | Removes leading and trailing spaces from all cells in the whole spreadsheet. Prompts for the spreadsheet. |
| MergeGloss | This macro allows two glossaries with identical column numbers to be merged together. Prompts for both spreadsheets to be merged. No error checking. |
| CopyCol | Copies the column where R1Cn has the specified name to one column past the last active column. Used by Gen2Mate to move the four columns to the right, then everything else is deleted. |
| GetColumn | Finds the cell containing the specified string (column name). |
| Filter | Assumes the windows Filter and Glossary exist, and removes all terms in column 1 of Filter from the Glossary spreadsheet. |
| MakeGlossary | Generates a MATE glossary. Sorts the rows in order of length of English entry (template strings to the top, the rest in order of decreasing length) and case-sensitively alphabetized within a group of entries with the same length. What that means is that A, paragraph, Paragraph, z, Paragraph, PARAGRAPH sorts as a, PARAGRAPH, Paragraph, Paragraph, paragraph, z |

B  Auto Demo

This Appendix contains instructions on how to start the Auto Demo and a listing of the text displayed during the presentation.

To start the Auto Demo

1. Double-click on the PrimeMATE icon in the MATE program group to start WinWord with the instruction template (the template MATEINIT.DOT in the MATE subdirectory installed by Setup).

2. Double-click on the Start Demo button on the instruction template.

– Or –

1. Switch to the subdirectory \MATE\EXAMPLES. This directory is installed during Setup, by default in your WinWord directory.
2. From the File menu, choose Open.
3. In the File Name box, enter the following file name: AD.DOT. Then choose OK.

This opens the template file AD.DOT and starts the Auto Demo macro, displaying the introductory screen below.

Auto Demo Script

---

Welcome to MATE[J]

This Auto Demo introduces the main Translation Editor macros. The demo script and additional screen shots are provided in Appendix B of the MATE User's Guide, so that you can follow along on paper.

To understand MATE and this Auto Demo it will help if you:

- Have basic knowledge of WinWord templates and macro key assignments
- Have read Chapters 1, 5, and 6 of the MATE User's Guide To use the Translation Editor macros demonstrated here on a real English document, the document first has to be prepared with the MATE batch process. Preparation of the English document is described in Chapters 3 and 4 of the User's Guide.

How to run the demonstrations

Throughout the presentation, read the text in this document window first. Always press ENTER when you are ready to continue to a new screen. When prompted in the text, press ENTER to start one of the four demonstrations and read the explanations in the status bar. You cannot move back to a previous screen, but you can exit whenever the Exit option appears in the status bar. To exit, press X and then ENTER.

The Open All command

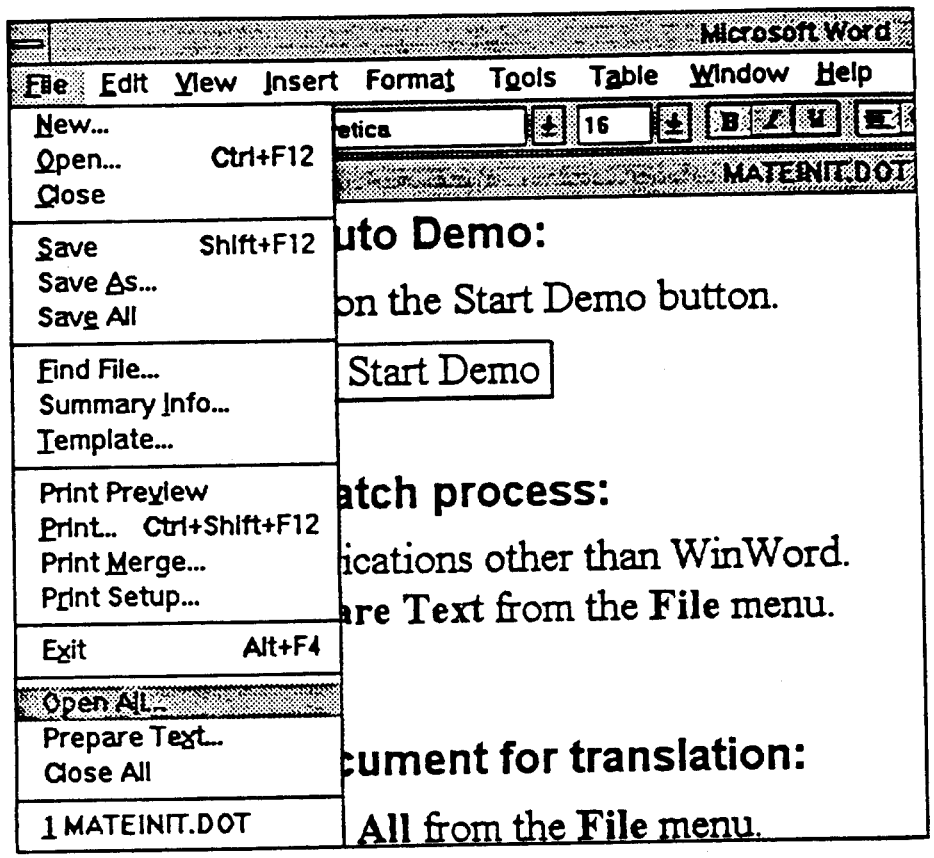

To start your translation of a prepared document, use the Open All command in the File menu. This MATE command opens the following four files:

Press ENTER to open each document...

1. The prepared English document (the example file is named DEMO.DOC).

2. The Index file (DEMO.IDX). Contains translations for *static* terms (software interface terms, nouns with unique translations, common phrases) and an index to the English paragraphs in which these terms occur.

3. The Chapter Glossary (DEMO.GLO). A dictionary of *non-static* terms (verbs, adjectives, nouns with multiple translations) found in the English document.

4. The Glossary Additions file (GLOSSADD.DOC). Can be used to collect new terms for which no translation is provided in the glossaries. Also contains repeated sentences found in the English document.

The Open All command moves the Chapter Glossary, the Glossary Additions file, and the Index file off-screen. You can display either of the first two files with a hot key when you need to look up a term or enter a new term into the Glossary Additions file.

The Index file is never displayed on screen.

MATE Markers in the Prepared Document

During the text preparation process, the following items are inserted into the English document (see DEMO.DOC in the window below):

- Sentences for which translations could be assembled from the glossary are inserted into the text, replacing the English sentence. These pre-translated sentences are formatted green, as the translation for "Then choose the OK button." in the first paragraph below.

- Three types of markers are inserted into the remainder of the English text: Translation Handles (blue), Glossary Markers (red), and Repeated-Sentence Markers (red). These markers will now be described and their use demonstrated.

---

The blue superscript letters (J, K, and L) at the end of underlined words or phrases are called Translation Handles. They are exactly that: handles with which you can "grab" the translation for the underlined term when you need it.

If you hold down CTRL+SHIFT and press the Handle letter, the translation for the term is inserted at your cursor.

If you hold down CTRL and press the Handle letter, the translation for the term is displayed in the status bar. This allows you to view in advance the translation you will receive with that Handle.

---

The red marker [1aa] at the beginning of the first sentence is a Repeated-Sentence Marker. It tells you that this sentence occurs again further down in the document. The number "1" in this marker indicates that the sentence occurs *one* more time. The letters "aa" identify the particular sentence to the macro.

To use the repeated sentence marker, you translate the first occurrence of the sentence. Then, with your cursor positioned at the end of the translation you just entered, press the RepeatSentence key, F12. This key copies the translation to other occurrences of this sentence and formats them in the color of pre-translated text.

---

The red carets (^) following the words "search" and "replace" in the text below are Chapter Glossary Markers. They indicate that these words are contained in the Chapter Glossary and can be looked up by pressing the DisplayGlossary key, CTRL+SHIFT+G. You don't need to specify which term you want to look up. When you press CTRL+SHIFT+G, the Chapter Glossary window is displayed with all the terms that have a Glossary Marker in the current paragraph (the paragraph containing your cursor).

When you are finished with one paragraph and continue to the next, you need to press CTRL+SHIFT+G again to update the Chapter Glossary list to your new paragraph. Or you can use the HideGlossary key, F10, to hide the glossary window again.

Q & A #1: Handles; Glossary Markers

> Q: Why do some terms have a Handle while others have a Glossary Marker?
> 
> A: Only *static* terms have a Handle: software interface terms and nouns with *unique* translations, and common phrases.
> 
> *Non-static* terms can be looked up in the Chapter Glossary. These are words for which the translation depends on the syntax of the sentence, such as verbs. The Chapter Glossary also contains nouns with more than one translation.
> 
> Q: How can the letters and numbers on the keyboard cover all the Handles needed for static terms in a document?
> 
> A: A Handle letter is not tied to a particular term, but to a particular *order*. If the order of your Handles is J, K, L, N, M ..., then these letters are assigned in that order to static terms in each paragraph, regardless of what the terms are. To change the order, follow the instructions in Chapter 7 of the User's Guide.

Demonstration #1: Handles, Chapter Glossary, Repeated Sentences

> Let's demonstrate these keys on the text below, using the Handles CTRL+SHIFT+J and CTRL+SHIFT+K, the DisplayGlossary key, CTRL+SHIFT+G, the HideGlossary key, F10, and the RepeatSentence key, F12. Assume for now that you translate by inserting your words in front of the English sentence. Your cursor is therefore positioned as indicated by the vertical bar in front of the first word.
> 
> Assume that the translation into German is as follows:
> 
> Um Zeichenformatierung zu finden oder zu ersetzen, wählen Sie den Befehl Ersetzen aus dem Menü Bearbeiten.
> 
> (Zeichenformatierung = character formatting; ersetzen = replace)
> 
> During the demo, each step is announced in the status bar.
> Press ENTER whenever you're ready to execute a step.

Steps listed in the status bar

1: The translation for the word 'To' is typed - namely 'Um' ...

2: CTRL+SHIFT+J is pressed to insert the translation for 'character formatting' with the Handle J.

3: The translation for the words ' search for and ' is typed ...

Assume now that you want to look up the translation for the word 'replace' in the Chapter Glossary 4: CTRL+SHIFT+G is pressed to display the Chapter Glossary.

| | | | |
|---|---|---|---|
| \|¶\| Um Zeichenformatierung zu finden und zu |To search^ for and replace^ character formatting^J, choose the Replace command from the Edit menu^K. | | |
| Wählen Sie dann die Schaltfläche "OK". | | | |
| The first sentence^J above is repeated here... ¶ To search^ for and replace^ character formatting^K, choose the Find command from the Replace | | | |
| 1 | search | VRB | suchen |
| 2 | replace | VRB | ersetzen |
| 3 | | | |
| 4 | | | |

5: When you've looked up the translation for the word 'replace', it is typed into the text...

6: F10 is pressed to hide the Chapter Glossary.

7:    CTRL+SHIFT+K is pressed to translate the rest of the sentence with the Handle K.
Note that bold formatting was pre-applied to command and menu names
The RepeatSentence key will now be demonstrated...

8: F12 is pressed to copy the translated sentence to the second occurrence.

9: A+Enter is pressed to replace the second occurrences of the sentence without confirmation.

Q & A #2: RepeatSentence Key; Chapter Glossary Entries

| | |
|---|---|
| Q: | Do I have to press F12 immediately after I translated the repeated sentence or can I enter more text before pressing F12? |
| A: | Press F12 after you have completed the translation for the sentence. When you press F12, all text between your cursor and the Repeated Sentence Marker is considered to be the translation for the sentence. This allows you to express one English sentence in two or more translated sentences. |
| Q: | When I looked up the verb "replace" in the Chapter Glossary, the translation happened to be in exactly the form that I needed in the text. Is there a way to copy the term from the Chapter Glossary window into the text? |
| A: | Yes. You can use the CopyGlossaryEntry key, CTRL+G, to do this. This key and other glossary keys are described under "Displaying and Inserting Chapter Glossary Entries" in Chapter 6 of the User's Guide. |

Q & A #3: Handles; Paragraph Identification Tags

> Q: What exactly happens when I use a Handle?
> A: Holding down CTRL or CTRL+SHIFT while pressing the Handle letter activates a macro. The macro detects which Handle you pressed and which paragraph your cursor is in. It can then find the translation for the term in the Index file.
>
> The DisplayGlossary macro also uses the position of your cursor to find the non-static terms contained in the paragraph and display them in the Chapter Glossary window.
>
> Q: How does a macro know which paragraph I'm in?
> A: Each paragraph in the prepared document is tagged with an invisible bookmark. The macros look at this paragraph identification tag to determine which paragraph your cursor is in.

Demonstration #2: More on Handles; ToggleCase Key

> You can use a Handle as often as you like within one paragraph or not at all. Note that *you don't move the cursor* to use a particular Handle. It doesn't matter where in the paragraph your cursor is located – the translation will always be inserted at the cursor.
>
> The order in which you use the Handles in a paragraph is arbitrary. You could have formulated your translation by starting with the translation for "choose the Replace command..." and ending it with "to search for and replace character formatting." Then you would have pressed CTRL+SHIFT+K first.
>
> Let's translate the first sentence again to demonstrate this and also introduce a handy key, the ToggleCase key, CTRL+SHIFT+0 (zero). The ToggleCase key changes the first letter of a term inserted with a Handle from uppercase to lowercase and vice versa.
> Press ENTER to activate each step shown in the status bar...

Steps listed in the status bar

1: CTRL+SHIFT+K is pressed to translate 'choose the Replace command...' with Handle K.

2: CTRL+SHIFT+0 is pressed to change the first letter of the Handle translation from 'w' to 'W'.

3: The sentence will now be finished, using the Handle J to translate 'character formatting' . . .

Demonstration #3: Handles, DeleteSentence Key, and Forward Key

> We'll now finish the translation of the two paragraphs below, introducing two more keys: the DeleteSentence key, CTRL+SHIFT+S and the Forward key, CTRL+SHIFT+F.
>
> After the English sentence is translated, you need to delete it. To delete the sentence following your cursor, press the DeleteSentence key, CTRL+SHIFT+S. Then your cursor is positioned just before the next English sentence and you can insert its translation.
>
> If the sentence following your cursor is pre-translated or if you have come to the end of a paragraph, then you want to move past the sentence or paragraph mark to the next occurrence of translatable text. Press the Forward key, CTRL+SHIFT+F. This key will move your cursor past symbols, pictures, index fields, and other text that shouldn't be translated. Do not use the mouse to reposition your cursor or insertion point.
> Press ENTER to activate each step announced in the status bar...

Steps listed in the status bar

1: CTRL+SHIFT+S is pressed to delete the English sentence that was just translated.

2: CTRL+SHIFT+F is pressed to move past the pre-translated sentence to the next translatable text.

3: The next sentence will now be translated, although it isn't very informative ...

4: CTRL+SHIFT+S is pressed to delete the English sentence.

5: CTRL+SHIFT+F is pressed to move past the pre-translated sentence.

Q & A #4: Overtype Mode; Restoring the Color of Pre-translated Text

> Q: Can I translate by overtyping the English text?
> A: This is not recommended. Sentences may contain icons, Help file jumps, MATE markers, or GlossMan links which could get deleted during overtyping. If you don't like to insert your text immediately in front of the English sentence, you can use an alternative method which will be described on the next screens.
>
> Q: How can the color of pre-translated sentences be changed back to normal?
> A: MATE installs the Review command in your Tools menu. When you have translated a document, please use the "Remove MATE Codes" button in the Review dialog box to delete remaining markers and change pre-translated text back to the original color. This button does not remove the paragraph tags. These must remain in the document to be used for translation of changes.

Translating in Paragraph Mode

> If you prefer to translate and delete entire paragraphs at a time rather than working on a sentence-by-sentence basis, you can insert a "temporary" paragraph above the English paragraph you need to translate. To do this, use the Paragraph key, CTRL+S.
>
> The Paragraph key first *inserts* a paragraph mark at your cursor, followed by a colon (:). The colon tells MATE that the extra paragraph is not part of the document design.
>
> When you have completed the translation of the entire paragraph, press CTRL+S again. Now the macro looks for the colon and *deletes* the extra paragraph mark, the colon, and the following English paragraph. If a Repeated-Sentence Marker or a pre-translated sentence exists in the English paragraph, CTRL+S deletes text only up to that sentence.

Demonstration #4: Paragraph vs. Sentence Deletion; Translation Demo

> You can work in any combination of paragraph and sentence deletion, but you should only use the CTRL+S and CTRL+SHIFT+S keys to insert extra paragraph marks and/or delete text. *Do not press ENTER* to insert the extra paragraph mark, and *do not delete a paragraph with the DELETE or BACKSPACE key*. The S-keys are convenient, and they ensure that you don't accidentally delete a text item that shouldn't be deleted or a paragraph identification tag.
>
> To conclude this Auto Demo, most of the keys described will be demonstrated on three paragraphs containing WinWord index tags (purple fields surrounded by brackets), customized index range markers (also purple) used by MS indexers, and a graphic.
>
>                       Press ENTER to activate each step announced in the status bar....

Steps listed in the status bar

1: CTRL+SHIFT+F is pressed to move to the next occurrence of translatable text.
    Note that the Forward key resets the character formatting, so you won't start typing purple text.

2: The translation for the heading is inserted, using the Handle J for 'Document'...

3: CTRL+SHIFT+S is pressed to delete the English heading.

4: CTRL+SHIFT+F is pressed two times to move to the next paragraph and past the pre-translated text.

5: CTRL+S is pressed to insert a temporary paragraph mark above the English paragraph.

6: The translation for the next sentence in now inserted, using the Handle J.
    Note that translating in a paragraph above the English paragraph is 'cleaner', because the English text doesn't move to the right.

7: The translation is now inserted, starting with 'enter the text you want to find'...

Now we need the translation for the term 'Find What box', but we don't know the translation for 'box'. Let's preview the translation we'll get with the Handle J, so that we can enter the correct article for 'box'.

8: CTRL+J is pressed to display the following status bar message:    J = Feld 'Zu suchender Text'

9: Now we can insert the translation for the words 'In the '.

10: The sentence can now be completed, using CTRL+SHIFT+J to insert the translation for 'Find What box'.

11: CTRL+S is pressed to delete the English paragraph up to the Repeated-Sentence Marker.

12: CTRL+SHIFT+F is pressed to move past the Repeated-Sentence Marker.

13: The translation for the sentence is inserted ...

14: F12 is pressed to copy the translated sentence to the second occurrence.

15: A+Enter is pressed to replace the second occurrences of the sentence without confirmation.

16: CTRL+SHIFT+S is pressed to delete the English sentence.

17: Now we'll move to the next heading, translate it, delete it, and move to the following paragraph.

18: The next sentence is translated and deleted ...

19: CTRL+SHIFT+F is now pressed to move past the pre-translated sentence.
   Note that the Forward key moved you past the index range marker and the graphic.

20: CTRL+SHIFT+F must again be pressed to move past the next pre-translated sentence.

21: To translate the last paragraph, CTRL+S is pressed to insert a temporary paragraph mark.

22: The paragraph is translated using the Handles J and K.

23: And finally, CTRL+S is pressed to delete the temporary paragraph mark, the colon and the English text.

Q & A #5: Assigning and Remembering Key Combinations

| | |
|---|---|
| Q: | How am I supposed to remember all these keys? |
| A: | The CTRL and CTRL+SHIFT keys are WinWord's standard macro access keys. You only have to remember which of these two combinations activates which function. The Quick Reference on the back of the User's Guide will help.<br>You don't have to "learn" individual Handles, because the Handle for each term is shown in the document. The major keys to keep in mind while typing are:<br><br>S       for sentence deletion and paragraph insertion/deletion<br>0(zero) for changing the capitalization of the first letter of an inserted term<br>F       for moving the cursor to the next occurrence of translatable text |
| Q: | Can I change the key combinations assigned to these functions? |
| A: | You can change all key combinations as well as the colors for markers and pre-translated sentences. For details, see Chapter 7 of the User's Guide. |

Practice Files; Other Keys and Menu Commands to Investigate

You can practice the keys on the example documents provided for Spanish, French, and German in the subdirectory EXAMPLES in the installed MATE directory. Be sure to copy the documents into a backup directory, but do not rename them.

After you feel more confident, please learn about the remaining key combinations, such as the UndoInsert key, which quickly deletes a translation you've inserted with a Handle. Also, read about the keys available for the Glossary Additions file and the Chapter Glossary – for instance, how to scroll in the Chapter Glossary window or how to copy a translation from the window into the text. Finally, investigate how you can customize the number of markers displayed in your document with the Review and Filter commands in the Tools menu.

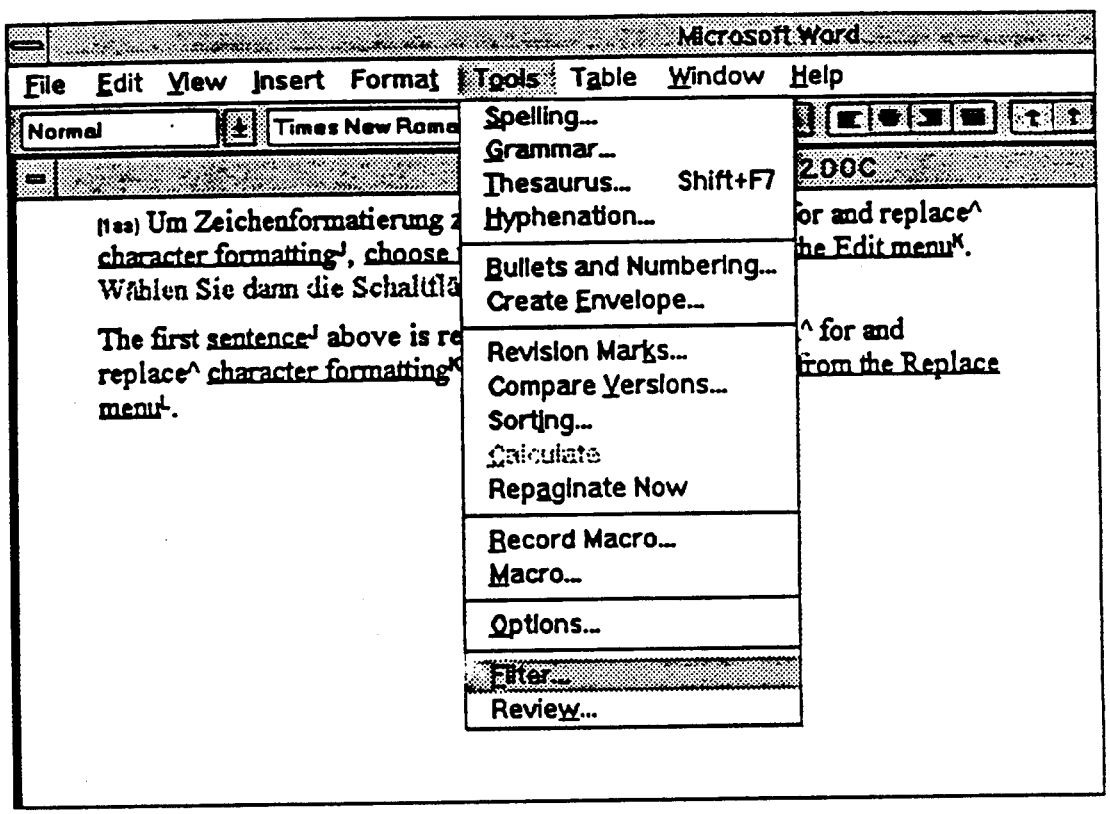

The commands Filter and Review in the Tools menu

Important   Never rename a file after it has been prepared for translation with MATE.

C    Operating Limits and Requirements

Paragraph Identification Tags

- A paragraph identification tag is a WinWord bookmark assigned to the text of one or more paragraphs, including the paragraph marks. The name of a tag includes the MATE identifier ("MT1"), the upper-case document name, and the paragraph number preceded by "p" if the document is a regular file and by "hp" if the document is a Help file. For example, paragraph 52 in document UG005.doc is tagged with MT1UG005p52. Bookmark names cannot contain hyphens, therefore the *filename cannot contain a hyphen* – as in UG-005.doc for instance.

- In files for printed documentation MATE assigns one paragraph tag to each individual regular paragraph, and one paragraph tag to each entire table. Every heading is tagged as a separate paragraph. Empty paragraphs and paragraphs containing only hidden text are not tagged. In Help files, MATE assigns a paragraph tag to contiguous text of the same font.

- If a paragraph tag is destroyed, translations for terms in this paragraph cannot be accessed by MATE.

- Due to the suggested limit of 450 bookmarks in a WinWord 2.0 document, files with more than about 350 "paragraphs" (as defined above) should be split into two or more files. With regular chapters of up to 30 pages and Help files up to 50 pages, this is not a problem. Long documents with an unusual number of one-line paragraphs – such as the Technical Reference list of WordBasic functions – cannot be handled by MATE unless they are split into smaller files.

Translation Handles

- A maximum of 24 unique Handles is available per paragraph. If the batch process runs out of Handle letters in a paragraph, it continues to assign the last letter to all remaining terms requiring a Handle. When this happens, only the translation for the last term which received that Handle letter will be available to the User. The 24-letter limit may become a problem in large tables.

- Translation Handles for a prepared document cannot be changed retroactively. The letter for the Handle (or rather, the number that was assigned to that letter in the MATE.INI file) in combination with the paragraph tag forms the pointer to a term's translation. To change the order of Handle letters, the MATE Configuration program must be run *before* the batch process is launched.

Repeated Sentences

- A maximum of 650 different repeated sentences are allowed in a document.

- A Repeated-Sentence marker consists of a digit and two letters surrounded by non-matching brackets, followed by a space: [nLL} . The letters identify the particular sentence to the Repeated-Sentence macro. The number indicates how often the sentence is repeated after the first occurrence. The number can only be of one digit, so if a sentence occurs more than ten times in a document, the marker will still show the number 9.

Template Strings

- Template strings are only assembled and pre-translated if a unique translation exists for the category of each variable in the template. If this is not the case, the entire template is left untranslated.

- Neither the fixed nor the variable text in template strings can contain a percent sign. Percent signs are interpreted as variable delimiters and extra % signs will scramble the variable assembly and render the template invalid, i.e., it will be considered not found. Glossary entries other than templates can contain percent signs provided they will never occur as variables in a template string.

- A template string must consist of at least one variable and a segment of fixed text. The fixed text must be a word, separated by a space from the variable. Exceptions are the following characters: +, -. A variable alone will not be recognized as a template. The template %KEY+ will be recognized as a template. %KEY will not be recognized as a template but will halt the batch process.

- The categories for variables should conform to Lingua's standard glossary categories.
- Non-static terms such as verbs and adjectives cannot be variables. Nouns should not be used as variables, because they are too common and slow down the batch process.

Hardware and Software Requirements

Hardware

Computer: 386/25 MHz, 8 MB RAM. 33 MHz speed recommended.
Monitor: Color Monitor
Keyboard: Extended keyboard (12 function keys)
Hard disk: Required disk space for:
Program files: 1.5 MB (including glossary DLLs)
GLOSSARY.TXT, Filter.txt: 200 KB (5000 and 100 entries)
Per 10-page document: 60 KB (excluding the document)

Software

MATE 1.0a
U.S. Word for Windows, Version 2.0a or higher.
U.S. Microsoft Excel, Version 4.0. Only required if user creates the glossary file.
Microsoft Windows, Version 3.1 (Version 3.0 should work for most systems)

D  Glossary

Batch Process
The documentation preparation routine of MATE. The batch process prepares the document for translation with the Translation Editor macros by creating the Chapter Glossary and the Index file and inserting the MATE markers into the English text.

Category
The category of a term specifies whether it is a software interface term (menu, check box name, etc.), a general term (noun, verb, fixed string, etc.), or a template string. The category in your product glossary should conform to the standard categories used by Lingua.

Chapter Glossary
This file is a subset of the original product glossary containing only terms which were found in the document for which the Chapter Glossary was created. The terms have one or more of the following characteristics:

- The category is either non-static (VRB, ADJ, or GEN).
- The category is static (NOU, STR, or one of the software term categories), but the term has more than one translation.
- The category is static (NOU or software term with a unique translation), but the term did not match case-sensitively in the text.

Entries in the Chapter Glossary are marked in the text with a colored caret (^). The Chapter Glossary is "paragraph sensitive." Only the terms marked in your current paragraph (the one containing the cursor) will be displayed. You don't need to specify a certain term. All terms in a paragraph will be listed at once when you call up the Chapter Glossary.

Filter
A text file containing terms that are "filtered" out of the file GLOSSARY.TXT used for terminology look-up during the batch process. The filter file must be called FILTER.TXT and should reside in your project directory.

Fixed string
A commonly occurring sentence or phrase containing no variables. A fixed string is entered into the product glossary with the category "STR."

GLOSSADD.DOC
Contains a table into which new terms and translation suggestions can be entered during translation. Also, sentences that occur repeatedly in the document are saved in this file during the batch process and their translations are inserted there when the Repeated-Sentence macro is activated.

Glossary Additions file   See *GLOSSADD.DOC*

Glossary Marker
A caret (^) attached to a term for which one or more translations exist in the Chapter Glossary.

Index File
Contains an index relating each Handle in a paragraph to the translation for that Handle. The index is based on the paragraph identification tags. This file is also used to store the translated terms provided by the Handles. An Index File is created for every document MATE processes. The name of the Index File consists of the name of the document file and the extension .IDX

MATE.INI file
This file is created in your Windows directory during Setup. It contains information about the MATE settings on your machine, such as the project directory for the last file you worked on, color selection, and key assignments.

Non-Static Terms
Non-static terms are words for which the exact translation is syntax or context dependent. These are verbs, adjectives, and similar classes as well as any kind of term with more than one translation.

Paragraph Identification Tag
A WinWord bookmark assigned to the text of one or more paragraphs, including the paragraph marks. The name of a tag includes the MATE identifier ("MT1"), the upper-case document name, and the paragraph number preceded by "p" if the document is a regular file and by "hp" if the document is a Help file. The paragraph tag is used to retrieve Handle translations and update the Chapter Glossary window with the terms needed in a particular paragraph.

Paragraph Tag    See *Paragraph Identification Tag*

Prepared Document
The English document after it has been prepared by the batch process. Includes MATE markers, paragraph tags, and pre-translated sentences.

Product Glossary
The name "product glossary" is used for the combined software and documentation terminology that exists for the product you're translating. The product glossary in form of an Excel Spreadsheet (or in a form which is convertible into a spreadsheet) is the input to the MATE 1.0 BuildGlossary macro.

Project Directory
The directory in which you keep the document files and the GLOSSARY.TXT and FILTER.TXT files for a particular project, and in which you run the MATE batch process to prepare documents for translation. Project-specific files such as GLOSSADD.DOC are created in the project directory during the batch process.

Repeated-Sentence Marker
A digit and two letters surrounded by non-matching brackets, followed by a space, such as [3af} . The letters identify the particular sentence to the Repeated-Sentence macro. The number indicates how often the sentence is repeated after the first occurrence.

Static Term
A term is considered static if the base form of its translation as given in the glossary is usually the form in which it is needed in the translated sentence. Nouns, names, interface terminology, fixed strings, and template strings are considered static.

Template String
A commonly occurring sentence or phrase containing variables. A template string is entered into the product glossary with the category "TEM."

Template Variable
A place holder in a template string for a term of static category. A variable is identified by a leading % sign. For example, the variable for a button name is %BUT. Nouns should not be used as variables.

Translation Handle
Translation Handles are letters or numbers inserted into the document by the batch process. To the user, Translation Handles signify which key to press in combination with the macro keys CTRL or CTRL+SHIFT to access the translation for the term.

Variable    See *Template Variable*

Translation Editor Key Quick Reference

| Press | To |
|---|---|
| CTRL+SHIFT+Handle | Insert Handle term translation at the cursor |
| CTRL+Handle | Display Handle term translation in the status bar |
| CTRL+& (= CTRL+SHIFT+7) | Copy English text marked with the Handle "&" to the cursor. This term remains untranslated. |
| CTRL+SHIFT+S | Delete next sentence (Undo using the Undo command on the Edit menu) |
| CTRL+S | Delete next paragraph and/or insert an empty paragraph at the cursor |
| CTRL+SHIFT+F | Move forward to the next translatable text or sentence |
| CTRL+F | Scroll down 3 lines in the glossary |
| CTRL+SHIFT+B | Move back to the previous translatable text or sentence |
| CTRL+B | Scroll up 3 lines in the glossary |
| CTRL+SHIFT+G | Display and/or update Chapter Glossary |
| CTRL+G+number+ENTER | Copy translation in line # "number" of the Chapter Glossary to your cursor in the document. Press ENTER |
| CTRL+G+number+L+ENTER | Display all terms containing the English word on line # "number". "L" can be any convenient letter on the keyboard. |
| CTRL+SHIFT+0 | Toggle capitalization of the most recent term inserted with a Handle or format the current selection as a KEY NAME |
| CTRL+0 | Hide/display Handles in the current paragraph |
| CTRL+SHIFT+X | Undo the most recent insertion of a Handle translation (saves the translation to the Clipboard) |
| F10 | Hide glossaries (Chapter Glossary, GLOSSADD.DOC) |
| F11 | Insert a new entry or display GLOSSADD.DOC: <br> 1. If you want to insert a new entry, select the English term you want to enter. <br> 2. Press F11. <br> 3. Fill in the category information and your translation. |
| CTRL+F11 | Show GLOSSADD entry in context Displays the paragraph from which the entry originated. |
| F12 | Replace repeated sentences with the last translation: <br> 1. Move the cursor past the Repeated-Sentence Marker and translate the sentence. <br> 2. With the cursor still placed at the end of the translated sentence, press F12. <br> 3. You're asked in the status bar if you want to confirm each (ENTER); replace all (A+ENTER); or abort (U+ENTER). |

I claim:

1. A computer system for translating a source language document written in a source language to a target language document written in a target language, the source language including a multiplicity of source terms and the target language including a multiplicity of target terms, the computer system including a display screen, the source language document, a product glossary having a plurality of source terms from the source language and a plurality of target terms from the target language, each source term being associated with the corresponding target term which translates the source term into the target language, the computer system comprising:

means for producing a translation screen portion on the display screen, the translation screen portion including a current insertion point;

means for displaying the source language document on the translation screen portion;

means for comparing each of the plurality of source terms from the product glossary with the source terms in the source language document;

inserting means for inserting a character adjacent to the source term in the source language document, in response to each comparison by the comparing means which produces a match between one of the source terms in the source language document and one of the source terms in the product glossary;

means for associating in an index file the inserted character with a target term from the product glossary that translates the matched source term from the source language into the target language;

means for inputting an insert target term command which contains a translation request character corresponding to the inserted character;

means for retrieving the translation request character from the insert target term command;

means for retrieving from the index file the target term associated with the retrieved translation request character; and means for inserting the retrieved target term on the translation screen portion in response to the insert target term command.

2. The computer system of claim 1 further comprising means for underlining the matched source term in response to each comparison by the comparing means which produces a match between one of the source terms in the source language document and one of the source terms in the product glossary.

3. The computer system of claim 1 further comprising means for replacing a lowercase version of a first character in a most recent target term inserted by the insertion means, with an uppercase version of the character without having to move the current insertion point into alignment with the first character.

4. The computer system of claim 1 further comprising means for deleting a most recent target term inserted by the insertion means, without having to move the current insertion point into alignment with the most recently inserted target term.

5. The computer system of claim 1 wherein the insertion means includes means for inserting the retrieved target term at the current insertion point on the translation screen portion.

6. The computer system of claim 1 wherein the target terms include template strings which are one of a partial and a full sentence containing variables.

7. A method executed in a computer system for translating a source language document written in a source language to a target language document written in a target language, the source language including a multiplicity of source terms and the target language including a multiplicity of target terms, the computer system including a display screen, the source language document, a product glossary having a plurality of source terms and a plurality of target terms, with each source term being associated with the corresponding target term which translates the source term into the target language, the method comprising the steps of:

producing a translation screen on the display screen, the display screen including a current insertion point indicating where data will be inserted on the translation screen;

displaying the source language document on the translation screen;

comparing each of a plurality of source terms from the product glossary with the source terms in the source language document;

inserting a character immediately after the source term in the source language document displayed on the translation screen in response to each comparison in the step of comparing which produces a match between one of the source terms in the source language document and one of the source terms in the product glossary;

associated in an index file the inserted character with the corresponding target term from the product glossary that translates the matched source term from the source language into the target language;

inputting an insert command which contains a translation request character corresponding to the inserted character;

retrieving the translation request character from the insert command;

retrieving from the index file the target term associated with the retrieved translation request character; and inserting the retrieved target term on the translation screen.

8. The method of claim 1 further comprising the step of underlining the matched source term in response to each comparison in the step of comparing which produces a match between one of the source terms in the source language document and one of the source terms in the product glossary.

9. The method of claim 1 further comprising the step of replacing a lowercase version of a first character in a most recent target term inserted in the step of inserting, with an uppercase version of the first character, without having to move the current insertion point into alignment with the first character.

10. The method of claim 1 further comprising the step of deleting a most recent target term inserted by the inserting means, without having to move the current insertion point into alignment with the target term.

11. The method of claim 1 wherein the step of inserting includes the step of inserting the retrieved target term at the current insertion point on the translation screen.

12. The method of claim 1 wherein the target terms include template strings which are one of a partial and a full sentence containing variables.

* * * * *